United States Patent
Gan et al.

(10) Patent No.: US 12,302,212 B2
(45) Date of Patent: May 13, 2025

(54) COMMUNICATION METHOD AND APPARATUS

(71) Applicant: HUAWEI TECHNOLOGIES CO., LTD., Guangdong (CN)

(72) Inventors: Ming Gan, Shenzhen (CN); Yuchen Guo, Shenzhen (CN); Guogang Huang, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/432,671

(22) Filed: Feb. 5, 2024

(65) Prior Publication Data

US 2024/0259911 A1 Aug. 1, 2024

Related U.S. Application Data

(63) Continuation of application No. 18/321,514, filed on May 22, 2023, now Pat. No. 11,963,083, which is a (Continued)

(30) Foreign Application Priority Data

Aug. 19, 2021 (CN) .......................... 202110957217.1

(51) Int. Cl.
*H04W 40/02* (2009.01)
*H04W 48/08* (2009.01)
*H04W 88/08* (2009.01)

(52) U.S. Cl.
CPC .......... *H04W 40/02* (2013.01); *H04W 48/08* (2013.01); *H04W 88/08* (2013.01)

(58) Field of Classification Search
None
See application file for complete search history.

(56) References Cited

U.S. PATENT DOCUMENTS 11,564,275 B2 * 1/2023 Kwon ................... H04W 48/08
2020/0092881 A1 3/2020 Nezou et al.
(Continued)

FOREIGN PATENT DOCUMENTS

CN 108370585 A 8/2018
CN 111771416 A 10/2020
(Continued)

OTHER PUBLICATIONS

International Search Report and Written Opinion in International Appln. No. PCT/CN2022/112957, mailed on Oct. 26, 2022, 11 pages (with partial English translation).
(Continued)

*Primary Examiner* — Hong S Cho
(74) *Attorney, Agent, or Firm* — Fish & Richardson P.C.

(57) ABSTRACT

This application provides communication methods, apparatuses, and computer-readable storage media. In an example, a value of a specific element of a first access point (AP) (or a second AP) is reused in a management frame, to indicate specific elements of a plurality of APs in a multiple basic service set identifier (BSSID) set to which the first AP (or the second AP) belongs. The management frame does not need to carry a plurality of same specific elements in the multiple BSSID set. The described techniques can be applied to, for example, a wireless local area network system supporting IEEE 802.11ax next-generation Wi-Fi protocols, for example, 802.11 series protocols such as the 802.11be or the EHT.

20 Claims, 19 Drawing Sheets

Related U.S. Application Data continuation of application No. PCT/CN2022/112957, filed on Aug. 17, 2022.

(56) References Cited

U.S. PATENT DOCUMENTS

| | | | |
|---|---|---|---|
| 2021/0014776 A1 | 1/2021 | Patil et al. | |
| 2021/0120599 A1* | 4/2021 | Cariou | H04W 88/08 |
| 2021/0212150 A1 | 7/2021 | Chu et al. | |
| 2021/0250848 A1* | 8/2021 | Seok | H04W 48/16 |
| 2023/0102644 A1* | 3/2023 | Gan | H04W 48/16 370/328 |

FOREIGN PATENT DOCUMENTS

| | | | |
|---|---|---|---|
| CN | 112449376 A | 3/2021 | |
| CN | 112788716 A | 5/2021 | |
| EP | 4221365 A1 | 8/2023 | |
| JP | 2021510244 A | 4/2021 | |
| RU | 2617928 C2 | 4/2017 | |
| TW | 202143787 A | 11/2021 | |
| WO | 2020033123 A1 | 2/2020 | |
| WO | 2021098415 A1 | 5/2021 | |

OTHER PUBLICATIONS

Office Action in Taiwanese Appln. No. 111130162, dated Nov. 16, 2022, 3 pages.
Search Report in Taiwanese Appln. No. 111130162, dated Nov. 16, 2022, 1 pages.
Patil et al., "Resolution for CIDs related to MLO Discovery (CC 34)," IEEE 802.11-21/0650r6, Apr. 10, 2021, 10 pages.
Office Action in Russian Appln. No. 2024105534/07(012169), mailed on Aug. 20, 2024, 11 pages (with English translation).
Cariou, "Resolutions for CC34 CIDs for channel switching quieting," 802.11-20/0481r2, May 2021, pp. 1-12.
Asterjadhi, "Proposed Resolutions to CIDs Specified in 11-21/218r0," IEEE 802.11-21/0915r0, Jul. 14, 2021, pp. 1-52.
Extended European Search Report in European Appln No. 22857836.5, dated May 6, 2024, 14 pages.
Office Action in Taiwanese Appln. No. 1121367236, mailed on Jan. 10, 2025, 10 pages (with English translation).
Cariou et al., "CSA/eCSA within AP MLD," IEEE 802.11-20/1140r5, Oct. 8, 2020, 16 pages.
Office Action in Japanese Appln. No. 2024-509363, mailed on Mar. 18, 2025, 24 pages (with English translation).

* cited by examiner

AP MLD: access point multi-link device
STA MLD: station multi-link device
MAC: medium access control
PHY: physical layer

| Element ID | Length | Max BSSID indicator | Optional subelement |
|---|---|---|---|
| 1 byte | 1 byte | 6 bytes | Variable |

Element ID: element identifier
BSSID: basic service set identifier

FIG. 4

| Element identifier | Length | Channel switch mode | new channel number (new channel number) | channel switch count (channel switch count) |
|---|---|---|---|---|

(a)

| Element identifier | Length | Channel switch mode | new operating class (new operating class) | new channel number (new channel number) | channel switch count (channel switch count) |
|---|---|---|---|---|---|

|  | Element identifier | Length | Element ID extension | Switch time |
|---|---|---|---|---|
|  | Element ID | Length | Element ID Extension | Switch time |
| Bytes: (Octets) | 1 | 1 | 1 | 3 |

FIG. 6

| Element ID (Element identifier) | Length (Length) | Quiet Count (Quiet count) | Quiet Period (Quiet period) | Quiet Duration (Quiet duration) | Quiet Offset (Quiet offset) |
|---|---|---|---|---|---|
| 1 | 1 | 1 | 1 | 2 | 2 |

Octet

FIG. 7

| | Element identifier | Length | AP quiet mode | Quiet count (Optional) | Quiet period (optional) | Quiet duration (Optional) | Quiet offset (Optional) |
|---|---|---|---|---|---|---|---|
| | Element ID | Length | AP Quiet Mode | Quiet Count (optional) | Quiet Period (optional) | Quiet Duration (optional) | Quiet Offset (optional) |
| Bytes: (Octets) | 1 | 1 | 1 | 0 or 1 | 0 or 1 | 0 or 2 | 0 or 2 |

FIG. 8

COMMUNICATION METHOD AND APPARATUS

CROSS-REFERENCE TO RELATED APPLICATIONS

This application is a continuation of U.S. patent application Ser. No. 18/321,514, filed on May 22, 2023, which is a continuation of International Application No. PCT/CN2022/112957, filed on Aug. 17, 2022. The International Application claims priority to Chinese Patent Application No. 202110957217.1, filed on Aug. 19, 2021. All of the aforementioned patent applications are hereby incorporated by reference in their entireties.

TECHNICAL FIELD

This application relates to the field of wireless local area network (WLAN) technologies, and in particular, to a communication method and apparatus.

BACKGROUND

In a WLAN communication process, when a communication parameter of an access point (AP) changes, the AP may need to send some specific elements to an affiliated station (STA) to indicate a related communication parameter. Generally, these specific elements may be carried in a management frame.

Currently, a management frame sent by an AP may need to carry a plurality of specific elements to indicate related communication parameters of a plurality of APs. Generally, in the plurality of specific elements carried in the management frame, different specific elements indicate specific elements of corresponding different APs.

However, in the foregoing implementation process, the management frame needs to carry a corresponding specific element for each AP. As a result, the management frame sent by the AP may have some repeated redundant data, causing unnecessary overheads and affecting communication efficiency.

SUMMARY

This application provides a communication method and apparatus. A value of a specific element of a first AP (or a second AP) is reused in a management frame, to indicate specific elements of a plurality of APs in a multiple BSSID set to which the first AP (or the second AP) belongs. The management frame does not need to carry a plurality of same specific elements in the multiple BSSID set. This reduces redundant data of the management frame, avoids unnecessary overheads, and improves communication efficiency.

A first aspect of this application provides a communication method, applied to WLAN communication. The method is performed by a first AP, or the method is performed by some components (for example, a processor, a chip, or a chip system) in a first AP. In the first aspect and the possible implementations of the first aspect, an example in which the method is performed by the first AP is used for description. In the method, the first AP generates a management frame, where the management frame includes a specific element of the first AP, the first AP is an AP corresponding to a transmitted BSSID in a multiple BSSID set, and a value of a specific element of an AP corresponding to a nontransmitted BSSID in the multiple BSSID set is the same as a value of the specific element of the first AP, and the first AP sends the management frame.

Based on the foregoing technical solution, the management frame sent by the first AP includes the specific element of the first AP, the first AP is the AP corresponding to the transmitted BSSID in the multiple BSSID set, and the value of the specific element of the AP corresponding to the nontransmitted BSSID in the multiple BSSID set is the same as the value of the specific element of the first AP. In this way, when a receiver of the management frame is a STA associated with the first AP, a corresponding value may be determined by using the specific element of the first AP carried in the management frame, and when the receiver of the management frame is a STA associated with the nontransmitted BSSID in the multiple BSSID set, the corresponding value may also be determined by using the specific element of the first AP carried in the management frame. In other words, the value of the specific element of the first AP is reused in the management frame, to indicate the specific element of the AP corresponding to the nontransmitted BSSID in the multiple BSSID set to which the first AP belongs. The management frame does not need to carry a plurality of same specific elements in the multiple BSSID set. This reduces redundant data of the management frame, avoids unnecessary overheads, and improves communication efficiency.

A second aspect of this application provides a communication method. The method is performed by a STA, or the method is performed by some components (for example, a processor, a chip, or a chip system) in a STA. In the second aspect and the possible implementations of the second aspect, an example in which the method is performed by the STA is used for description. In the method, the STA receives a management frame, where the management frame includes a specific element of a first access point AP, the first AP is an AP corresponding to a transmitted BSSID in a multiple BSSID set, and a value of a specific element of an AP corresponding to a nontransmitted BSSID in the multiple BSSID set is the same as a value of the specific element of the first AP; and the STA determines, based on the management frame, the value of the specific element of the AP corresponding to the nontransmitted BSSID in the multiple BSSID set or the value of the specific element of the first AP.

Optionally, that the STA determines, based on the management frame, the value of the specific element of the AP corresponding to the nontransmitted BSSID in the multiple BSSID set or the value of the specific element of the first AP may also be expressed as that the STA determines, based on the management frame, a value of a specific element of an AP associated with the STA.

Based on the foregoing technical solution, the management frame received by the STA includes the specific element of the first AP, the first AP is the AP corresponding to the transmitted BSSID in the multiple BSSID set, and the value of the specific element of the AP corresponding to the nontransmitted BSSID in the multiple BSSID set is the same as the value of the specific element of the first AP. In this way, when the STA is a STA associated with the first AP, a corresponding value may be determined by using the specific element of the first AP carried in the management frame, and when the STA is a STA associated with the nontransmitted BSSID in the multiple BSSID set, the corresponding value may also be determined by using the specific element of the first AP carried in the management frame. In other words, the value of the specific element of the first AP is reused in the management frame, to indicate the specific element of the AP corresponding to the nontransmitted BSSID in the multiple BSSID set to which the first AP belongs. The management frame does not need to carry a plurality of same specific elements in the multiple BSSID set. This reduces redundant data of the management frame, avoids unnecessary overheads, and improves communication efficiency.

A third aspect of this application provides a communication apparatus, applied to WLAN communication. The apparatus is a first AP, or the apparatus is some components (for example, a processor, a chip, or a chip system) in a first AP. A processing unit in the apparatus is configured to generate a management frame, where the management frame includes a specific element of the first AP, the first AP is an AP corresponding to a transmitted BSSID in a multiple BSSID set, and a value of a specific element of an AP corresponding to a nontransmitted BSSID in the multiple BSSID set is the same as a value of the specific element of the first AP. A transceiver unit in the apparatus is configured to send the management frame.

Based on the foregoing technical solution, the management frame sent by the transceiver unit includes the specific element of the first AP, the first AP is the AP corresponding to the transmitted BSSID in the multiple BSSID set, and the value of the specific element of the AP corresponding to the nontransmitted BSSID in the multiple BSSID set is the same as the value of the specific element of the first AP. In this way, when a receiver of the management frame is a STA associated with the first AP, a corresponding value may be determined by using the specific element of the first AP carried in the management frame, and when the receiver of the management frame is a STA associated with the nontransmitted BSSID in the multiple BSSID set, the corresponding value may also be determined by using the specific element of the first AP carried in the management frame. In other words, the value of the specific element of the first AP is reused in the management frame, to indicate the specific element of the AP corresponding to the nontransmitted BSSID in the multiple BSSID set to which the first AP belongs. The management frame does not need to carry a plurality of same specific elements in the multiple BSSID set. This reduces redundant data of the management frame, avoids unnecessary overheads, and improves communication efficiency.

A fourth aspect of this application provides a communication apparatus, applied to WLAN communication. The apparatus is a STA, or the apparatus is some components (for example, a processor, a chip, or a chip system) in a STA. A transceiver unit in the apparatus is configured to receive a management frame, where the management frame includes a specific element of a first access point AP, the first AP is an AP corresponding to a transmitted BSSID in a multiple BSSID set, and a value of a specific element of an AP corresponding to a nontransmitted BSSID in the multiple BSSID set is the same as a value of the specific element of the first AP. A processing unit in the apparatus is configured to determine, based on the management frame, the value of the specific element of the AP corresponding to the nontransmitted BSSID in the multiple BSSID set or the value of the specific element of the first AP.

Optionally, that the processing unit is configured to determine, based on the management frame, the value of the specific element of the AP corresponding to the nontransmitted BSSID in the multiple BSSID set or the value of the specific element of the first AP may also be expressed as that the processing unit is configured to determine, based on the management frame, a value of a specific element of an AP associated with the STA.

Based on the foregoing technical solution, the management frame received by the transceiver unit includes the specific element of the first AP, the first AP is the AP corresponding to the transmitted BSSID in the multiple BSSID set, and the value of the specific element of the AP corresponding to the nontransmitted BSSID in the multiple BSSID set is the same as the value of the specific element of the first AP. In this way, when a receiver of the management frame is a STA associated with the first AP, a corresponding value may be determined by using the specific element of the first AP carried in the management frame, and when the receiver of the management frame is a STA associated with the nontransmitted BSSID in the multiple BSSID set, the corresponding value may also be determined by using the specific element of the first AP carried in the management frame. In other words, the value of the specific element of the first AP is reused in the management frame, to indicate the specific element of the AP corresponding to the nontransmitted BSSID in the multiple BSSID set to which the first AP belongs. The management frame does not need to carry a plurality of same specific elements in the multiple BSSID set. This reduces redundant data of the management frame, avoids unnecessary overheads, and improves communication efficiency.

It should be noted that, in any one of the first aspect to the fourth aspect, that the value of the specific element of the AP corresponding to the nontransmitted BSSID in the multiple BSSID set is the same as the value of the specific element of the first AP may also be expressed as that a value of a specific element of another AP other than the first AP in the multiple BSSID set is the same as the value of the specific element of the first AP, or may be expressed as that values of specific elements of all APs in the multiple BSSID set are the same, or may be expressed as that every two of values of specific elements of all APs in the multiple BSSID set are the same, or may be expressed as that common specific elements of all APs in the multiple BSSID set are the same, and the multiple BSSID set included in the management frame does not include the common specific elements of all the APs in the multiple BSSID set.

In a possible implementation of any one of the first aspect to the fourth aspect, the management frame further includes a multiple BSSID element, and the multiple BSSID element does not include the specific element of the AP corresponding to the nontransmitted BSSID.

Based on the foregoing technical solution, the multiple BSSID element in the management frame does not include the specific element of the AP corresponding to the nontransmitted BSSID. In other words, the specific element of the first AP also indicates the specific element of the AP corresponding to the nontransmitted BSSID. Therefore, the specific element of the first AP is reused to indicate specific elements of a plurality of APs (including the first AP and the AP corresponding to the nontransmitted BSSID). This avoids redundant data carried in the management frame, reduces overheads, and improves communication efficiency.

In a possible implementation of any one of the first aspect to the fourth aspect, the management frame is a beacon frame or the management frame is a probe response frame.

In a possible implementation of any one of the first aspect to the fourth aspect, the specific element includes at least one of the following: a channel switch announcement element, an extended channel switch announcement element, a quiet element, a quiet channel element, and a max channel switch time element.

Based on the foregoing technical solution, the specific element carried in the management frame may include at least one of the foregoing items, to indicate channel switch related information and/or quiet related information.

A fifth aspect of this application provides a communication method, applied to WLAN communication. The method is performed by a first AP, or the method is performed by some components (for example, a processor, a chip, or a chip system) in a first AP. In the fifth aspect and the possible implementations of the fifth aspect, an example in which the method is performed by the first AP is used for description. In the method, the first AP generates a management frame, where the management frame includes a specific element of a second AP, the first AP is an AP corresponding to a transmitted BSSID in a first multiple BSSID set, the second AP belongs to a second multiple BSSID set, and a value of the specific element of the second AP is the same as a value of a specific element of another AP other than the second AP in the second multiple BSSID set; and the first AP sends the management frame.

Based on the foregoing technical solution, the management frame sent by the first AP includes the specific element of the second AP, the first AP is the transmitted BSSID in the first multiple BSSID set, the second AP is a BSSID in the second multiple BSSID set, and the value of the specific element of the second AP is the same as the value of the specific element of the another AP other than the second AP in the second multiple BSSID set. In this way, when a receiver of the management frame is a STA associated with the second AP, a corresponding value may be determined by using the specific element of the second AP carried in the management frame, and when the receiver of the management frame is a STA associated with the another AP other than the second AP in the second multiple BSSID set, the corresponding value may also be determined by using the specific element of the first AP carried in the management frame. In other words, the value of the specific element of the second AP is reused in the management frame, to indicate specific elements of a plurality of APs in the multiple BSSID set to which the second AP belongs. The management frame does not need to carry a plurality of same specific elements in the multiple BSSID set. This reduces redundant data of the management frame, avoids unnecessary overheads, and improves communication efficiency.

A sixth aspect of this application provides a communication method. The method is performed by a STA, or the method is performed by some components (for example, a processor, a chip, or a chip system) in a STA. In the sixth aspect and the possible implementations of the sixth aspect, an example in which the method is performed by the STA is used for description. In the method, the STA receives a management frame from a first access point AP, where the management frame includes a specific element of a second AP, the first AP is an AP corresponding to a transmitted BSSID in a first multiple BSSID set, the second AP belongs to a second multiple BSSID set, and a value of the specific element of the second AP is the same as a value of a specific element of another AP other than the second AP in the second multiple BSSID set; and the STA determines, based on the management frame, the value of the specific element of the second AP or the value of the specific element of the another AP other than the second AP in the second multiple BSSID set.

Optionally, that the STA determines, based on the management frame, the value of the specific element of the second AP or the value of the specific element of the another AP other than the second AP in the second multiple BSSID set may also be expressed as that the STA determines, based on the management frame, a value of a specific element of an AP associated with the STA.

Based on the foregoing technical solution, the management frame sent by the STA includes the specific element of the second AP, the first AP is the transmitted BSSID in the first multiple BSSID set, the second AP is a BSSID in the second multiple BSSID set, and the value of the specific element of the second AP is the same as the value of the specific element of the another AP other than the second AP in the second multiple BSSID set. In this way, when the STA is a STA associated with the second AP, a corresponding value may be determined by using the specific element of the second AP carried in the management frame, and when the STA is a STA associated with the another AP other than the second AP in the second multiple BSSID set, the corresponding value may also be determined by using the specific element of the first AP carried in the management frame. In other words, the value of the specific element of the second AP is reused in the management frame, to indicate specific elements of a plurality of APs in the multiple BSSID set to which the second AP belongs. The management frame does not need to carry a plurality of same specific elements in the multiple BSSID set. This reduces redundant data of the management frame, avoids unnecessary overheads, and improves communication efficiency.

A seventh aspect of this application provides a communication apparatus, applied to WLAN communication. The apparatus is a first AP, or the apparatus is some components (for example, a processor, a chip, or a chip system) in a first AP. A processing unit in the apparatus is configured to generate a management frame, where the management frame includes a specific element of a second AP, the first AP is an AP corresponding to a transmitted BSSID in a first multiple BSSID set, the first AP is an AP in a first access point multi-link device (AP MLD), the second AP belongs to a second multiple BSSID set, and a value of the specific element of the second AP is the same as a value of a specific element of another AP other than the second AP in the second multiple BSSID set. A transceiver unit in the apparatus is configured to send the management frame.

Based on the foregoing technical solution, the management frame sent by the transceiver unit includes the specific element of the second AP, the first AP is the transmitted BSSID in the first multiple BSSID set, the second AP is a BSSID in the second multiple BSSID set, and the value of the specific element of the second AP is the same as the value of the specific element of the another AP other than the second AP in the second multiple BSSID set. In this way, when a receiver of the management frame is a STA associated with the second AP, a corresponding value may be determined by using the specific element of the second AP carried in the management frame, and when the receiver of the management frame is a STA associated with the another AP other than the second AP in the second multiple BSSID set, the corresponding value may also be determined by using the specific element of the first AP carried in the management frame. In other words, the value of the specific element of the second AP is reused in the management frame, to indicate specific elements of a plurality of APs in the multiple BSSID set to which the second AP belongs. The management frame does not need to carry a plurality of same specific elements in the multiple BSSID set. This reduces redundant data of the management frame, avoids unnecessary overheads, and improves communication efficiency.

An eighth aspect of this application provides a communication apparatus, applied to WLAN communication. The apparatus is a STA, or the apparatus is some components (for example, a processor, a chip, or a chip system) in a STA. A transceiver unit in the apparatus is configured to receive a management frame from a first access point AP, where the management frame includes a specific element of a second AP, the first AP is an AP corresponding to a transmitted BSSID in a first multiple BSSID set, the first AP is an AP in a first access point multi-link device (AP MLD), the second AP belongs to a second multiple BSSID set, and a value of the specific element of the second AP is the same as a value of a specific element of another AP other than the second AP in the second multiple BSSID set. A processing unit in the apparatus is configured to determine, based on the management frame, the value of the specific element of the second AP or the value of the specific element of the another AP other than the second AP in the second multiple BSSID set.

Optionally, that the processing unit is configured to determine, based on the management frame, the value of the specific element of the AP corresponding to the nontransmitted BSSID in the multiple BSSID set or the value of the specific element of the first AP may also be expressed as that the processing unit is configured to determine, based on the management frame, a value of a specific element of an AP associated with the STA.

Based on the foregoing technical solution, the management frame sent by the transceiver unit includes the specific element of the second AP, the first AP is the transmitted BSSID in the first multiple BSSID set, the second AP is a BSSID in the second multiple BSSID set, and the value of the specific element of the second AP is the same as the value of the specific element of the another AP other than the second AP in the second multiple BSSID set. In this way, when a receiver of the management frame is a STA associated with the second AP, a corresponding value may be determined by using the specific element of the second AP carried in the management frame, and when the receiver of the management frame is a STA associated with the another AP other than the second AP in the second multiple BSSID set, the corresponding value may also be determined by using the specific element of the first AP carried in the management frame. In other words, the value of the specific element of the second AP is reused in the management frame, to indicate specific elements of a plurality of APs in the multiple BSSID set to which the second AP belongs. The management frame does not need to carry a plurality of same specific elements in the multiple BSSID set. This reduces redundant data of the management frame, avoids unnecessary overheads, and improves communication efficiency.

It should be noted that in any one of the fifth aspect to the eighth aspect, the STA that receives the management frame may be a STA in a non-AP MLD. The non-AP MLD includes one or more APs. For example, when the non-AP MLD includes only the STA that receives the management frame, the non-AP MLD may also be referred to as a single-link device; or the non-AP MLD may further include another STA other than the STA that receives the management frame.

It should be noted that, in any one of the fifth aspect to the eighth aspect, that the value of the specific element of the second AP is the same as the value of the specific element of the another AP other than the second AP in the second multiple BSSID set may be expressed as that values of specific elements of all APs in the second multiple BSSID set are the same, or may be expressed as that every two of values of specific elements of all APs in the second multiple BSSID set are the same.

In a possible implementation of any one of the fifth aspect to the eighth aspect, the first AP belongs to the first access point multi-link device AP MLD.

Optionally, the first AP MLD includes one or more APs. For example, when the first AP MLD includes only the first AP, the first AP MLD may also be referred to as a single-link device; or the first AP MLD may further include another AP other than the first AP.

In a possible implementation of any one of the fifth aspect to the eighth aspect, the second AP is another AP other than the first AP in the first AP MLD.

In a possible implementation of any one of the fifth aspect to the eighth aspect,
  the second AP is an AP in a second AP MLD, the second AP is not an AP corresponding to a nontransmitted BSSID in the first multiple BSSID set, and the second AP MLD is an AP MLD in which the nontransmitted BSSID in the first multiple BSSID set is located.

Optionally, that the second AP is an AP in a second AP MLD and the second AP is not an AP corresponding to a nontransmitted BSSID in the first multiple BSSID set may be expressed as that the second AP is another AP in the second AP MLD other than the AP corresponding to the nontransmitted BSSID in the first multiple BSSID set, or may be expressed as that the second AP is another AP in the second AP MLD other than an AP corresponding to the first multiple BSSID set.

In a possible implementation of any one of the fifth aspect to the eighth aspect,
  the second AP includes another AP other than the first AP in the first AP MLD; or
  the second AP includes an AP in a second AP MLD, the second AP is not an AP corresponding to a nontransmitted BSSID in the first multiple BSSID set, and the second AP MLD is an AP MLD in which the AP corresponding to the nontransmitted BSSID in the first multiple BSSID set is located.

Optionally, that the second AP includes an AP in a second AP MLD and the second AP is not an AP corresponding to a nontransmitted BSSID in the first multiple BSSID set may be expressed as that the second AP includes another AP in the second AP MLD other than the AP corresponding to the nontransmitted BSSID in the first multiple BSSID set, or may be expressed as that the second AP includes another AP in the second AP MLD other than an AP corresponding to the first multiple BSSID set.

In a possible implementation of any one of the fifth aspect to the eighth aspect, the specific element is located in a multiple BSSID element of the management frame.

Optionally, the second AP is an AP in a second AP MLD, the second AP is not an AP corresponding to a nontransmitted BSSID in the first multiple BSSID set, and the second AP MLD is an AP MLD in which the nontransmitted BSSID in the first multiple BSSID set is located. The specific element is located in the multiple BSSID element of the management frame, and the second AP MLD is an AP MLD in which the nontransmitted BSSID in the first multiple BSSID set is located.

Optionally, the second AP includes another AP other than the first AP in the first AP MLD (or the second AP includes an AP in a second AP MLD, the second AP is not an AP corresponding to a nontransmitted BSSID in the first multiple BSSID set, and the second AP MLD is an AP MLD in which the AP corresponding to the nontransmitted BSSID in the first multiple BSSID set is located). The specific element is located in the multiple BSSID element of the management frame, and the second AP MLD is an AP MLD in which the nontransmitted BSSID in the first multiple BSSID set is located.

Based on the foregoing technical solution, when the first AP sends the management frame, the first AP may carry, by using the multiple BSSID element of the management frame, related information about the AP MLD in which the nontransmitted BSSID in the first multiple BSSID set is located. In other words, the specific element of the second AP is located in the multiple BSSID element of the management frame. The first AP MLD to which the first AP belongs is different from the second AP MLD to which the second AP belongs. When the first AP sends the management frame, the management frame includes a specific element for indicating an AP located in a different AP MLD from the first AP. The specific element indicates specific elements of a plurality of APs in multiple BSSID sets in which the APs in different AP MLDs are located.

In a possible implementation of any one of the fifth aspect to the eighth aspect, when the specific element is located in the multiple BSSID element of the management frame, the multiple BSSID element includes at least one nontransmitted basic service set identifier profile (Nontransmitted BSSID profile, briefly referred to as a nontransmitted BSSID profile), and the specific element is located in a first nontransmitted BSSID profile in the at least one nontransmitted BSSID profile.

Optionally, the first nontransmitted BSSID profile is a first piece of nontransmitted BSSID profile in the at least one nontransmitted BSSID profile.

Based on the foregoing technical solution, the multiple BSSID element of the management frame sent by the first AP includes the at least one nontransmitted BSSID profile. In other words, the first multiple BSSID set includes at least one nontransmitted BSSID. To help a receive end of the management frame receive the specific element of the second AP, the specific element may be located in the first nontransmitted BSSID profile in the at least one nontransmitted BSSID profile.

Optionally, the specific element is located in any nontransmitted BSSID profile in the at least one nontransmitted BSSID profile (for example, a second possible nontransmitted BSSID profile, a third possible nontransmitted BSSID profile, . . . , or a last possible nontransmitted BSSID profile).

In a possible implementation of any one of the fifth aspect to the eighth aspect, another nontransmitted BSSID profile other than the first nontransmitted BSSID profile in the at least one nontransmitted BSSID profile does not include the specific element.

Based on the foregoing technical solution, in the at least one nontransmitted BSSID profile in the multiple BSSID element of the management frame, other than the first nontransmitted BSSID profile that includes the specific element, the another nontransmitted BSSID profile does not include the specific element. In other words, the value of the specific element of the second AP also indicates a value of a specific element of an AP of a BSSID corresponding to the another nontransmitted BSSID profile. Therefore, the specific element of the first AP is reused to indicate specific elements of a plurality of APs (including the second AP and the AP of the BSSID corresponding to the another nontransmitted BSSID profile). This avoids redundant data carried in the management frame, reduces overheads, and improves communication efficiency.

In a possible implementation of any one of the fifth aspect to the eighth aspect, the specific element is located in a multi-link element (or referred to as an ML element) of the management frame.

Optionally, the second AP is another AP other than the first AP in the first AP MLD, and the specific element is located in the multi-link element of the management frame.

Based on the foregoing technical solution, when the first AP is located in an AP MLD, the management frame may carry the multi-link element when the first AP sends the management frame. When the first AP and the second AP are affiliated with a same AP MLD, the specific element of the second AP may be carried in the multi-link element of the management frame.

That the second AP is another AP other than the first AP in the first AP MLD may be expressed as that the first AP and the second AP are affiliated with a same AP MLD.

In addition, the first AP may be an AP in the first AP MLD, and the second AP is another AP in the first AP MLD. When the first AP sends the management frame, the management frame includes a specific element for indicating another AP located in a same AP MLD as the first AP. The specific element indicates specific elements of a plurality of APs in a multiple BSSID set in which the another AP in the same AP MLD is located.

In a possible implementation of any one of the fifth aspect to the eighth aspect, when the specific element is located in the multi-link element of the management frame, the specific element is located in a per-STA profile field corresponding to the second AP in the multi-link element.

Based on the foregoing technical solution, the multi-link element may include a plurality of per-STA profile fields for indicating that the specific element of the second AP may be specifically located in the per-STA profile field corresponding to the second AP in the multi-link element.

In a possible implementation of any one of the fifth aspect to the eighth aspect, when the specific element is located in the multi-link element of the management frame, the per-STA profile field corresponding to the second AP includes a link identifier field, and the link identifier field is a link identifier of the second AP.

Based on the foregoing technical solution, when the specific element of the second AP is located in the per-STA profile field corresponding to the second AP in the multi-link element, the per-STA profile field corresponding to the second AP may further include the link identifier field, and the link identifier field is the link identifier of the second AP, and the link identifier indicates, to the receive end of the management frame, that the per-STA profile field is a link on which the second AP is located.

Optionally, when the specific element of the second AP is located in the per-STA profile field corresponding to the second AP in the multi-link element, the per-STA profile field further includes a station MAC address present field located in a station control field, and a value of the station MAC address present field indicates that a station information field does not include a station MAC address.

Optionally, when the specific element of the second AP is located in the per-STA profile field corresponding to the second AP in the multi-link element, the per-STA profile field further includes a station MAC address present field located in a station control field, and a value of the station MAC address present field indicates that a station information field includes a station MAC address.

Optionally, when the station information field includes the station MAC address, a value of the station MAC address in the station information field may be a MAC address of the second AP.

Optionally, when the station information field includes the station MAC address, a value of the station MAC address in the station information field may be a transmitted BSSID in the second multiple BSSID set.

In a possible implementation of any one of the fifth aspect to the eighth aspect, when the specific element is located in the multi-link element of the management frame, one per-STA profile field in the multi-link element includes a link identifier field, and a value of the link identifier field is a special value.

Optionally, the second AP includes another AP other than the first AP in the first AP MLD or the second AP includes another AP in the second AP MLD other than the AP corresponding to the nontransmitted BSSID in the first multiple BSSID set, and the specific element is located in the multi-link element of the management frame. One per-STA profile field in the multi-link element includes a link identifier field, and a value of the link identifier field is a special value.

Optionally, the special value is a reserved value of a value of a link identifier field specified in a current standard. For example, the special value is 15.

Based on the foregoing technical solution, when the specific element is located in the multi-link element of the management frame, a value of a link identifier field included in a per-STA profile field in the multi-link element is a special value, so that a conflict with a link identifier of an existing AP is avoided by using the special value.

In a possible implementation of any one of the fifth aspect to the eighth aspect, when the specific element is located in the multi-link element of the management frame, the per-STA profile field further includes the station media access control (MAC) address present field located in the station control field, and the value of the station MAC address present field indicates that the station information field includes the station MAC address.

Based on the foregoing technical solution, when the specific element is located in a per-STA profile field in a second multi-link element of the management frame, the per-STA profile field further includes the station MAC address present field located in the station control field, and the value of the station MAC address present field indicates that the station information field includes the station MAC address, so that the receiver of the management frame determines that the station information field includes the station MAC address, and receives the station MAC address in the station MAC address field.

In a possible implementation of any one of the fifth aspect to the eighth aspect, when the specific element is located in the multi-link element of the management frame, the per-STA profile field further includes the station information field, the station information field includes the station MAC address field, and the value of the station MAC address field is the transmitted BSSID in the second multiple BSSID set.

Based on the foregoing technical solution, when the specific element is located in the per-STA profile field in the second multi-link element of the management frame, the per-STA profile field further includes the station MAC address field in the station information field, and the value of the station MAC address field is the transmitted BSSID in the second multiple BSSID set. Therefore, the value of the station MAC address field indicates that a value of the specific element is values of specific elements of all APs corresponding to transmitted BSSIDs in the second multiple BSSID set, or the value of the station MAC address field indicates that a value of the specific element is a value of a specific element of any AP corresponding to a transmitted BSSID in the second multiple BSSID set, or the value of the station MAC address field indicates that a value of the specific element is values of specific elements of all APs corresponding to transmitted BSSIDs in the second multiple BSSID set, or the value of the station MAC address field indicates that a value of the specific element is a value of a specific element of any AP corresponding to a transmitted BSSID in the second multiple BSSID set and values of specific elements of all APs corresponding to transmitted BSSIDs in the second multiple BSSID set are the same.

In a possible implementation of any one of the fifth aspect to the eighth aspect, the management frame further includes a multiple BSSID element corresponding to the first multiple BSSID set, and the multiple BSSID element corresponding to the first multiple BSSID set does not include a specific element of another AP other than the second AP in the second multiple BSSID set.

Based on the foregoing technical solution, the management frame further includes a multiple BSSID element for indicating information about the first multiple BSSID set, and the multiple BSSID element corresponding to the first multiple BSSID set does not include a specific element of another AP other than the second AP in the second multiple BSSID set. In other words, the value of the specific element of the second AP also indicates a value of the specific element of the another AP other than the second AP in the second multiple BSSID set, so that the specific element of the second AP is reused to indicate specific elements of a plurality of APs (including the second AP and another AP (other than the second AP) in the second multiple BSSID set, or including the second AP and another AP (located in the second multiple BSSID set) in the second AP MLD). This avoids redundant data carried in the management frame, reduces overheads, and improves communication efficiency.

In a possible implementation of any one of the fifth aspect to the eighth aspect, the management frame further includes a first field, and the first field satisfies at least one of the following:
  the first field at least indicates that a STA in a non-AP MLD associated with the second AP MLD needs to receive (the specific element of the second AP in) the multi-link element of the first AP MLD;
  the first field at least indicates that a STA in a non-AP MLD associated with the first AP MLD needs to receive (the specific element of the second AP in) the multi-link element of the first AP MLD;
  the first field at least indicates that a STA associated with the first AP needs to receive (the specific element of the second AP in) the multi-link element of the first AP MLD;
  the first field at least indicates that a STA in a non-AP MLD associated with the second AP MLD needs to receive (the specific element of the second AP in) a multiple BSSID element corresponding to the second multiple BSSID set; or
  the first field at least indicates that a STA in a non-AP MLD associated with the second AP MLD needs to receive (the specific element of the second AP in) a first nontransmitted BSSID profile in a multiple BSSID element corresponding to the second multiple BSSID set.

Optionally, the STA mentioned above is a STA associated with an AP that operates on a same link as the first AP, or a STA associated with the first AP.

In a possible implementation of any one of the fifth aspect to the eighth aspect,
  the first field is located in a capabilities information field;
  the first field is located in a nontransmitted profile) field;

the first field is located in a nontransmitted BSSID capabilities element of a nontransmitted profile field;

the first field is located in a multi-link element (or referred to as an ML element) of a nontransmitted profile field;

the first field is located in a multi-link control field of a multi-link element of a nontransmitted profile field; or the first field is located in a common information field of a multi-link element of a nontransmitted profile field.

In a possible implementation of any one of the fifth aspect to the eighth aspect, the management frame is a beacon frame or the management frame is a probe response frame.

In a possible implementation of any one of the fifth aspect to the eighth aspect, the specific element includes at least one of the following: a channel switch announcement element, an extended channel switch announcement element, a quiet element, a quiet channel element, and a max channel switch time element.

Based on the foregoing technical solution, the specific element carried in the management frame may include at least one of the foregoing items, to indicate channel switch related information and/or quiet related information.

A ninth aspect of embodiments of this application provides a communication apparatus, including at least one processor. The at least one processor is coupled to a memory. The memory is configured to store a program or instructions. The at least one processor is configured to execute the program or the instructions, so that the apparatus implements the method in any one of the first aspect or the possible implementations of the first aspect, or the apparatus implements the method in any one of the second aspect or the possible implementations of the second aspect, or the apparatus implements the method in any one of the fifth aspect or the possible implementations of the fifth aspect, or the apparatus implements the method in any one of the sixth aspect or the possible implementations of the sixth aspect.

A tenth aspect of embodiments of this application provides a computer-readable storage medium storing one or more computer-executable instructions. When the computer-executable instructions are executed by a processor, the processor performs the method in any one of the first aspect or the possible implementations of the first aspect, or the processor performs the method in any one of the second aspect or the possible implementations of the second aspect, or the processor performs the method in any one of the fifth aspect or the possible implementations of the fifth aspect, or the processor performs the method in any one of the sixth aspect or the possible implementations of the sixth aspect.

An eleventh aspect of embodiments of this application provides a computer program product (or referred to as a computer program) storing one or more computers. When the computer program product is executed by a processor, the processor performs the method in any one of the first aspect or the possible implementations of the first aspect, or the processor performs the method in any one of the second aspect or the possible implementations of the second aspect, or the processor performs the method in any one of the fifth aspect or the possible implementations of the fifth aspect, or the processor performs the method in any one of the sixth aspect or the possible implementations of the sixth aspect.

A twelfth aspect of embodiments of this application provides a chip system. The chip system includes at least one processor, configured to support a communication apparatus in implementing a function in any one of the first aspect or the possible implementations of the first aspect, or configured to support a communication apparatus in implementing a function in any one of the second aspect or the possible implementations of the second aspect, or configured to support a communication apparatus in implementing a function in any one of the fifth aspect or the possible implementations of the fifth aspect, or configured to support a communication apparatus in implementing a function in any one of the sixth aspect or the possible implementations of the sixth aspect.

In a possible design, the chip system further includes a memory. The memory is configured to store program instructions and data that are necessary for the communication apparatus. The chip system may include a chip, or may include a chip and another discrete component. Optionally, the chip system further includes an interface circuit, and the interface circuit provides program instructions and/or data for the at least one processor.

A thirteenth aspect of embodiments of this application provides a communication system. The communication system includes the communication apparatus in the third aspect and the communication apparatus in the fourth aspect, and/or the communication system includes the communication apparatus in the seventh aspect and the communication apparatus in the eighth aspect, and/or the communication system includes the communication apparatus in the ninth aspect.

For technical effects brought by any design in the ninth aspect to the thirteenth aspect, refer to the technical effects brought by different implementations in the first aspect to the eighth aspect. Details are not described herein again.

It may be learned from the foregoing technical solutions that, in some embodiments, the value of the specific element of the first AP (or the second AP) is reused in the management frame by the first AP, to indicate specific elements of a plurality of APs in the multiple BSSID set to which the first AP (or the second AP) belongs. The management frame does not need to carry a plurality of same specific elements in the multiple BSSID set. This reduces redundant data of the management frame, avoids unnecessary overheads, and improves communication efficiency.

BRIEF DESCRIPTION OF DRAWINGS

FIG. 4 is another schematic diagram of a frame format of a radio frame according to this application;

FIG. 5 is another schematic diagram of a frame format of a radio frame according to this application;

FIG. 6 is another schematic diagram of a frame format of a radio frame according to this application;

FIG. 7 is another schematic diagram of a frame format of a radio frame according to this application;

FIG. 8 is another schematic diagram of a frame format of a radio frame according to this application;

DESCRIPTION OF EMBODIMENTS

Figure 1:
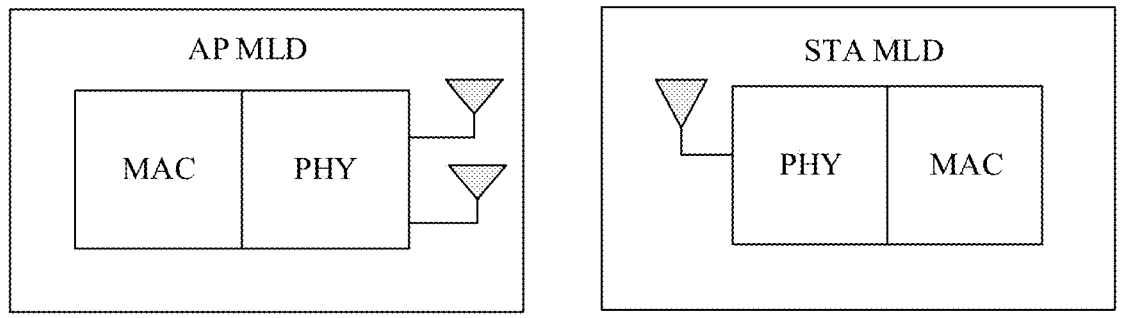
FIG. 1 is a schematic diagram of a communication system according to this application.

In this application, unless otherwise specified, for same or similar parts of the embodiments, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The following descriptions are implementations of this application, but are not intended to limit the protection scope of this application.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

In description of this application, the term "a plurality of" means two or more than two unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the expression such as "example" or "for example" is used to represent giving an example, an illustration, or description. Any embodiment or design scheme described as an "example" or "for example" in embodiments of this application should not be explained as being more preferred or having more advantages than another embodiment or design scheme. Exactly, use of the expressions such as "example" and "for example" is intended to present a relative concept in a specific manner for ease of understanding.

For ease of understanding the method provided in embodiments of this application, the following describes a system architecture of the method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions provided in this application are applicable to a WLAN scenario, for example, are applicable to standards of an IEEE 802.11 system, for example, 802.11a/b/g, 802.11n, 802.11ac, 802.11ax, or a next generation of 802.11ax, for example, 802.11be or a further next generation standard.

Although embodiments of this application are mainly described by using an example of a deployed WLAN network, especially a network applying the standards of an IEEE 802.11 system, a person skilled in the art easily understands that aspects of this application may be extended to other networks using various standards or protocols, for example, Bluetooth, high-performance wireless LAN (HIPERLAN) (which is a wireless standard similar to the IEEE 802.11 standard, and mainly used in Europe), a wide area network (WAN), a personal area network (PAN), or other networks that are known or developed in future. Therefore, the various aspects provided in this application are applicable to any suitable wireless network regardless of coverage and wireless access protocols.

Alternatively, embodiments of this application may be applied to a wireless local area network system, for example, an internet of things (IoT) or a vehicle-to-everything (V2X) network. Certainly, embodiments of this application are applicable to other possible communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) communication system, and a future sixth generation (6G) communication system.

The foregoing communication systems used in this application are merely examples for description, and are not limited thereto. A unified description is provided herein and details are not described below again.

The foregoing content briefly describes the system architecture in embodiments of this application. To better understand the technical solutions in embodiments of this application, the following describes content related to embodiments of this application:

1. Multi-Link Device

A wireless communication system applicable to embodiments of this application may be a wireless local area network (WLAN) or a cellular network. A multicast service transmission method may be implemented by a communication device in the wireless communication system or a chip or a processor in the communication device. The communication device may be a wireless communication device that supports concurrent transmission performed on multiple links. For example, the communication device is referred to as a multi-link device or a multi-band device. Compared with a device that supports only single-link transmission, the multi-link device has higher transmission efficiency and a higher throughput.

The multi-link device includes one or more affiliated stations STAs. The affiliated STA is a logical station and may operate on one link. The affiliated station may be an access point (AP) or a non-access point station (non-AP STA). For ease of description, in this application, a multi-link device whose affiliated station is an AP may be referred to as a multi-link AP, a multi-link AP device, or an AP multi-link device (AP MLD). A multi-link device whose affiliated station is a non-AP STA may be referred to as a multi-link STA, a multi-link STA device, or a STA multi-link device (STA MLD). For ease of description, "a multi-link device includes an affiliated STA" is also briefly described as "a multi-link device includes a STA" in embodiments of this application.

It should be noted that a multi-link device includes a plurality of logical stations, and each of the logical stations operates on a single link, but a plurality of logical stations are allowed to operate on a same link.

The multi-link device may implement wireless communication following the 802.11 family of standards. For example, a station supporting extremely high throughput (EHT), or a station supporting 802.11be or a station supporting a standard as well as 802.11be implements communication with another device. Certainly, the another device may be or may not be a multi-link device.

For example, the multi-link device in this embodiment of this application may be a single-antenna device, or may be a multi-antenna device. For example, the multi-link device may be a device with more than two antennas. A number of antennas included in the multi-link device is not limited in this embodiment of this application. In this embodiment of this application, the multi-link device may allow traffic of a same access type to be transmitted on different links, or even allow same data packets to be transmitted on different links. Alternatively, the multi-link device may not allow traffic of a same access type to be transmitted on different links, but may allow traffic of different access types to be transmitted on different links.

For example, the multi-link device is an apparatus having a wireless communication function. The apparatus may be a device of an entire system, or may be a chip, a processing system, or the like installed in the device of the entire system. The device on which the chip or the processing system is installed may be controlled by the chip or the processing system, to implement the method and functions in embodiments of this application. For example, the STA MLD in embodiments of this application has a wireless transceiver function, may support the 802.11 series protocols, and may communicate with an AP MLD, another STA MLD, or a single-link device. For example, the STA MLD is any user communication device that allows a user to communicate with an AP and further communicate with a WLAN. For example, the STA MLD may be user equipment that can be connected to a network, such as a tablet computer, a desktop computer, a laptop computer, a notebook computer, an ultra-mobile personal computer (UMPC), a handheld computer, a netbook, a personal digital assistant (PDA), or a mobile phone, may be an internet of things node in the internet of things, or may be a vehicle-mounted communication apparatus in the internet of vehicles. The STA MLD may alternatively be a chip and a processing system in the foregoing terminals.

The AP MLD in embodiments of this application is an apparatus that serves the STA MLD, and may support the 802.11 series protocols. For example, the AP MLD may be a communication entity such as a communication server, a router, a switch, or a bridge, or the AP MLD may include a macro base station, a micro base station, a relay station, and the like in various forms. Certainly, the AP MLD may alternatively be a chip and a processing system in the devices in various forms. In this way, the method and the function in embodiments of this application are implemented. In addition, the multi-link device may support high-rate and low-latency transmission. With continuous evolution of application scenarios of a wireless local area network, the multi-link device may be further applied to more scenarios, for example, a sensor node (for example, a smart water meter, a smart electricity meter, and a smart air detection node) in a smart city, a smart device (for example, a smart camera, a projector, a display, a television, a stereo, a refrigerator, and a washing machine) in a smart home, a node in the internet of things, an entertainment terminal (for example, a wearable device such as an AR and a VR), a smart device (for example, a printer or a projector) in a smart office, an internet of vehicles device in the internet of vehicles, and some infrastructures (for example, a vending machine, a self-service navigation console in a supermarket, a self-service cash register, and a self-service ordering machine) in a daily life scenario. Specific forms of the STA MLD and the AP MLD are not specifically limited in embodiments of this application, and are merely examples for description herein. The 802.11 protocol may be a protocol that supports the 802.11be or is compatible with that 802.11be.

A frequency band on which the multi-link device operates may include but is not limited to sub 1 GHz, 2.4 GHZ, 5 GHZ, 6 GHZ, and high frequency 60 GHz.

For example, the multi-link device in this embodiment of this application may be a single-antenna device, or may be a multi-antenna device. For example, the multi-link device in this embodiment of this application may be a device with at least two antennas. A number of antennas included in the multi-link device is not limited in this embodiment of this application. FIG. 1 is a schematic diagram of a structure in which an AP MLD has multiple antennas and a STA MLD has a single antenna. An 802.11 standard focuses on physical layer (PHY) and media access control (MAC) layer parts in the AP MLD and the STA MLD.

2. Multi-Link Cooperation Technology

To greatly improve a service transmission rate of a WLAN system, the Institute of Electrical and Electronics Engineers (IEEE) 802.11ax standard further uses an orthogonal frequency division multiple access (OFDMA) technology based on an existing orthogonal frequency division multiplexing (OFDM) technology. The OFDMA technology supports a plurality of nodes to simultaneously send and receive data to achieve multi-station diversity gains. In addition, the federal communications commission (FCC) released a new free frequency band of 5925 to 7125 MHz, where the frequency band is briefly referred to as 6 GHz below. Therefore, an operating range of an 802.11ax device is expanded from 2.4 GHz and 5 GHz to 2.4 GHz, 5 GHZ, 6 GHz, and the like.

An IEEE 802.11ax next-generation Wi-Fi protocol-extremely high throughput (EHT) device is forward compatible. Therefore, the device also supports operating spectra of the 802.11ax device, namely, the 2.4 GHZ, 5 GHZ, and 6 GHz bands. The IEEE 802.11ax next-generation Wi-Fi protocol-EHT device performs channel division based on the newly released free 6 GHz band. A supported bandwidth, for example, 320 MHz, exceeds a maximum bandwidth of 160 MHz supported on 5 GHz.

A peak throughput for the IEEE 802.11ax next-generation Wi-Fi-EHT device can be increased by using an ultra-large bandwidth, by using a larger number of streams, for example, increasing the number of streams to 16, through cooperation of a plurality of bands (2.4 GHz, 5 GHZ, and 6 GHZ), or in another manner. On a same frequency band, a peak throughput may be further increased through cooperation of a plurality of channels or in another manner. This reduces a service transmission delay. In this specification, multiple frequency bands or multiple channels are collectively referred to as multiple links.

The IEEE 802.11ax next-generation Wi-Fi-EHT device uses a multi-link cooperation technology to aggregate multiple discontinuous links to form ultra-large bandwidth. In addition to aggregating higher bandwidth, the multi-link cooperation technology may be further used for simultaneously sending data packets of a same service to a same station.

The WLAN may operate on a low frequency band, including sub 1 gigahertz (GHz), 2.4 GHz, 5 GHz, 6 GHZ, and the like. Although multiple links are configured for the 802.11ax (Wi-Fi 6) and the previous multi-band Wi-Fi, generally a different basic service set (BSS) is established for each of the multiple links, and at one moment, only one link can be used to communicate with a station in a BSS to which the link belongs, and operations on each link lack sufficient cooperation.

In the IEEE 802.11 next-generation Wi-Fi extremely high throughput (EHT) protocol, an ultra-large bandwidth on the new 6 GHz band may be used to transmit information packets, and multiple discontinuous links may also be aggregated to form an ultra-large bandwidth by using the multi-link cooperation technology. The multi-link cooperation technology can aggregate a larger bandwidth. In addition, a MAC layer may also be shared on multiple links, to flexibly transmit message packets, or simultaneously send message packets of a same service to a same station. A device that can implement the multi-link cooperation technology is referred to as a multi-link device below. An AP multi-link device and a station multi-link device may be associated on one link, so that multiple links can be quickly associated.

A non-AP MLD may perform a multi-link setup operation on one link to be simultaneously associated with multiple links of the AP MLD. A link that performs multi-link association request/response frame exchange is referred to as a transmitted link. Correspondingly, another link is referred to as a nontransmitted link. A multi-link association request/response frame carries information about multiple links (for example, a multi-link element) to implement simultaneous association of the multiple links.

3. Link Identifier

A link identifier represents one station operating on one link. In other words, if there is more than one station on one link, more than one link identifier represents the more than one station. A link mentioned below sometimes also represents a station operating on the link.

During data transmission, an AP MLD and a STA MLD may use a link identifier to identify a link or a station on a link. Before communication, the AP MLD and the STA MLD may first negotiate or communicate with each other on a correspondence between a link identifier and a link or a station on a link. Therefore, during data transmission, the link identifier is carried without transmitting a large amount of signaling information to indicate the link or the station on the link. This reduces signaling overheads and improves transmission efficiency.

In an example, a management frame, for example, a beacon frame, sent by the AP MLD when establishing a basic service set (BSS) carries one element, and the element includes multiple link identifier information fields. The link identifier information field may indicate a correspondence between a link identifier and a station that operates on a link corresponding to the link identifier. The link identifier information field includes a link identifier, and also includes one or more pieces of the following information: a MAC address, an operating class, and a channel number. One or more of the MAC address, the operating class, and the channel number may indicate one link. For an AP, a MAC address of the AP is a BSSID (BSSID) of the AP.

In another example, in a multi-link device association process, the AP MLD and the STA multi-link device negotiate multiple link identifier information fields. The multi-link device association means one association between one AP of the AP MLD and one STA of the STA MLD. The association may facilitate respective association between multiple STAs of the STA MLD and a plurality of APs of the AP MLD, where one STA is associated with one AP.

In subsequent communication, a link identifier is used by the AP MLD or the STA MLD to represent a station of the STA multi-link device, and the link identifier may further represent one or more attributes of a MAC address, an operating class, and a channel number of the station. The MAC address may be replaced with an association identifier of the AP MLD after association.

Optionally, if a plurality of stations operate on one link, a link identifier (which is a numeric ID) represents an operating class and a channel number of the link, and also represents an identifier of a station operating on the link, for example, a MAC address of the station or an association identifier (AID) of the station.

Although embodiments of this application mainly describe an example in which an IEEE 802.11 network is deployed, a person skilled in the art easily understands that various aspects of this application can be extended to other networks that use various standards or protocols, for example, BLUETOOTH, a high performance radio LAN (HIPERLAN) (a wireless standard that is similar to the IEEE 802.11 standard, and is mainly used in Europe), a wide area network (WAN), a wireless local area network (WLAN), a personal area network (PAN), or another known or later developed network. Therefore, the various aspects provided in this application are applicable to any suitable wireless network regardless of coverage and wireless access protocols.

Figure 2A:
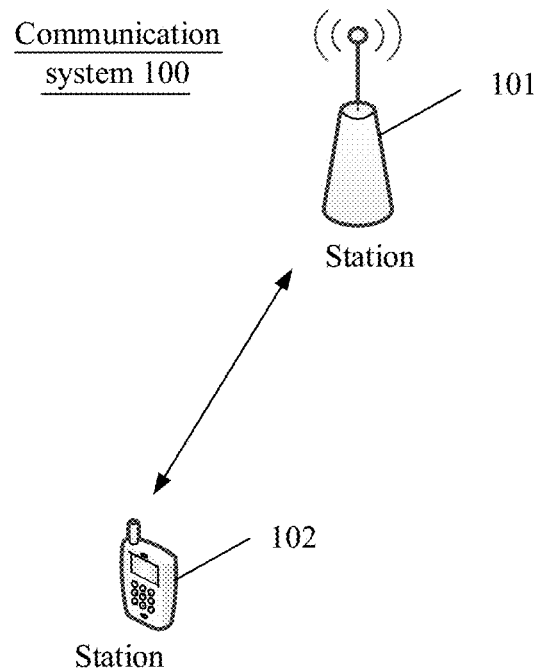
FIG. 2a is another schematic diagram of a communication system according to this application.

In FIG. 2a, a wireless local area network is used as an example to describe a communication system 100 to which an embodiment of this application is applied. The communication system 100 includes a station 101 and a station 102. The station 101 may communicate with the station 102 through multiple links, to improve a throughput. The station 101 may be a multi-link device, and the station 102 may be a single-link device, a multi-link device, or the like. In a scenario, the station 101 is an AP MLD, and the station 102 is a STA MLD or a station (for example, a single-link station). In another scenario, the station 101 is a STA MLD, and the station 102 is an AP (for example, a single-link AP) or an AP MLD. In still another scenario, the station 101 is an AP MLD, and the station 102 is an AP MLD or an AP. In still another scenario, the station 101 is a STA MLD, and the station 102 is a STA MLD or a STA (for example, a single-link station). Certainly, the wireless local area network may further include another device. A quantity and types of devices shown in FIG. 2a are merely examples.

Figure 2B:
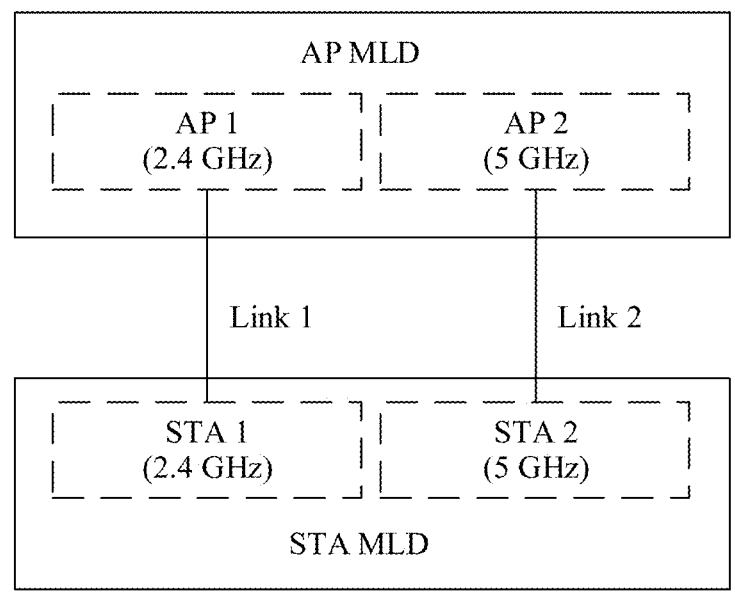
FIG. 2b is another schematic diagram of a communication system according to this application.
Figure 2C:
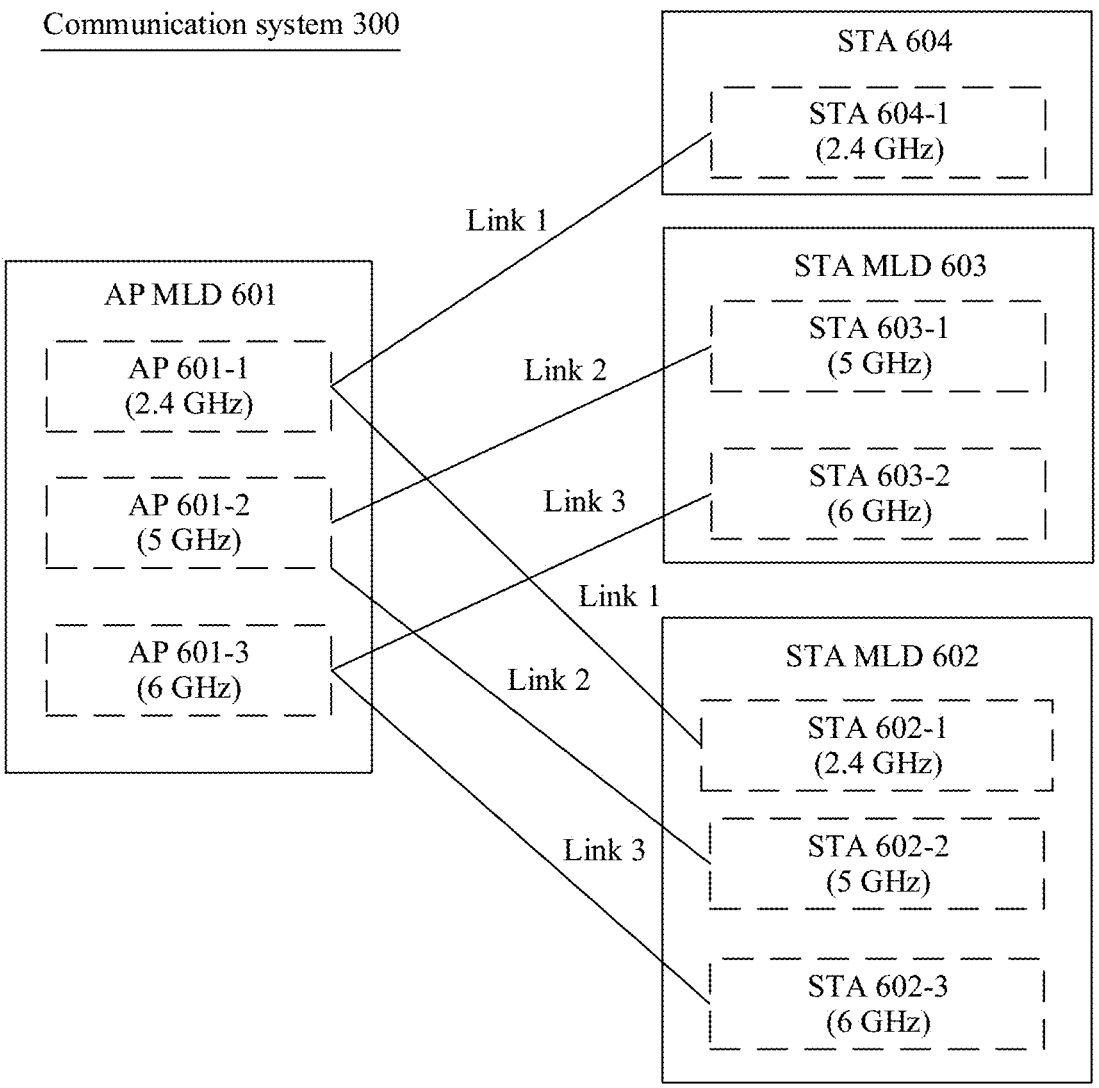
FIG. 2c is another schematic diagram of a communication system according to this application.

FIG. 2b and FIG. 2c respectively show schematic diagrams of structures of a communication system 200 and a communication system 300. In the communication system 200 and the communication system 300, for example, a multi-link device in a wireless local area network communicates with another device through multiple links.

FIG. 2b is a scenario in which an AP MLD communicates with a STA MLD. The AP MLD includes an affiliated AP 1 and an affiliated AP 2. The STA MLD includes an affiliated STA 1 and an affiliated STA 2. The AP MLD and the STA MLD communicate in parallel on a link 1 and a link 2.

FIG. 2c is a scenario in which an AP MLD 601 communicates with a STA MLD 602, a STA MLD 603, and a STA 604. The AP MLD 601 includes an affiliated AP 601-1 to an affiliated AP 601-3. The STA MLD 602 includes three affiliated STAs: a STA 602-1, a STA 602-2, and a STA 602-3. The STA MLD 603 includes two affiliated STAs: a STA 603-1 and a STA 603-2. A STA 604-1 and the STA 604 are single-link devices. The AP MLD 601 may separately use a link 1, a link 2, and a link 3 to communicate with the STA MLD 602, use the link 2 and the link 3 to communicate with the STA MLD 603, and use the link 1 to communicate with the STA 604. In an example, the STA 604 operates on the 2.4 GHz band. In the STA MLD 603, the STA 603-1 operates on the 5 GHz band, and the STA 603-2 operates on the 6 GHz band. In the STA MLD 602, the STA 602-1 operates on the 2.4 GHz band, the STA 602-2 operates on the 5 GHz band, and the STA 602-3 operates on the 6 GHz band. The AP 601-1 operating on the 2.4 GHz band in the AP MLD 601 may perform, on the link 1, uplink or downlink data transmission with the STA 604 and the STA 602-2 in the STA MLD 602. The AP 601-2 operating on the 5 GHz band in the AP MLD 601 may perform, on the link 2, uplink or downlink data transmission with the STA 603-1 operating on the 5 GHz band in the STA MLD 603, and may further perform, on the link 2, uplink or downlink data transmission with the STA 602-2 operating on the 5 GHz band in the STA MLD 602. The AP 601-3 operating on the 6 GHz band in the AP MLD 601 may perform, on the link 3, uplink or downlink data transmission with the STA 602-3 operating on the 6 GHz band in the STA MLD 602, and may further perform, on the link 3, uplink or downlink data transmission with the STA 603-2 in the STA MLD.

It should be noted that FIG. 2b shows only that the AP MLD supports two frequency bands, and FIG. 2c shows only that the AP MLD 601 supports three frequency bands (2.4 GHZ, 5 GHZ, and 6 GHZ). Each frequency band corresponds to one link. For example, the AP MLD 601 may operate on one or more links of the link 1, the link 2, or the link 3. On an AP side or a STA side, the link herein may also be understood as a station operating on the link. In actual application, the AP MLD and the STA MLD may further support more or fewer frequency bands. In other words, the AP MLD and the STA MLD may operate on more links or fewer links. This is not limited in this embodiment of this application.

4. Multi-Link Element

Figure 3:
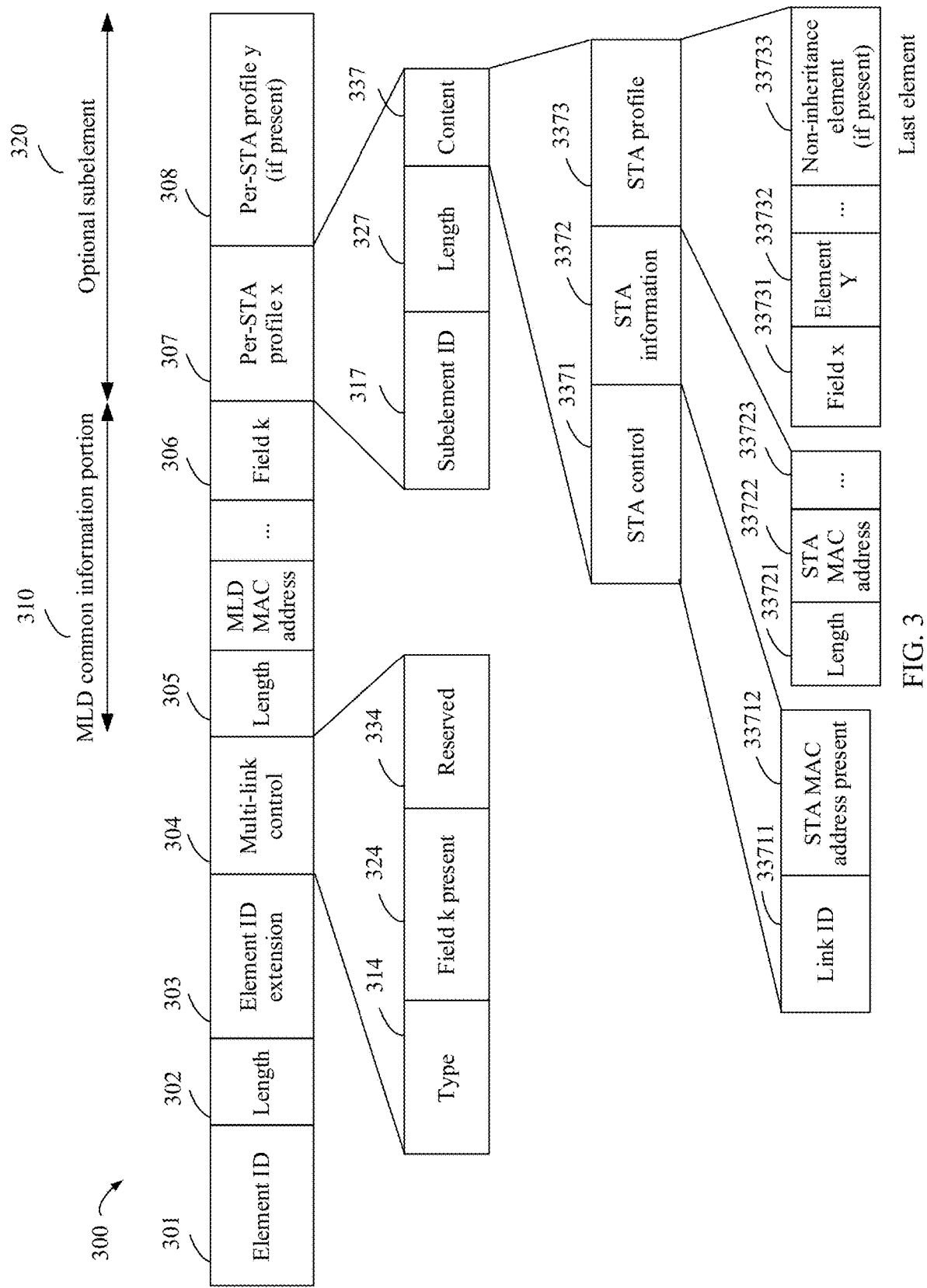
FIG. 3 is a schematic diagram of a frame format of a radio frame according to this application.

FIG. 3 is a schematic diagram of a format 300 of a multi-link element. As shown in FIG. 3, the multi-link element includes an element ID field 301, a length field 302, an element ID extension field 303, a multi-link control (Multi-Link Control) field 304, and a common information field. The common information field includes a length field 305, an MLD MAC address field, . . . , a field k (Field k) 306 such as a capabilities field, a per-STA profile x (Per-STA Profile x) field 307, and a per-STA profile y field (if present) 308.

An MLD common information portion 310 is configured to carry related information of an MLD. The per-STA profile x field 307 and the per-STA profile y field (if present) 308 that follow are an optional subelement 320, representing a per-STA profile.

Further, the multi-link control field 304 includes a type 314, a field k present 324, and reserved 334. For example, the type 314 may be a basic type, or may be a probe request type.

Optionally, the multi-link element further includes a link information portion, and the link information portion includes one or more "per-STA profiles". The per-STA profile x field 307 includes a subelement ID 317, a length 327, and content 337, where the content 337 includes a per-STA control field 3371, a STA information field 3372, and a STA profile field 3373. The per-STA control field 3371 includes a link ID 33711 and a STA MAC address present 33712. The STA information field 3372 includes a length 33721, a STA MAC address 33722, and the like. The STA profile field 3373 includes a field x 33731, . . . , an element Y 33732, . . . , and a non-inheritance element (if present) 33733.

It may be understood that another field may be further included between the MLD MAC address field 305 and the field k 306 in FIG. 3, and is not shown herein. The STA information field 3372 further includes another field, and the STA profile field 3373 further includes another field or element, such as a field 1, a field 2, . . . , an element 1, an element 2, . . . , where the non-inheritance element 33733 is the last element.

5. Multiple BSSID Set

A multiple basic service set identifier set (which may be referred to as a multiple BSSID set) may be understood as a set of some cooperative APs. All cooperative APs use a same operating class, a same channel number, and a same antenna interface. In the multiple BSSID set, there is only one transmitted BSSID AP, and other APs are nontransmitted BSSID APs. Information about the multiple BSSID set (namely, a multiple BSSID element) is carried in a beacon frame, a probe response frame, or a neighbor report sent by the transmitted BSSID AP. Information about a BSSID of the nontransmitted BSSID AP is derived by a station based on the multiple BSSID element in the beacon frame, the probe response frame, or the neighbor report. The BSSID of the nontransmitted BSSID AP is calculated by using a BSSID of a transmitted BSSID AP and a BSSID index field in a multiple BSSID-index element in a nontransmitted BSSID profile of the transmitted BSSID AP. For a specific method, refer to the Draft 802.11REVmd_D3.0 protocol.

The multiple BSSID set may also be understood as including a plurality of APs. Each AP manages one BSS, and different APs may have different SSIDs and permissions, for example, a security mechanism or a transmission opportunity.

In the multiple BSSID set, only an AP whose BSSID is a transmitted BSSID can send a beacon frame and a probe response frame, and the nontransmitted BSSID AP does not send a beacon frame. Therefore, if a probe request frame sent by a STA is sent to the AP whose BSSID is the nontransmitted BSSID in the multiple BSSID set, the AP whose BSSID is the transmitted BSSID in the multiple BSSID set helps respond to send a probe response frame.

A BSSID of one AP in the plurality of APs in the multiple BSSID set is configured as the transmitted BSSID, and a transmitted BSSID AP may be referred to as a transmitted AP. A BSSID of another AP is configured as nontransmitted BSSID, and a nontransmitted BSSID AP may be referred to as a nontransmitted AP.

The beacon frame sent by the AP corresponding to the transmitted BSSID may include a multiple BSSID element. A frame format of the multiple BSSID element is shown in FIG. 4. The multiple BSSID element includes an element ID field, a length field, a max BSSID indicator field, and an optional subelement field. The max BSSID indicator field indicates a maximum quantity $2^{\wedge}(n)$ of BSSIDs included in the multiple BSSID set. The optional subelement field includes a nontransmitted profile field corresponding to one or more nontransmitted BSSIDs.

A maximum quantity of APs allowed in the multiple BSSID set is $2^{\wedge}(n)$, and n is a value indicated by the max BSSID indicator field in the multiple BSSID element shown in FIG. 4. Therefore, bits 1 to $2^{\wedge}(n)-1$ of a service indication virtual bitmap field may be respectively allocated to nontransmitted BSSID APs in the multiple BSSID set, to respectively indicate whether the nontransmitted BSSID APs whose NonTxBSS IDs are 1 to 2n−1 have a groupcast service. A value of the NonTxBSS ID is equal to a value of the BSSID index field in the multiple BSSID-index element in the nontransmitted BSSID profile in the multiple BSSID element. The nontransmitted BSSID profile is in the optional subelement field.

For example, compared with multiple independent APs, one AP that supports multiple BSSIDs has the advantage that a scenario may be that multiple types of traffic users are supported in a small area. If different APs are used in a small area, each AP attempts to find a clean channel, and channel interference between APs cannot be avoided. Therefore, a solution in which one AP is virtualized into a plurality of APs is used, to provide services for STAs of different traffic types or different customer types.

6. Channel Switch Related Element

Generally, the channel switch related element may include one or more of the following: a channel switch announcement element, an extended channel switch announcement element, and a max channel switch time element.

A schematic diagram of a frame format of a channel switch announcement element is shown in (a) in FIG. 5. The channel switch announcement element may include an element ID (which may also be referred to as an element identifier) field, a length field, a channel switch mode field, a new channel number field, and a channel switch count field.

A schematic diagram of a frame format of an extended channel switch announcement element is shown in (b) in FIG. 5. The extended channel switch announcement element may include an element identifier field, a length field, a channel switch mode field, a new operating class field, a new channel number field, and a channel switch count field.

The channel switch count field indicates a quantity of target beacon frame transmission times (TBTT) remaining when a station for sending a channel switch announcement element or an extended channel switch announcement element switches to a new channel or a new operating class and a new channel. For example, the channel switch count field is set to 1, to indicate that switch occurs immediately before a next TBTT. The channel switch count field is set to 0, to indicate that switch occurs at any time after the frame is sent. The new channel number field indicates a channel number after channel switch. The new operating class field indicates an operating class after channel switch.

It should be noted that, a time field of each channel switch related element may refer to a beacon frame transmission time and a beacon frame interval of an AP on which channel switch is being performed.

A schematic diagram of a frame format of a max channel switch time element is shown in FIG. 6. The max channel switch time element may include an element identifier field, a length field, an element identifier extension field, and a switch time field.

7. Quiet Channel Related Element

Generally, the quiet channel related element may include one or more of the following: a quiet element and a quiet channel element.

A schematic diagram of a frame format of a quiet element is shown in FIG. 7.

Specifically, in the example shown in FIG. 7, the quiet element includes an element identifier (which may also be referred to as an element identifier) field, a length field, a quiet count field, a quiet period field, a quiet duration field, and a quiet offset field.

The quiet count field is set to a quantity of TBTTs, until a beacon interval during which a next quiet interval starts. The quiet period field is set to a quantity of beacon frame intervals between the start of regularly scheduled quiet intervals defined by the quiet element. The quiet period field set to 0 indicates that no periodic quiet interval is defined. The quiet duration field is set to the duration of the quiet interval, expressed in TUs. The quiet offset field is set to the offset of the start of the quiet interval from the TBTT specified by the quiet count field, expressed in TUs. The value of the quiet offset field is less than one beacon frame interval.

It may be understood that, after the quiet element takes effect, the AP no longer communicates with the STA, and the STA maintains a quiet state, so that the STA may perform another operation.

A schematic diagram of a frame format of a quiet channel element is shown in FIG. 8. Specifically, in the example shown in FIG. 8, the quiet channel element includes an element identifier (which may also be referred to as an element identifier) field, a length field, an AP quiet mode field, a quiet count field (this field is an optional field), a quiet period field (this field is an optional field), a quiet duration field (this field is an optional field), and a quiet offset field (this field is an optional field).

Compared with the implementation example of the quiet element shown in FIG. 7, the quiet channel element shown in FIG. 8 further includes the AP quiet mode field.

Optionally, for specific descriptions of elements in FIG. 5 to FIG. 8, refer to the 802.11-2020 standard protocol.

8. Intra-BSS PPDU and Inter-BSS PPDU

For a station, if a BSS to which a PPDU monitored by the station belongs and a BSS associated with the station are a same BSS, or a receive end/transmit end of the PPDU monitored by the station and the station belong to a same BSS, or a BSS to which a PPDU monitored by the station belongs is a PPDU from (any AP of) a same multiple BSSID set of an AP associated with the station, the PPDU is an intra-BSS PPDU (or referred to as an intra-PPDU). For example, if a BSS color/BSSID in the PPDU monitored by the station is the same as a BSS color/BSSID of the BSS associated with the station, the PPDU is the intra-BSS PPDU. For a station, if a BSS to which a PPDU monitored by the station belongs and a BSS associated with the station are not a same BSS, or a receive end/transmit end of the PPDU monitored by the station and the station do not belong to a same BSS, or a BSS to which a PPDU monitored by the station belongs is not a PPDU from (any AP of) a same multiple BSSID set of an AP associated with the station, the PPDU is an inter-BSS PPDU (or referred to as an inter-PPDU). For example, if a BSS color/BSS ID of the PPDU monitored by the station is different from a BSS color/BSS ID of the BSS associated with the station, the PPDU is the inter-BSS PPDU.

The foregoing method for determining, by the station, whether the PPDU is the intra-BSS PPDU or the inter-BSS PPDU is merely an example. For details, refer to the 802.11ax-2021 protocol.

For a station, if the station receives an inter-PPDU, the station may initiate another transmission on a same channel based on the inter-PPDU. The another transmission is based on a spatial reuse method recorded in the 802.11ax-2021 protocol.

For a station, if the station receives an inter-PPDU, the station may not further (receive or) parse the inter-PPDU, to save power (refer to the 802.11ax-2021 protocol).

In a WLAN communication process, when a communication parameter of an access point (AP) changes, the AP may need to send some specific elements to an affiliated station (STA) to indicate a related communication parameter. Generally, these specific elements may be carried in a management frame. Currently, a management frame sent by an AP may need to carry a plurality of specific elements to indicate related communication parameters of a plurality of APs. Generally, in the plurality of specific elements carried in the management frame, different specific elements respectively indicate specific elements of different APs.

However, in the foregoing implementation process, the management frame needs to carry a corresponding specific element for each AP. As a result, the management frame sent by the AP may have some repeated redundant data, causing unnecessary overheads and affecting communication efficiency.

To resolve the foregoing problem, this application provides a communication method and a communication apparatus. A value of a specific element of a first AP (or a second AP) is reused in a management frame, to indicate specific elements of a plurality of APs in a multiple BSSID set to which the first AP (or the second AP) belongs. The management frame does not need to carry a plurality of same specific elements in the multiple BSSID set. This reduces redundant data of the management frame, avoids unnecessary overheads, and improves communication efficiency.

This application relates to the management frame for WLAN communication. For ease of understanding, the following first describes an implementation process of the management frame:

In a WLAN communication process, when a channel switch related communication parameter (for example, an operating class or a channel number) of an AP changes, the AP may need to send a channel switch related element to an associated STA, to indicate the related communication parameter. In addition, if the AP detects a DFS channel, or performs channel measurement or the like, the AP may need to send a quiet channel related element to the associated STA, to indicate the related communication parameter. Generally, these elements may be carried in the management frame.

With development of WLAN technologies, a feature of the multiple BSSID set is introduced to a WLAN communication network, and the foregoing receiving and sending process of the management frame may be further applied to the communication network with the multiple BSSID set. In a same multiple BSSID set, when the communication parameters of the plurality of APs change, an AP corresponding to a transmitted BSSID in the same multiple BSSID set needs to send, to a STA associated with each AP, the channel switch related element and/or the quiet channel related element of the AP.

The following uses a plurality of implementation examples for description. In the following implementation examples, an example in which an AP whose communication parameter changes is an AP in an AP MLD (the second AP is used as an example) is used for description:

1. In a Possible Implementation Process of Sending a Management Frame

When sending the management frame (for example, a beacon frame or a probe response frame), the second AP in the AP MLD carries any one of the following channel switch related element and/or quiet channel related element of the second AP:

a channel switch announcement element, an extended channel switch announcement element, a max channel switch time element, a quiet element, a quiet channel element In this case, when (each AP of) other APs located in the same AP MLD as the second AP sends the management frame (herein for example, the AP sending the management frame is the first AP), the AP needs to carry the channel switch related element and/or the quiet channel related element of the second AP.

Optionally, the channel switch related element or the quiet channel related element or both of the second AP are carried in a per-STA profile field corresponding to the second AP in a multi-link element (a multi-link element corresponding to an MLD of the second AP, and in other words, the multi-link element carries an MLD MAC address of the MLD of the second AP) of the management frame sent by the first AP, for example, carried in a STA profile (or referred to as a station profile) field of the per-STA profile field. For example, when the multi-link element of the management frame sent by the first AP is implemented by using the frame format shown in FIG. 3, the channel switch related element and/or the quiet channel related element of the second AP may be carried in the "STA profile field 3373".

Optionally, a time field (for example, a channel switch count field, a switch time field, or a quiet duration field) in the channel switch related element and/or the quiet channel related element of the second AP refers to a beacon frame transmission time and a beacon frame interval of the second AP.

Generally, when sending the management frame, the first AP may carry only a first half of the multi-link (ML) element. In other words, the multi-link element includes an element ID field, a length field, an element ID extension field, a multi-link control field, a common information field, and the like. For example, when the multi-link element of the management frame sent by the first AP is implemented by using the frame format shown in FIG. 3, only the first half "MLD common information portion 310" in FIG. 3 may be carried, and the second half "optional subelement 320" in FIG. 3 is not carried.

In a special case, if a beacon frame that is being sent by another AP (other than the first AP) of the AP MLD carries any one of the foregoing channel switch related element and/or quiet channel related element, when the first AP of the AP MLD sends the management frame, the multi-link element of the management frame further needs to carry the per-STA profile field. The per-STA profile field includes a channel switch related element and/or quiet channel related element the same as those of the foregoing another AP (namely, the second AP) and is carried in the STA profile field. For example, when the multi-link element of the management frame sent by the first AP is implemented by using the frame format shown in FIG. 3, the first half "MLD common information portion 310" in FIG. 3 may be carried, and the second half "optional subelement 320" in FIG. 3 may be further carried. The channel switch related element or the quiet channel related element or both of the second AP are carried in the "STA profile field 3373" in the "optional subelement 320".

In other words, when sending the management frame, the first AP in the AP MLD needs to carry the channel switch related element and/or the quiet channel related element of the another AP (for example, the second AP) in the same AP MLD.

2. In Another Possible Implementation Process of Sending a Management Frame

If the second AP is an AP corresponding to a nontransmitted BSSID in the multiple BSSID set, a management frame (for example, a beacon frame or a probe response frame) sent by an AP corresponding to a transmitted BSSID in the same multiple BSSID set as the second AP carries any one of the following channel switch related element and/or quiet channel related element of the previous AP:

a channel switch announcement element, an extended channel switch announcement element, a max channel switch time element, a quiet element, a quiet channel element.

In this case, when the another AP located in the same AP MLD as the second AP is the AP corresponding to the nontransmitted BSSID, when the AP corresponding to the transmitted BSSID located in the same multiple BSSID set as the AP corresponding to the nontransmitted BSSID sends the management frame (herein for example, the AP that sends the management frame is the first AP), the channel switch related element or the quiet channel related element or both of the second AP need to be carried.

An example in which the AP sending the management frame is the first AP is still used herein. The first AP is an AP in a first AP MLD. When sending the management frame, the first AP needs to carry the channel switch related element and/or the quiet channel related element of the second AP.

The second AP is an AP in a second AP MLD. The second AP MLD is an AP MLD in which the AP corresponding to the nontransmitted BSSID in the multiple BSSID set of the first AP is located. The second AP is not an AP in the multiple BSSID set of the first AP.

For example, when the first AP sends the management frame, the management frame carries the multiple BSSID element shown in FIG. 4. In addition, the channel switch related element or the quiet channel related element or both of the second AP are located in the "optional subelement" in the multiple BSSID element shown in FIG. 4. The "optional subelement" in the multiple BSSID element indicates a related element of the AP corresponding to the nontransmitted BSSID in the multiple BSSID set of the first AP.

Optionally, when the multiple BSSID element in the management frame sent by the first AP is implemented by using the frame format shown in FIG. 4, the "optional subelement" may further include the "multi-link element" shown in FIG. 3, so that the "multi-link element" in the "optional subelement" indicates the related element of the another AP in the AP MLD in which the AP corresponding to the nontransmitted BSSID in the multiple BSSID set of the first AP is located. The channel switch related element and/or the quiet channel related element of the second AP may be located in the "multi-link element" in the "optional subelement".

In other words, when sending the management frame, the first AP in the first AP MLD needs to carry the channel switch related element and/or the quiet channel related element of the second AP in the second AP MLD. The second AP is an AP in the second AP MLD. The second AP MLD is an AP MLD in which the AP corresponding to the nontransmitted BSSID in the multiple BSSID set of the first AP is located. The second AP is not an AP in the multiple BSSID set of the first AP.

Optionally, when the second AP is switching to a new operating class and a new channel number toward a target time point, the following conditions are met.

(1) Before the channel target time point, when (each of) other APs in the same AP MLD as the second AP sends the beacon frame and the probe response frame, an operating class and channel number field of the second AP in a reduced neighbor report (reduced neighbor report element, RNR for short) element that needs to be carried is configured in an operating class and channel number that operates before the time point (namely, before switch). If (each of) other APs in the same AP MLD as the second AP is the AP corresponding to the nontransmitted BSSID, the RNR element that needs to be carried when the AP corresponding to the transmitted BSSID in the same multiple BSSID set sends the beacon frame and the probe response frame is configured in the same way.

(2) After the channel target time point, when (each of) other APs in the same AP MLD as the second AP sends the beacon frame and the probe response frame, an operating class and channel number field of the second AP in the RNR element that needs to be carried is carried in an operating class and channel number that operates after the time point (namely, after switch). If (each of) other APs in the same AP MLD as the second AP is the AP corresponding to the nontransmitted BSSID, the RNR element that needs to be carried when the AP corresponding to the transmitted BSSID in the same multiple BSSID set sends the beacon frame and the probe response frame is configured in the same way.

3. In a Possible Implementation Process of Receiving a Management Frame

The STA receives the management frame. Herein, an example in which the STA is a STA in the non-AP MLD is used for description (the STA receiving the management frame may also be a single-link device, and this is only an example).

If the STA in the non-AP MLD receives the management frame (for example, the beacon frame or the probe response frame) sent by the first AP, and the management frame includes the channel switch related element and/or the quiet channel related element of the second AP (different from a management frame transmit end AP) in the same AP MLD as the management frame transmit end AP, the STA associated with the second AP in the non-AP MLD is like receiving a parameter of the second AP.

For example, a STA 1 in the non-AP MLD receives a management frame sent by an AP 1 in the AP MLD, and the management frame carries the channel switch announcement element that is being sent by an AP 2 in the AP MLD. In this case, a STA 2 in the non-AP MLD may learn of the channel switch announcement element sent by the AP 2, to obtain information such as a switched operating class and channel number of the AP 2.

It should be noted that, in this case, the STA 2 in the non-AP MLD may not actually receive the foregoing element, but receives the foregoing element by using another STA (for example, the STA 1) in the same MLD.

It may be learned from the foregoing implementation process of the management frame that, the management frame sent by the AP may need to carry a plurality of channel switch related elements and/or quiet channel related elements, and the plurality of elements may respectively indicate elements corresponding to a plurality of APs in a same multiple BSSID set. Because different APs in the same multiple BSSID set correspond to a same specific element, the management frame sent by the AP corresponding to the transmitted BSSID may have some repeated redundant data.

The following uses an implementation example to describe a possible implementation of the repeated redundant data.

An application scenario of the following implementation example may be that an AP (namely, the AP corresponding to the transmitted BSSID) that sends the management frame and an AP (namely, the AP corresponding to the nontransmitted) whose communication parameter changes are located in the same multiple BSSID set.

Figure 9:
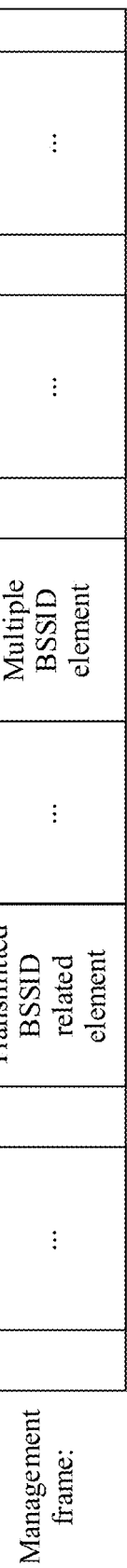
FIG. 9 is an schematic diagram of a frame format of a management frame according to this application.

For example, FIG. 9 is a schematic diagram of a frame format of a management frame. In FIG. 9, the management frame includes a related element of a transmitted BSSID, and is used to carry a channel switch related element and/or a quiet channel related element of the transmitted BSSID. The management frame further includes a multiple BSSID element. The multiple BSSID element includes one or more nontransmitted BSSID profiles, where each nontransmitted BSSID profile carries an information element or a field of a nontransmitted BSSID AP corresponding to the nontransmitted BSSID profile.

Specifically, for the multiple BSSID set, because APs corresponding to each BSSID need to operate on a same channel, all APs in the multiple BSSID set should have a same operation for channel switch. In the multiple BSSID set, only an AP corresponding to the transmitted BSSID can send the management frame. When all APs in the multiple BSSID set switch channels, a beacon frame sent by the transmitted BSSID AP includes a channel switch related element of the AP corresponding to the transmitted BSSID, and further includes a multiple BSSID element, and a nontransmitted profile corresponding to each nontransmitted BSSID in the multiple BSSID element carries a channel switch related element of the corresponding nontransmitted BSSID. Therefore, the beacon frame has certain redundancy, and air interface efficiency is reduced. The channel switch related element includes at least one of a channel switch announcement element, an extended channel switch announcement element, and a max channel switch time element.

In addition, for the quiet channel related element, because the quiet channel related element is used to avoid that the STA performs dynamic frequency selection (DFS) on a quiet channel, or is used to avoid that the STA performs channel measurement on the quiet channel, all APs in the same multiple BSSID set should have a same operation on the quiet channel. Similar to the foregoing channel switch, the AP of the transmitted BSSID needs to include, in the management frame, the quiet channel related element of the transmitted BSSID of the AP, and also needs to include, in the nontransmitted profile corresponding to each nontransmitted BSSID in the multiple BSSID element in the beacon frame, the quiet channel related element corresponding to the nontransmitted BSSID. This also causes a redundancy problem of the beacon frame.

Optionally, the multiple BSSID element used to carry the channel switch related element and/or the quiet channel related element of the AP corresponding to the nontransmitted BSSID may be implemented by using the frame format shown in FIG. 4. The "optional subelement" in FIG. 4 may further include the "multi-link element" shown in FIG. 3, so that the "multi-link element" in the "optional subelement" indicates the related element of the another AP in the AP MLD in which the AP corresponding to the nontransmitted BSSID in the multiple BSSID set of the AP corresponding to the transmitted BSSID is located. The channel switch related element and/or the quiet channel related element of the second AP may be located in the "multi-link element" in the "optional subelement".

In other words, when the management frame sent by the AP corresponding to the transmitted BSSID is implemented by using the frame format shown in FIG. 9, a "transmitted BSSID related element" needs to carry the channel switch related element and/or the quiet channel related element of the AP corresponding to the transmitted BSSID, and the "multiple BSSID element" needs to carry the channel switch related element and/or the quiet channel related element of the AP corresponding to the nontransmitted BSSID. Because the channel switch related element and/or the quiet channel related element of the AP corresponding to the transmitted BSSID and the channel switch related element and/or the quiet channel related element of the AP corresponding to the nontransmitted BSSID are the same, the management frame has redundant data, causing unnecessary overheads and affecting communication efficiency.

To resolve a problem that when the AP (namely, the AP corresponding to the transmitted BSSID) that sends the management frame and the AP (namely, the AP corresponding to the nontransmitted) whose communication parameter changes are located in the same multiple BSSID set, the management frame sent by the AP may need to carry a plurality of channel switch related elements and/or quiet channel related elements. The following resolves the problem in an implementation shown in FIG. 10.

Figure 10:
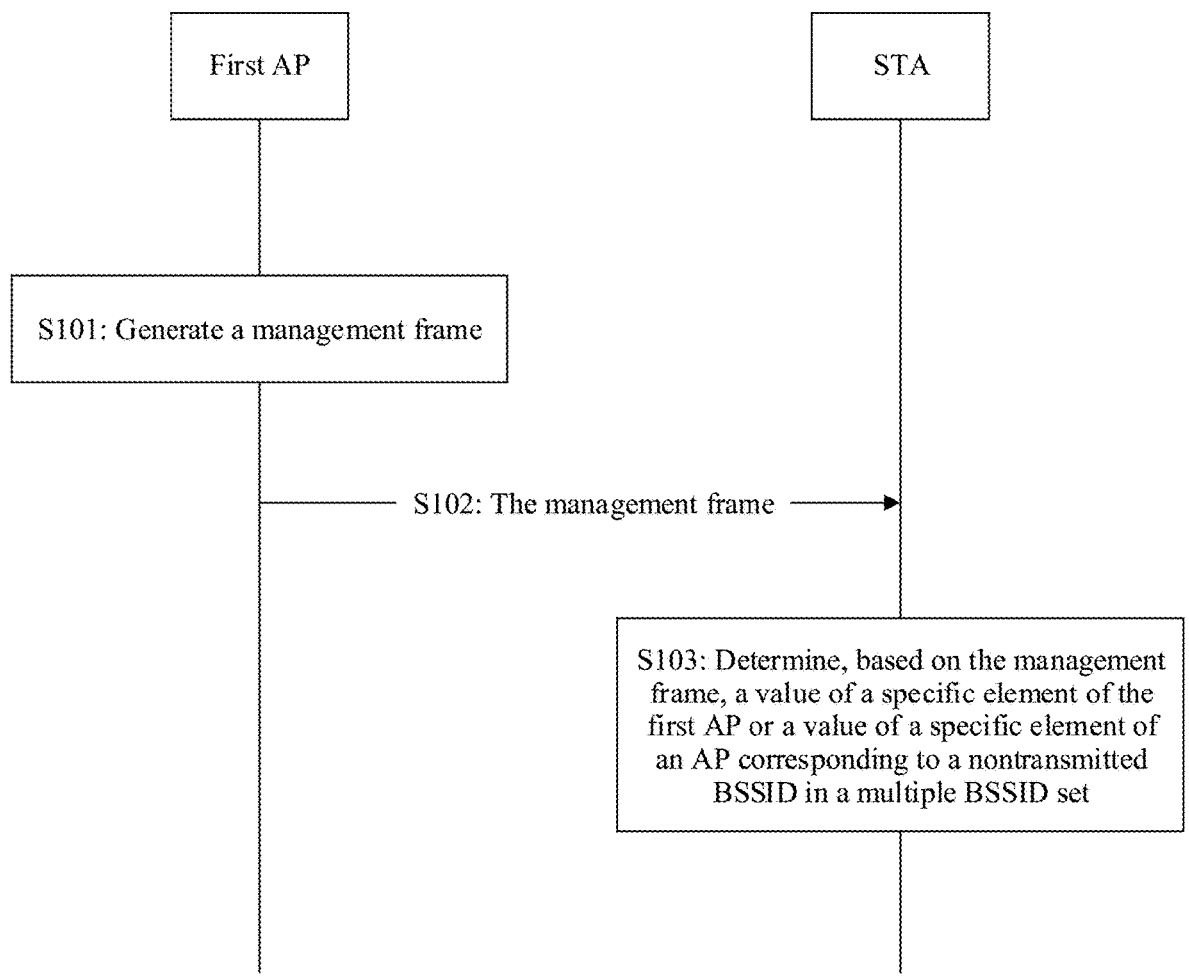
FIG. 10 is a schematic diagram of a communication method according to this application.

FIG. 10 is a schematic flowchart of a communication method according to an embodiment of this application. The method includes the following steps.

S101: A first AP generates a management frame.

In this embodiment, the first AP generates the management frame in step S101, where the management frame includes a specific element of the first access point AP, the first AP is an AP corresponding to a transmitted BSSID in a multiple BSSID set, and a value of a specific element of an AP corresponding to a nontransmitted BSSID in the multiple BSSID set is the same as a value of the specific element of the first AP.

S102: The first AP sends the management frame.

In this embodiment, the first AP sends the management frame in step S102. Correspondingly, a STA receives the management frame in step S102.

Optionally, the first AP may perform sending preprocessing on the management frame, and send, in step S102, a processing result obtained through the sending preprocessing. For example, the sending preprocessing may include encryption and scrambling.

Correspondingly, the STA may receive the processing result (obtained by performing the sending preprocessing on the management frame by the first AP), and perform receiving preprocessing on the processing result in step S102 to obtain the management frame. For example, the receiving preprocessing may include decryption and descrambling.

S103: The STA determines, based on the management frame, the value of the specific element of the first AP or the value of the specific element of the AP corresponding to the nontransmitted BSSID in the multiple BSSID set.

In this embodiment, when the STA is a STA associated with the first AP, the STA determines, based on the management frame, the value of the specific element of the first AP in step S103; or when the STA is a STA associated with the nontransmitted BSSID in the multiple BSSID set, the STA determines, based on the management frame in step S103, the value of the specific element of the AP that corresponds to the nontransmitted BSSID in the multiple BSSID set and that is associated with the STA. In other words, the STA determines, based on the management frame in step S103, the specific element of the AP associated with the STA.

Specifically, in step S101, when the first AP starts to perform (or performs after preset duration, or is performing) a related operation (for example, channel switch or channel quieting) of the specific element, the specific element of the first AP needs to be carried in the management frame in step S101 to indicate specific elements of a plurality of APs.

Optionally, in the management frame generated by the first AP in step S101, the value of the specific element of the AP corresponding to the nontransmitted BSSID in the multiple BSSID set is the same as the value of the specific element of the first AP may also be expressed as that a value of a specific element of another AP other than the first AP in the multiple BSSID set is the same as the value of the specific element of the first AP, or may be expressed as that values of specific elements of all APs in the multiple BSSID set are the same, or may be expressed as that every two of values of specific elements of all APs in the multiple BSSID set are the same, or may be expressed as that common specific elements of all APs in the multiple BSSID set are the same, and the multiple BSSID set included in the management frame does not include the common specific elements of all the APs in the multiple BSSID set.

In a first possible implementation, the management frame generated by the first AP in step S101 further includes a multiple BSSID element, and the multiple BSSID element does not include the specific element of the AP corresponding to the nontransmitted BSSID.

Specifically, the multiple BSSID element in the management frame does not include the specific element of the AP corresponding to the nontransmitted BSSID. In other words, the specific element of the first AP also indicates the specific element of the AP corresponding to the nontransmitted BSSID. Therefore, the specific element of the first AP is reused to indicate specific elements of a plurality of APs (including the first AP and the AP corresponding to the nontransmitted BSSID). This avoids redundant data carried in the management frame, reduces overheads, and improves communication efficiency.

In a possible implementation, the management frame sent by the first AP in step S101 is a beacon frame or the management frame is a probe response frame.

In a possible implementation, the specific element includes at least one of the following: a channel switch announcement element, an extended channel switch announcement element, a quiet element, a quiet channel element, and a max channel switch time element.

Based on the foregoing technical solution, the specific element carried in the management frame may include at least one of the foregoing items. In other words, the specific element includes a channel switch related element and/or a quiet channel related element, to indicate channel switch related information and/or quiet related information.

Based on the foregoing technical solution, the management frame sent by the first AP in step S102 includes the specific element of the first AP, the first AP is the AP corresponding to the transmitted BSSID in the multiple BSSID set, and the value of the specific element of the AP corresponding to the nontransmitted BSSID in the multiple BSSID set is the same as the value of the specific element of the first AP. In this way, when a receiver of the management frame is a STA associated with the first AP, a corresponding value may be determined by using the specific element of the first AP carried in the management frame in step S103, and when the receiver of the management frame is a STA associated with the nontransmitted BSSID in the multiple BSSID set, the corresponding value may also be determined by using the specific element of the first AP carried in the management frame in step S103. In other words, the value of the specific element of the first AP is reused in the management frame, to indicate the specific element of the AP corresponding to the nontransmitted BSSID in the multiple BSSID set to which the first AP belongs. The management frame does not need to carry a plurality of same specific elements in the multiple BSSID set. This reduces redundant data of the management frame, avoids unnecessary overheads, and improves communication efficiency.

Figure 11A:
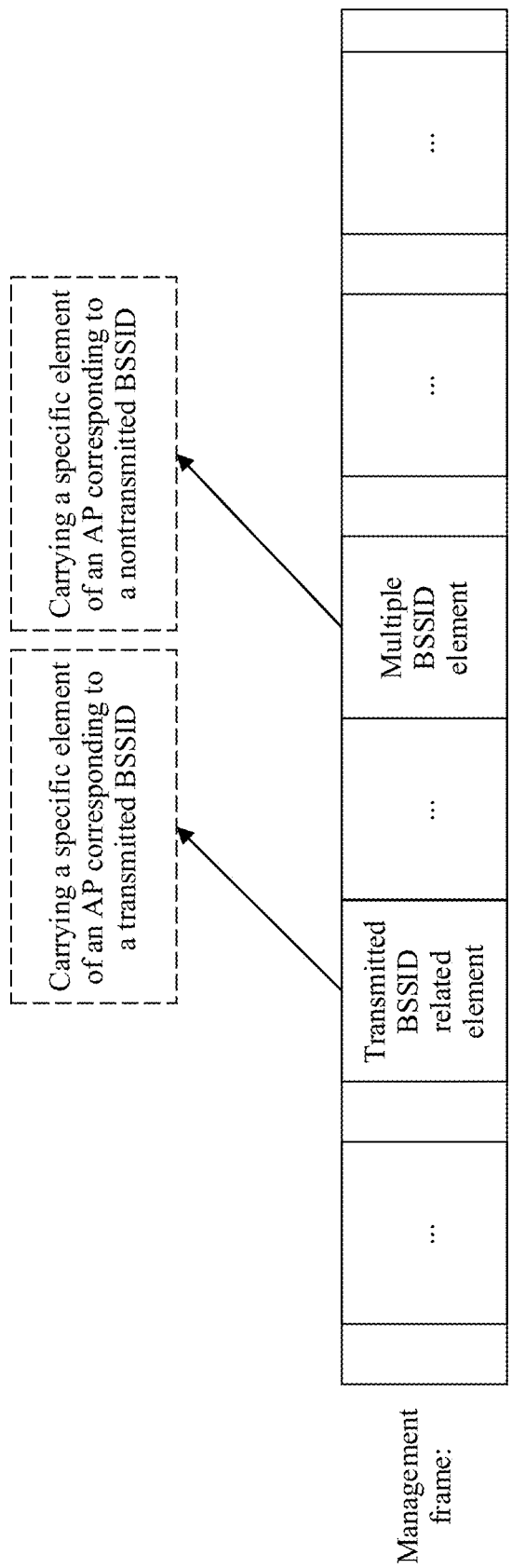
FIG. 11a is another schematic diagram of a frame format of a management frame according to this application.
Figure 11B:
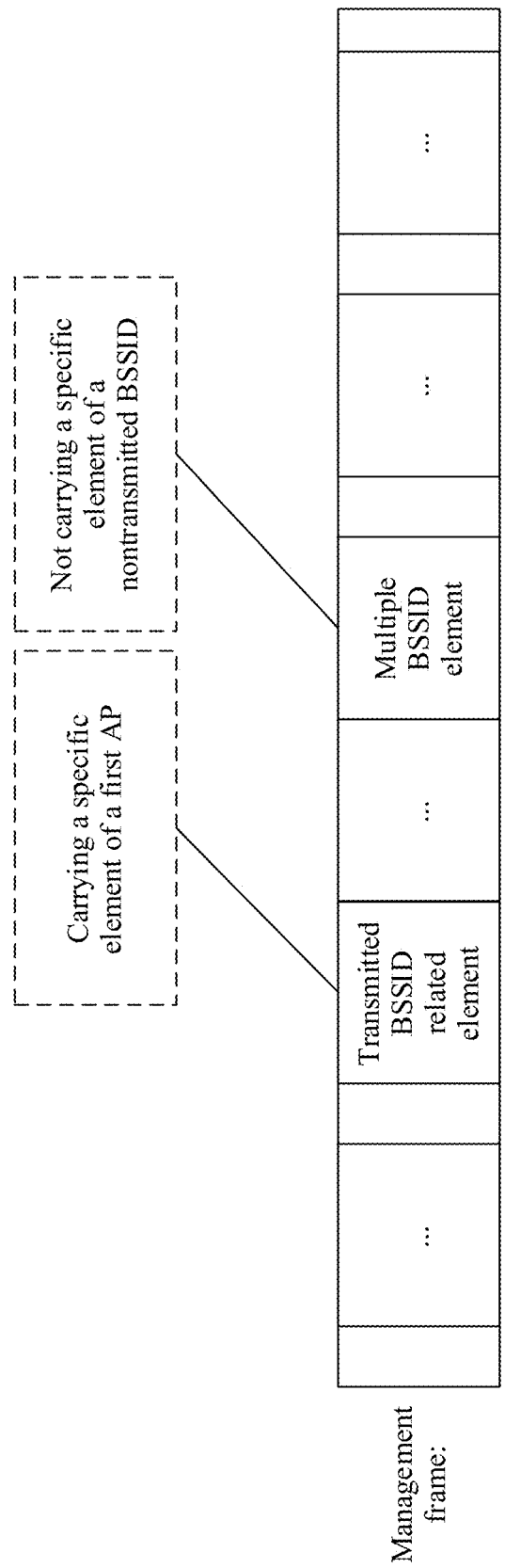
FIG. 11b is another schematic diagram of a frame format of a management frame according to this application.

In addition, according to the foregoing technical solution, when the management frame sent by the first AP is implemented by using the frame format shown in FIG. 9, the frame format of the management frame shown in FIG. 9 may also be represented as an implementation example shown in FIG. 11*a* and FIG. 11*b*. In the implementation examples shown in FIG. 11*a* and FIG. 11*b*, an example in which an AP that generates (or sends) the management frame is the first AP, and an AP that performs a related operation (for example, channel switch or channel quieting) of the specific element is the second AP is used for description.

In an implementation example, FIG. 11*a* shows an implementation example of the management frame before the communication method shown in FIG. 10 is applied. The management frame includes a related element of the transmitted BSSID, and the related element of the transmitted BSSID carries the specific element of the AP (namely, the first AP) corresponding to the transmitted BSSID. The management frame further includes a multiple BSSID element, and the multiple BSSID element carries the specific element of the AP (namely, the second AP) corresponding to the nontransmitted BSSID.

In an implementation example, FIG. 11*b* shows an implementation example of the management frame after the communication method shown in FIG. 10 is applied. The management frame includes a related element of the transmitted BSSID, and the related element of the transmitted BSSID carries the specific element of the AP (namely, the first AP) corresponding to the transmitted BSSID. The management frame further includes a multiple BSSID element, and the multiple BSSID element does not carry the specific element of the AP (namely, the second AP) corresponding to the nontransmitted BSSID.

Because the first AP and the second AP belong to the same multiple BSSID set, the value of the specific element of the first AP is the same as the value of the specific element of the second AP. In this way, a plurality of STAs (including the STA associated with the first AP and the STA associated with the second AP) may receive "the related element of the transmitted BSSID" in the management frame, and obtain the value of the specific element of the first AP included in the "related element of the transmitted BSSID" in step S103. The plurality of STAs may determine, based on the value of the specific element of the first AP, the value of the specific element of the AP associated with each STA. The "multiple BSSID element" in the management frame does not need to carry the specific element of the second AP. This reduces redundant data of the management frame, avoids unnecessary overheads, and improves communication efficiency.

It may be learned from the foregoing implementation process of the management frame that, the management frame sent by the AP may need to carry a plurality of channel switch related elements and/or quiet channel related elements, and the plurality of elements may respectively indicate elements corresponding to a plurality of APs in a same multiple BSSID set. Because different APs in the same multiple BSSID set correspond to a same specific element, the management frame sent by the AP corresponding to the transmitted BSSID may have some repeated redundant data.

The following uses another implementation example to describe a possible implementation of the repeated redundant data.

An application scenario of the following implementation example may be that the AP (for example, the first AP) that sends the management frame and the AP (for example, the second AP) whose communication parameter changes are located in different multiple BSSID sets. The first AP is an AP in the first AP MLD. The second AP is an AP in the second AP MLD. The second AP MLD is an AP MLD in which the AP corresponding to the nontransmitted BSSID in the multiple BSSID set of the first AP is located. The second AP is not an AP in the multiple BSSID set of the first AP.

Figure 12:
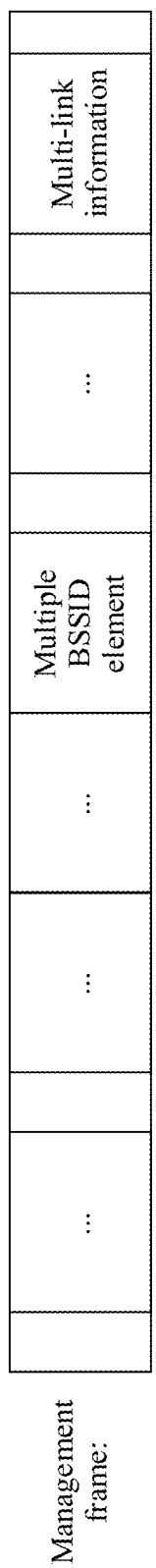
FIG. 12 is another schematic diagram of a frame format of a management frame according to this application.

For example, FIG. 12 is a schematic diagram of a frame format of a management frame.

In FIG. 12, the management frame includes a multiple BSSID element, the multiple BSSID element includes one or more nontransmitted BSSID profiles, and each nontransmitted BSSID profile carries an information element or a field of a nontransmitted BSSID AP corresponding to the nontransmitted BSSID profile.

Optionally, when the first AP sends the management frame, the management frame carries the multiple BSSID element shown in FIG. 4. In addition, the channel switch related element or the quiet channel related element or both of the second AP are located in the "optional subelement" in the multiple BSSID element shown in FIG. 4. The "optional subelement" in the multiple BSSID element indicates a related element of the AP corresponding to the nontransmitted BSSID in the multiple BSSID set of the first AP. The channel switch related element and/or the quiet channel related element of the second AP may be located in the "optional subelement".

In addition, when the multiple BSSID element in the management frame sent by the first AP is implemented by using the frame format shown in FIG. 4, the "optional subelement" may further include the "multi-link element" shown in FIG. 3, so that the "multi-link element" in the "optional subelement" indicates the related element of the another AP in the AP MLD in which the AP corresponding to the nontransmitted BSSID in the multiple BSSID set of the first AP is located. The channel switch related element and/or the quiet channel related element of the second AP may be located in the "multi-link element" in the "optional subelement".

In FIG. 12, the management frame further includes a multi-link element. The multi-link element includes one or more per-STA profiles, and is used to carry elements and fields of corresponding STAs (including an AP and a non-AP STA).

Optionally, when the multi-link element of the management frame sent by the first AP is implemented by using the frame format shown in FIG. 3, the first half "MLD common information portion 310" in FIG. 3 may be carried, and the second half "optional subelement 320" in FIG. 3 may be further carried. The channel switch related element or the quiet channel related element or both of the second AP are carried in the "STA profile field 3373" in the "optional subelement 320".

Herein, an example in which the first AP is an AP in the AP MLD is used for description. The first AP may also be a single-link device. Herein, only an example in which the first AP is an AP in the AP MLD is used. The first AP MLD is denoted as an AP MLD in which the first AP is located, and a maximum quantity of first AP MLDs is 1. The second AP MLD is an AP MLD in which the AP corresponding to the nontransmitted BSSID in the multiple BSSID set of the first AP is located. A quantity of second AP MLDs may be 0, 1, or more. The AP MLD includes one or more APs.

Figure 13:
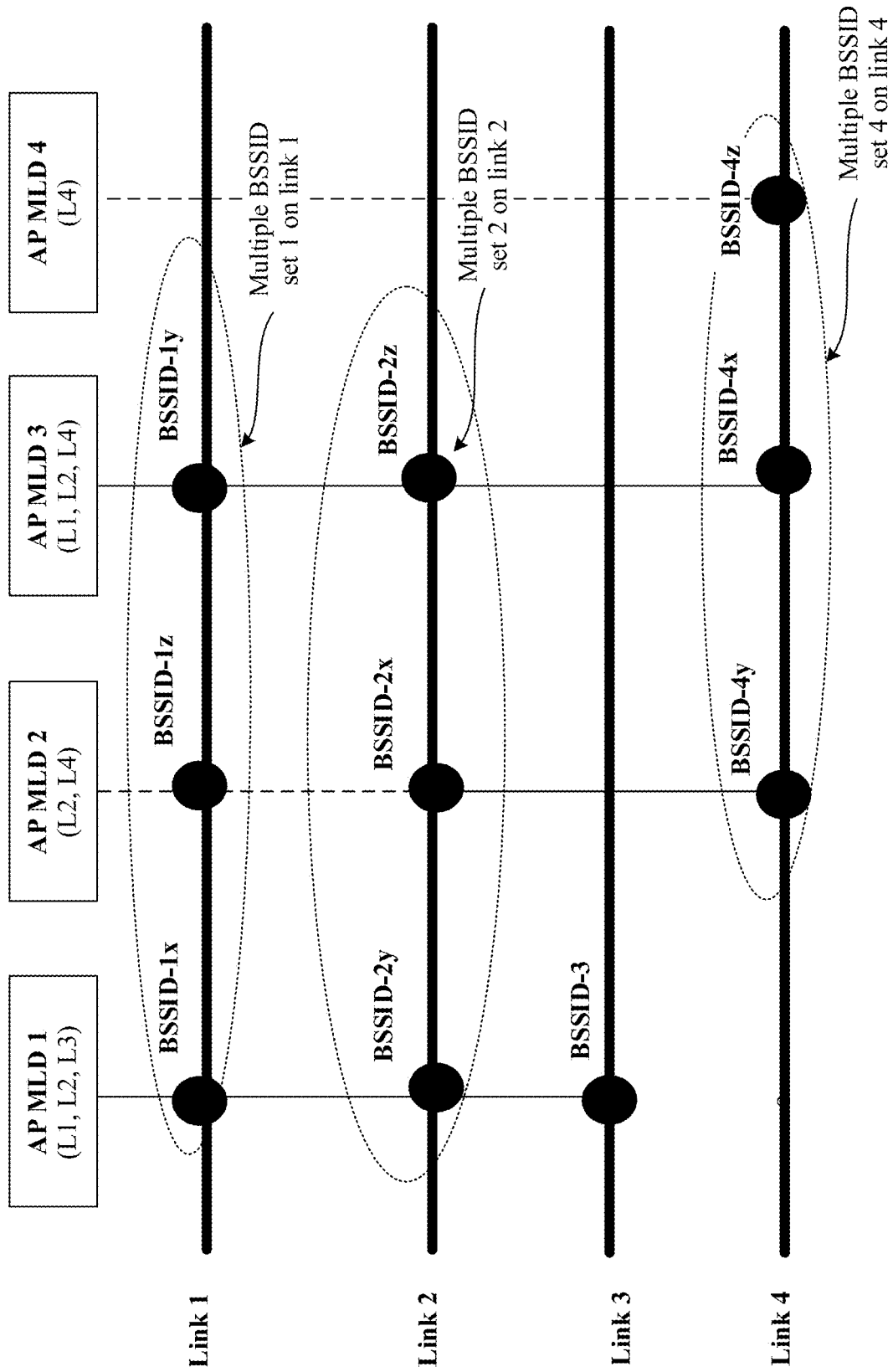
FIG. 13 is another schematic diagram of a communication system according to this application.

For example, in the scenario shown in FIG. 13, four AP MLDs are included. An AP MLD 1 includes an AP numbered BSSID-1x (corresponding to a link L1), an AP numbered BSSID-2y (corresponding to a link L2), and an AP numbered BSSID-3 (corresponding to a link L3). An AP MLD 2 includes an AP numbered BSSID-1z (corresponding to the link L1), an AP numbered BSSID-2x (corresponding to the link L2), and an AP numbered BSSID-4y (corresponding to a link L4). An AP MLD 3 includes an AP numbered BSSID-1y (corresponding to the link L1), an AP numbered BSSID-2z (corresponding to the link L2), and an AP numbered BSSID-4x (corresponding to the link L4). An AP MLD 4 includes an AP numbered BSSID-4z (corresponding to the link L4). It should be noted that a link number and a link identifier in the figure are not a same concept. The link identifier represents a group of the following for identifying a specific AP: an operating class, a channel number, and a MAC address (or a BSSID) of an AP.

For example, an AP ended with a number "x" is an AP corresponding to a transmitted BSSID, and an AP ended with another number (for example, "y" or "z") is an AP corresponding to a nontransmitted BSSID. To be specific, a multiple BSSID set 1 on the link 1 includes a transmitted BSSID BSSID-1x and nontransmitted BSSIDs BSSID-1z and BSSID-1y; a multiple BSSID set 2 on the link 2 includes a transmitted BSSID BSSID-2x and nontransmitted BSSIDs BSSID-2z and BSSID-2y; the link 3 includes BSSID-3 (which may be considered as not belonging to a multiple BSSID set, and therefore does not need to be distinguished between a transmitted BSSID and a nontransmitted BSSID); and a multiple BSSID set 4 on the link 4 includes a transmitted BSSID BSSID-4x and nontransmitted BSSIDs BSSID-4z and BSSID-4y.

For ease of description, an "AP corresponding to BSSID-n" is briefly referred to as an "AP-n" below. In the scenario shown in FIG. 13, n may be 1x, 1y, 1z, 2x, 2y, 2z, 3, 4x, 4y, 4z, or the like.

In the scenario shown in FIG. 13, when an AP (for example, an AP-1y) in the multiple BSSID set 1 on the link 1 performs the foregoing process of the channel switch related element and/or the quiet channel related element, a management frame sent by another AP, for example, an AP-2z and an AP-4y, located in a same MLD as the AP-1y also needs to carry the corresponding element. Because the AP-2z is an AP corresponding to a nontransmitted BSSID, the corresponding element needs to be transmitted by a transmitted BSSID (namely, an AP-2x) of the AP-2z, and is located in a multi-link element in a nontransmitted BSSID profile corresponding to the AP-2z in the multiple BSSID element of the management frame.

Similarly, because all APs in the multiple BSSID set perform the foregoing same operation of the channel switch related element and/or the quiet channel related element, the AP-1z and the AP-1x also perform the same operation. In this case, another AP corresponding to the AP MLD 2 and the AP MLD 1 also needs to carry the corresponding element when sending the management frame. For example, the AP-2x in the AP MLD 2 needs to carry a corresponding element of the AP-1z, and the AP-2y in the AP MLD 1 needs to carry a corresponding element of the AP-1x and is located in a per-STA profile field corresponding to the AP-1z in the multi-link element of the management frame. In addition, because the AP-2y is an AP corresponding to a nontransmitted BSSID, the corresponding element is transmitted by a transmitted BSSID (namely, the AP-2x) in the multiple BSSID set in which the AP-2y is located, and is located in a multi-link element in a nontransmitted BSSID profile corresponding to the AP-2y in the multiple BSSID element of the management frame sent by the AP-2x.

Therefore, for the process of the channel switch related element and/or the quiet channel related element that is being performed by an AP in the multiple BSSID set in which the AP-1y is located, the AP-2x needs to carry three channel switch related elements and/or quiet channel related elements when sending the management frame (for example, a beacon frame or a probe response frame), where one is carried in a corresponding element (for indicating a specific element corresponding to the BSSID-1z) of the AP-1z carried in the multi-link element of the management frame, and the other two pieces are respectively carried in a multi-link element (for indicating a specific element corresponding to the BSSID-1y) in a nontransmitted BSSID profile corresponding to the AP-2z in the multiple BSSID element of the management frame and a multi-link element (for indicating a specific element corresponding to the BSSID-1x) in a nontransmitted BSSID profile corresponding to the AP-2y in the multiple BSSID element of the management frame.

In conclusion, when a management frame sent by an AP carries a plurality of channel switch related elements and/or quiet channel related elements, a plurality of elements may indicate elements corresponding to a same BSSID set (where the "same BSSID set" may not be a BSSID set in which the AP is located). Because different APs in the same multiple BSSID set correspond to a same element, the management frame sent by the AP corresponding to the transmitted BSSID may have some redundant data, causing unnecessary overheads and affecting communication efficiency.

In other words, when an AP (including the AP-1x, the AP-1z, and the AP-1y) on the link 1 in the scenario in FIG. 13 starts to perform (or performs after preset duration, or is performing) a related operation (for example, channel switch or channel quieting) of a specific element, the following conditions are met.

When the management frame sent by the AP-2x is implemented by using the frame format shown in FIG. 12, the "multiple BSSID element" of the management frame needs to carry a related element of an AP (including the AP-2y and the AP-2z) corresponding to a nontransmitted BSSID. A related element of the AP-2y includes a channel switch related element and/or a quiet channel related element located in a same AP MLD (including at least the AP-1x) as the AP-2y. A related element of the AP-2z includes a channel switch related element and/or a quiet channel related element located in a same AP MLD (including at least the AP-1y) as the AP-2z.

In addition, when the management frame sent by the AP-2x is implemented by using the frame format shown in FIG. 12, the "multi-link element" of the management frame needs to carry a channel switch related element and/or a quiet channel related element located in a same AP MLD (including at least the AP-1z) as the AP-2x.

Because the channel switch related element and/or the quiet channel related element of the AP-1x, the AP-1z, and the AP-1y are the same, the management frame has redundant data, causing unnecessary overheads and affecting communication efficiency.

To resolve a problem that when the AP (namely, the AP corresponding to the transmitted BSSID) that sends the management frame and the AP (namely, the AP corresponding to the nontransmitted) whose communication parameter changes are located in different multiple BSSID sets, the management frame sent by the AP may need to carry a plurality of channel switch related elements and/or quiet channel related elements. The following resolves the problem in an implementation shown in FIG. 14.

Figure 14:
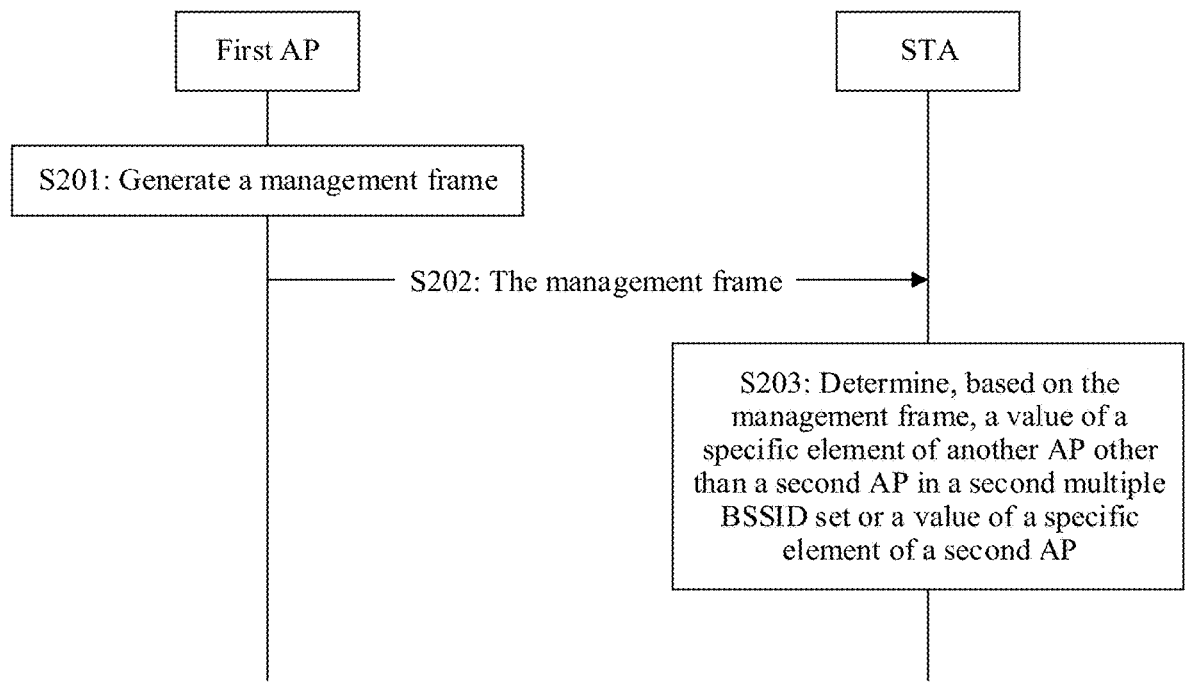
FIG. 14 is another schematic diagram of a communication method according to this application.

FIG. 14 is a schematic flowchart of a communication method according to an embodiment of this application. The method includes the following steps.

S201: A first AP generates a management frame.

In this embodiment, the first AP generates the management frame in step S201, where the management frame includes a specific element of a second AP.

Specifically, in step S201, when the second AP starts to perform (or performs after preset duration, or is performing) a related operation (for example, channel switch or channel quieting) of the specific element (namely, when a beacon frame sent by the second AP carries any one of specific elements), the specific element of the second AP needs to be carried in the management frame in step S201 to indicate specific elements of a plurality of APs.

The first AP is an AP corresponding to a transmitted BSSID in a first multiple BSSID set, the second AP belongs to a second multiple BSSID set, and a value of the specific element of the second AP is the same as a value of a specific element of another AP other than the second AP in the second multiple BSSID set.

In a possible implementation, the first AP belongs to a first access point multi-link device AP MLD.

Optionally, the first AP MLD includes one or more APs. For example, when the first AP MLD includes only the first AP, the first AP MLD may also be referred to as a single-link device; or the first AP MLD may further include another AP other than the first AP.

In a possible implementation, the second AP is another AP other than the first AP in the first AP MLD.

In a possible implementation, the second AP is an AP in a second AP MLD, the second AP is not an AP corresponding to a nontransmitted BSSID in the first multiple BSSID set, and the second AP MLD is an AP MLD in which the nontransmitted BSSID in the first multiple BSSID set is located.

Optionally, that the second AP is an AP in a second AP MLD and the second AP is not an AP corresponding to a nontransmitted BSSID in the first multiple BSSID set may be expressed as that the second AP is another AP in the second AP MLD other than the AP corresponding to the nontransmitted BSSID in the first multiple BSSID set, or may be expressed as that the second AP is another AP in the second AP MLD other than an AP corresponding to the first multiple BSSID set.

In a possible implementation, the second AP includes another AP other than the first AP in the first AP MLD; or the second AP includes an AP in a second AP MLD, the second AP is not an AP corresponding to a nontransmitted BSSID in the first multiple BSSID set, and the second AP MLD is an AP MLD in which the AP corresponding to the nontransmitted BSSID in the first multiple BSSID set is located.

Optionally, that the second AP includes an AP in a second AP MLD and the second AP is not an AP corresponding to a nontransmitted BSSID in the first multiple BSSID set may be expressed as that the second AP includes another AP in the second AP MLD other than the AP corresponding to the nontransmitted BSSID in the first multiple BSSID set, or may be expressed as that the second AP includes another AP in the second AP MLD other than an AP corresponding to the first multiple BSSID set.

S202: The first AP sends the management frame.

In this embodiment, the first AP generates the management frame in step S202. Correspondingly, a STA receives the management frame in step S202.

Optionally, the first AP may perform sending preprocessing on the management frame, and send, in step S202, a processing result obtained through the sending preprocessing. For example, the sending preprocessing may include encryption and scrambling. Correspondingly, the STA may receive the processing result (obtained by performing the sending preprocessing on the management frame by the first AP), and perform receiving preprocessing on the processing result in step S202 to obtain the management frame. For example, the receiving preprocessing may include decryption and descrambling.

S203: The STA determines, based on the management frame, the value of the specific element of the another AP other than the second AP in the second multiple BSSID set or the value of the specific element of the second AP.

In this embodiment, when a non-AP MLD with which the STA is affiliated is a non-AP MLD associated with the MLD in which the second AP is located, (any STA or all STAs in) the non-AP MLD with which the STA is affiliated determine the value of the specific element of the second AP based on the management frame in step S203.

Optionally, the STA that receives the management frame may be a STA in the non-AP MLD. The non-AP MLD includes one or more APs. For example, when the non-AP MLD includes only the STA that receives the management frame, the non-AP MLD may also be referred to as a single-link device; or the non-AP MLD may further include another STA other than the STA that receives the management frame.

It should be noted that, that the value of the specific element of the second AP is the same as the value of the specific element of the another AP other than the second AP in the second multiple BSSID set may be expressed as that values of specific elements of all APs in the second multiple BSSID set are the same, or may be expressed as that every two of values of specific elements of all APs in the second multiple BSSID set are the same.

Optionally, that the second AP includes (or the second AP is) another AP in the second AP MLD other than the AP corresponding to the nontransmitted BSSID in the first multiple BSSID set may be expressed as that the second AP includes (or the second AP is) another AP in the second AP MLD other than an AP corresponding to the first multiple BSSID set.

In addition, the first AP in step S201 may be an AP of the first AP MLD, and the second AP is another AP other than the first AP in the first AP MLD, or the second AP is another AP in the second AP MLD other than the nontransmitted BSSID in the first multiple BSSID set. The first AP MLD and the second AP MLD are different AP MLDs.

It should be noted that the AP MLD (for example, the first AP MLD or the second AP MLD) mentioned in this embodiment and subsequent embodiments includes one or more APs. When the AP MLD mentioned in this embodiment and subsequent embodiments includes one AP, the AP MLD may also be referred to as a single-link device.

In a possible implementation, the management frame generated by the first AP in step S201 further includes a first field, and the first field satisfies at least one of the following:
  the first field at least indicates that a STA in a non-AP MLD associated with the second AP MLD needs to receive (the specific element of the second AP in) the multi-link element of the first AP MLD;
  the first field at least indicates that a STA in a non-AP MLD associated with the first AP MLD needs to receive (the specific element of the second AP in) the multi-link element of the first AP MLD;
  the first field at least indicates that a STA associated with the first AP needs to receive (the specific element of the second AP in) the multi-link element of the first AP MLD;
  the first field at least indicates that a STA in a non-AP MLD associated with the second AP MLD needs to receive (the specific element of the second AP in) a multiple BSSID element corresponding to the second multiple BSSID set; or
  the first field at least indicates that a STA in a non-AP MLD associated with the second AP MLD needs to receive (the specific element of the second AP in) a first nontransmitted BSSID profile in a multiple BSSID element corresponding to the second multiple BSSID set.

Optionally, the STA mentioned above is a STA associated with an AP that operates on a same link as the first AP, or a STA associated with the first AP.

Further, the first field is located in a capabilities information field; the first field is located in a nontransmitted profile field; the first field is located in a nontransmitted BSSID capabilities element of a nontransmitted profile field; the first field is located in a multi-link element of a nontransmitted profile field; the first field is located in a multi-link control field of a multi-link element of a nontransmitted profile field; or the first field is located in a common information field of a multi-link element of a nontransmitted profile field.

In a possible implementation, the management frame is a beacon frame or the management frame is a probe response frame.

In a possible implementation, the specific element includes at least one of the following: a channel switch announcement element, an extended channel switch announcement element, a quiet element, a quiet channel element (Quiet Channel element), and a max channel switch time element. Specifically, the specific element carried in the management frame may include at least one of the foregoing items. In other words, the specific element includes a channel switch related element and/or a quiet channel related element, to indicate channel switch related information and/or quiet related information.

In a possible implementation, in the management frame generated by the first AP in step S201, the specific element of the second AP may be located in different locations of the management frame. For example, the specific element of the second AP is located in the multiple BSSID element of the management frame. For another example, the specific element of the second AP is located in the multi-link element of the management frame. The following provides descriptions in a plurality of implementations.

In an implementation of step S201, in the management frame generated by the first AP in step S201, the specific element of the second AP is located in the multiple BSSID element of the management frame. The first AP is a transmitted BSSID in the first multiple BSSID set, the second AP is a BSSID in the second multiple BSSID set, and the value of the specific element of the second AP is the same as the value of the specific element of the another AP other than the second AP in the second multiple BSSID set. For ease of description below, this implementation is denoted as an implementation 1.

Specifically, in step S201, when the second AP starts to perform (or performs after preset duration, or is performing) a related operation (for example, channel switch or channel quieting) of the specific element, the specific element of the second AP needs to be carried in the management frame in step S201 to indicate specific elements of a plurality of APs. Specifically, the specific element of the second AP is located in the multiple BSSID element and indicates a nontransmitted BSSID profile of the second AP.

Optionally, in the implementation 1, the second AP is another AP in the second AP MLD other than the nontransmitted BSSID in the first multiple BSSID set, the second AP MLD is an AP MLD in which the nontransmitted BSSID in the first multiple BSSID set is located, and the specific element is located in the multiple BSSID element of the management frame.

Optionally, in the implementation 1, the second AP includes another AP other than the first AP in the first AP MLD or the second AP includes another AP in the second AP MLD other than the AP corresponding to the nontransmitted BSSID in the first multiple BSSID set, the second AP MLD is an AP MLD in which the nontransmitted BSSID in the first multiple BSSID set is located, and the specific element is located in the multiple BSSID element of the management frame.

Specifically, in the implementation 1, in the management frame generated by the first AP in step S201, the specific element of the second AP is present in the multiple BSSID element of the management frame. The multiple BSSID element may include at least one nontransmitted BSSID profile. A nontransmitted BSSID profile in the at least one nontransmitted BSSID profile other than a first nontransmitted BSSID profile does not include the specific element.

Specifically, in the at least one nontransmitted BSSID profile in the multiple BSSID element of the management frame, other than the first nontransmitted BSSID profile that includes the specific element, the another nontransmitted BSSID profile does not include the specific element. In other words, the value of the specific element of the second AP also indicates a value of the specific element of a BSSID AP corresponding to the another nontransmitted BSSID profile, so that the specific element of the second AP is reused to indicate specific elements of a plurality of APs (including the second AP and another AP (other than the second AP) in the second multiple BSSID set, or including the second AP and another AP (located in the second multiple BSSID set) in the second AP MLD). This avoids redundant data carried in the management frame, reduces overheads, and improves communication efficiency.

Optionally, the multiple BSSID element corresponding to the first multiple BSSID set of the management frame sent by the first AP includes the at least one nontransmitted BSSID profile. In other words, the first multiple BSSID set includes at least one nontransmitted BSSID. To help a receive end of the management frame receive the specific element of the second AP, the specific element may be located in the first nontransmitted BSSID profile in the at least one nontransmitted BSSID profile.

Optionally, the specific element is located in any nontransmitted BSSID profile in the at least one nontransmitted BSSID profile (for example, a second possible nontransmitted BSSID profile, a third possible nontransmitted BSSID profile, . . . , or a last possible nontransmitted BSSID profile).

The following describes the implementation 1 by using an example with reference to the scenario shown in FIG. 13.

Specifically, in the implementation 1, in the management frame generated by the first AP in step S201, the specific element is present in the multi-link element in a nontransmitted profile in the multiple BSSID element of the management frame (each nontransmitted BSSID corresponds to a nontransmitted profile), and is not present in a multi-link element in another nontransmitted profile in the multiple BSSID element of the management frame.

Optionally, in the management frame generated by the first AP in step S201, the specific element is not present in a per-STA profile of the multi-link element of the management frame.

In FIG. 13, for example, the first AP (namely, the AP that generates the management frame) is the AP-2x. If the first AP belongs to the multiple BSSID set 2, the first AP is a transmitted BSSID in the multiple BSSID set 2.

Optionally, the first AP and the second AP may be located in different AP MLDs, and the second AP is another AP in the second AP MLD other than the nontransmitted BSSID in the first multiple BSSID set. In other words, the first AP does not need to indicate, based on the management frame, the specific element (for example, the AP-1z not present) of the second AP that belongs to the same MLD as the first AP, but needs to indicate, based on the management frame, the specific element of another AP (for example, the AP-1x and the AP-1y) that does not belong to the same MLD as the first AP.

Optionally, the first AP and the second AP may be located in a same AP MLD, or may be located in different AP MLDs. The second AP includes another AP other than the first AP in the first AP MLD or the second AP includes another AP in the second AP MLD other than the AP corresponding to the nontransmitted BSSID in the first multiple BSSID set. In other words, the first AP needs to indicate, based on the management frame, the specific element (for example, the AP-1z) of the second AP that belongs to the same MLD as the first AP, and also needs to indicate, based on the management frame, the specific element of another AP (for example, the AP-1x and the AP-1y) that does not belong to the same MLD as the first AP.

In this case, in the management frame generated by the first AP in step S201, only the specific element of the second AP needs to be carried in a multi-link element in a nontransmitted BSSID profile corresponding to one nontransmitted AP, to indicate specific elements of a plurality of APs. There is no need to repeat a specific element of another AP.

Optionally, a link identifier in a STA control field in a per-STA profile field of the multi-link element is set to a link ID of any AP in the multiple BSSID set of the second AP.

Optionally, a field (denoted as the first field) is added to the management frame, for example, is referred to as ML for multiple BSSID, and is set to a first value. For implementation of the first field, refer to the foregoing descriptions. Details are not described herein again.

Optionally, the nontransmitted BSSID profile corresponding to the second AP is located in a first location in the multiple BSSID element of the management frame.

It may be learned from the foregoing descriptions that, in an implementation process of the implementation 1, when an AP (including the AP-1x, the AP-1z, and the AP-1y) on the link 1 in the scenario in FIG. 13 starts to perform (or performs after preset duration, or is performing) a related operation (for example, channel switch or channel quieting) of the specific element, for example, the second AP is the AP-1x.

Figure 15A:
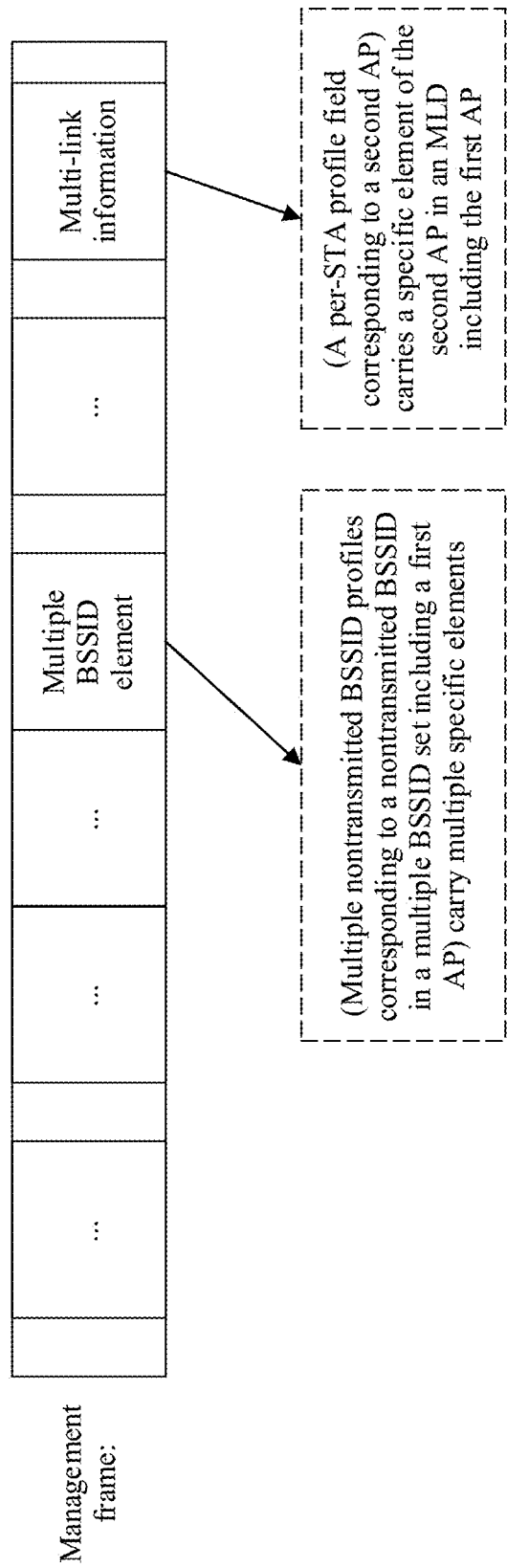
FIG. 15a is another schematic diagram of a frame format of a management frame according to this application.
Figure 15B:
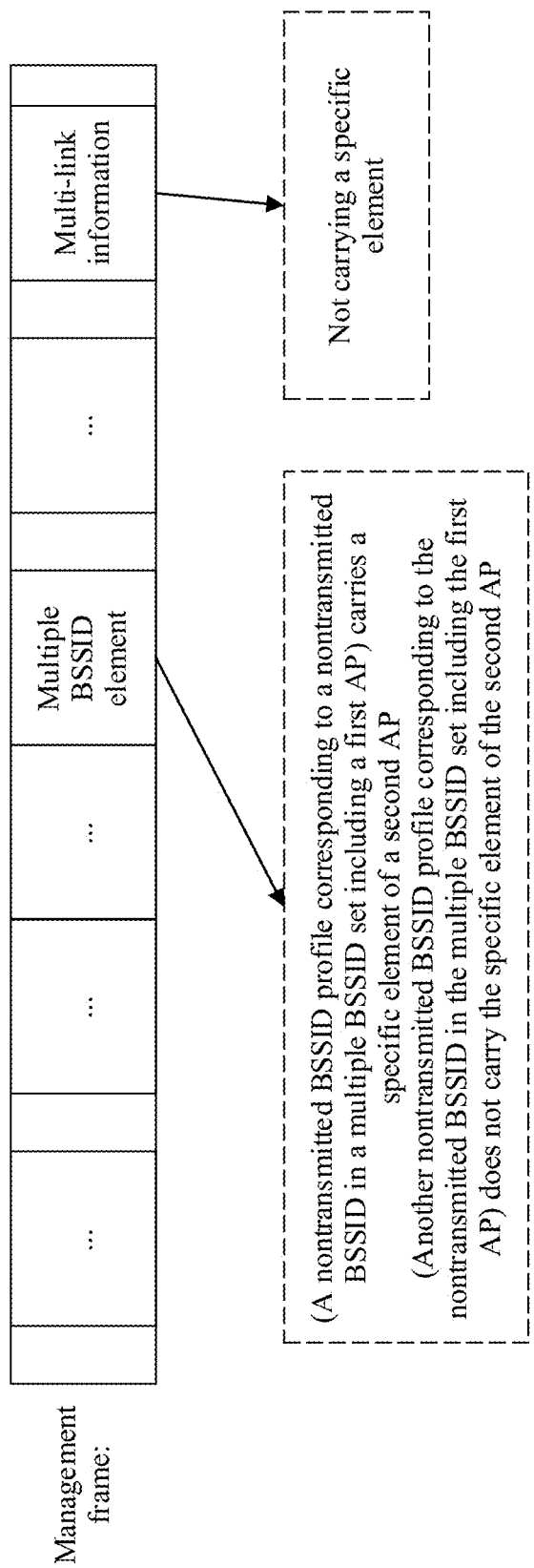
FIG. 15b is another schematic diagram of a frame format of a management frame according to this application.

When the management frame sent by the AP-2x is implemented by using the frame format shown in FIG. 12, the frame format of the management frame shown in FIG. 12 may also be represented as an implementation example shown in FIG. 15*a* and FIG. 15*b*. In the implementation examples shown in FIG. 15*a* and FIG. 15*b*, an example in which an AP that generates (or sends) the management frame is the first AP, and an AP that performs a related operation (for example, channel switch or channel quieting) of the specific element is the second AP is used for description.

In an implementation example, FIG. 15*a* shows an implementation example of the management frame before the implementation 1 in the communication method shown in FIG. 14 is applied. The management frame includes a multiple BSSID element. The multiple BSSID element carries a plurality of specific elements. The plurality of specific elements are located in (a multi-link element of) a plurality of nontransmitted BSSID profiles corresponding to nontransmitted BSSIDs in the multiple BSSID set in which the first AP is located. The management frame further includes multi-link information. The multi-link information carries the specific element of the second AP in the MLD in which the first AP is located. The specific element of the second AP is located in the per-STA profile field corresponding to the second AP.

In an implementation example, FIG. 15*b* shows an implementation example of the management frame after the implementation 1 in the communication method shown in FIG. 14 is applied. The management frame includes a multiple BSSID element. In the multiple BSSID set in which the first AP is located, (a multi-link element of) a nontransmitted BSSID profile corresponding to a nontransmitted BSSID carries the specific element of the second AP, and (a multi-link element of) another nontransmitted BSSID profile corresponding to the nontransmitted BSSID does not carry the specific element of the second AP. The management frame further includes multi-link information, and the multi-link information does not carry the specific element.

In other words, when the AP-2x shown in FIG. 13 sends a management frame (as shown in FIG. 15*b*), only a related element of the AP-2y in the "multiple BSSID element" of the management frame includes a specific element in a same AP MLD (at least including the AP-1x) as the AP-2y, and a related element of the AP-2z in the "multiple BSSID element" of the management frame does not need to carry a specific element in a same AP MLD (at least including the AP-1y) as the AP-2z. Optionally, when the management frame sent by the AP-2x is implemented by using the frame format shown in FIG. 15*b*, even if the AP-1z is present, the "multi-link element" of the management frame no longer needs to carry a specific element in a same AP MLD (including at least the AP-1z) as the AP-2x.

Because specific elements of the AP-1x, the AP-1z, and the AP-1y are the same, the "multiple BSSID element" of the management frame carries a specific element in a nontransmitted BSSID profile, and the "multiple BSSID element" of the management frame does not need to carry a specific element in another nontransmitted BSSID profile (optionally, the multi-link element of the management frame also does not need to carry a specific element). In other words, the specific element carried in the nontransmitted BSSID profile in the "multiple BSSID element" of the management frame is reused to indicate specific elements of a plurality of APs (including the second AP and another AP (other than the second AP) in the second multiple BSSID set, or including the second AP and another AP (located in the second multiple BSSID set) in the second AP MLD). This reduces redundant data of the management frame, avoids unnecessary overheads, and improves communication efficiency.

In another implementation of step S201, in the management frame generated by the first AP in step S201, the specific element of the second AP is located in the multi-link element (Multi-Link Element, or referred to as a multi-link element) of the management frame. The second AP is another AP in the second AP MLD other than an AP corresponding to a nontransmitted BSSID in the first multiple BSSID set, and the second AP MLD is an AP MLD in which the nontransmitted BSSID in the first multiple BSSID set is located. For ease of description below, this implementation is denoted as an implementation 2.

Specifically, in step S201, when the second AP starts to perform (or performs after preset duration, or is performing) a related operation (for example, channel switch or channel quieting) of the specific element, the specific element of the second AP needs to be carried in the management frame in step S201 to indicate specific elements of a plurality of APs. The specific element of the second AP may be located in the multi-link element of the management frame, and the multi-link element of the management frame may include a plurality of fields, so that the specific element of the second AP may be located in one of the plurality of fields.

Optionally, the specific element of the second AP may be located in a per-STA profile field that is in the multi-link element of the management frame and that indicates the second AP.

In the implementation 2, the management frame generated by the first AP in step S201 further includes a multiple BSSID element corresponding to the first multiple BSSID set, and each nontransmitted BSSID profile of the multiple BSSID element corresponding to the first multiple BSSID set does not include a specific element of an AP (in an MLD (namely, the second AP MLD) in which the AP corresponding to the nontransmitted BSSID is located) in the second multiple BSSID set. Specifically, the value of the specific element of the second AP also indicates a value of the specific element of the AP in the second AP MLD in the second multiple BSSID set, so that the specific element of the second AP is reused to indicate specific elements of a plurality of APs (including the second AP and another AP (other than the second AP) in the second multiple BSSID set, or including the second AP and another AP (located in the second multiple BSSID set) in the second AP MLD). This avoids redundant data carried in the management frame, reduces overheads, and improves communication efficiency.

In the implementation 2, the specific element of the second AP may be located in a per-STA profile field that is in the multi-link element of the management frame and that indicates the second AP. The first AP is a transmitted BSSID in the first multiple BSSID set, the second AP is a BSSID in the second multiple BSSID set, and the value of the specific element of the second AP is the same as the value of the specific element of the another AP other than the second AP in the second multiple BSSID set.

Optionally, in the implementation 2, in the management frame generated by the first AP in step S201, the specific element is not present in the multi-link element in a nontransmitted profile in the multiple BSSID element of the management frame (each nontransmitted BSSID corresponds to a nontransmitted profile), and is present in the per-STA profile field in the multi-link element of the management frame.

Specifically, in step S201, when the second AP starts to perform (or performs after preset duration, or is performing) a related operation (for example, channel switch or channel quieting) of the specific element, the specific element of the second AP needs to be carried in the management frame in step S201 to indicate specific elements of a plurality of APs. The specific element of the second AP may be located in the per-STA profile field that is in the multi-link element of the management frame and that indicates the second AP.

Specifically, the first AP may be an AP in an AP MLD, and the second AP is another AP in the AP MLD. In other words, the first AP and the second AP are affiliated with the same AP MLD (for example, the first AP MLD). In the management frame generated by the first AP in step S201, the management frame includes the specific element for indicating the second AP located in a same AP MLD as the first AP. The specific element indicates specific elements of a plurality of APs in a multiple BSSID set in which the another AP in the same AP MLD is located.

The specific element may be located in the multi-link element of the management frame generated by the first AP in step S201. When the first AP is located in an AP MLD, when the first AP sends the management frame, the management frame may carry the multi-link element to indicate specific elements of a plurality of APs. When the first AP and the second AP are affiliated with a same AP MLD, the specific element of the second AP may be carried in the multi-link element of the management frame.

In addition, the specific element is located in the per-STA profile field corresponding to the second AP in the multi-link element. The multi-link element may include a plurality of per-STA profile fields for indicating that the specific element of the second AP may be specifically located in the per-STA profile field corresponding to the second AP in the multi-link element.

Further, the per-STA profile field corresponding to the second AP includes a link identifier field, and the link identifier field is a link identifier of the second AP. When the specific element of the second AP is located in the per-STA profile field corresponding to the second AP in the multi-link element, the per-STA profile field corresponding to the second AP may further include the link identifier field, and the link identifier field is the link identifier of the second AP, and the link identifier indicates, to the receive end of the management frame, that the per-STA profile field is a link corresponding to the second AP.

In an implementation:

Optionally, when the specific element of the second AP is located in the per-STA profile field corresponding to the second AP in the multi-link element, the per-STA profile field further includes a station MAC address present field located in a station control field, and a value of the station MAC address present field indicates that a station information field does not include a station MAC address.

Optionally, when the specific element of the second AP is located in the per-STA profile field corresponding to the second AP in the multi-link element, the per-STA profile field further includes a transmitted BSSID present field located in a station control field, and a value of the transmitted BSSID present field indicates that a station information field does not include a transmitted BSSID field.

In another implementation:

Optionally, when the specific element of the second AP is located in the per-STA profile field corresponding to the second AP in the multi-link element, the per-STA profile field further includes a station MAC address present field located in a station control field, and a value of the station MAC address present field indicates that a station information field includes a station MAC address. Optionally, when the station information field includes a station MAC address field, a value of the station MAC address in the station information field may be a MAC address of the second AP.

Optionally, when the specific element of the second AP is located in the per-STA profile field corresponding to the second AP in the multi-link element, the per-STA profile field further includes a multiple BSSID set information present field located in a station control field, and a value of the multiple BSSID set information present field indicates that a station information field includes the multiple BSSID set information present field.

Optionally, when the station information field includes a multiple BSSID set information field, a BSSID value of each AP in the multiple BSSID set is provided. The multiple BSSID set information field includes a BSSID index field corresponding to the second AP and a max BSSID indicator field.

For example, if the second AP is a nontransmitted BSSID, the BSSID index field has a same indication meaning as the BSSID index field in a multiple BSSID-index element in the nontransmitted BSSID profile field in the optional subelement in the multiple BSSID element in FIG. 4, and indicates a sequence number of the nontransmitted BSSID.

For another example, if the second AP is a transmitted BSSID, the BSSID index field of the second AP is set to 0. A max BSSID indicator field has a same indication meaning as a max BSSID indicator field in the multiple BSSID element in FIG. 4, and indicates a maximum quantity $2^{\wedge}(n)$ of BSSIDs included in the multiple BSSID set, where n is a value indicated by the max BSSID indicator field.

In another implementation:

Optionally, when the specific element of the second AP is located in the per-STA profile field corresponding to the second AP in the multi-link element, the per-STA profile field further includes a transmitted BSSID present field located in a station control field, and a value of the transmitted BSSID present field indicates that a station information field includes a transmitted BSSID field.

Optionally, when the station information field includes the transmitted BSSID field, a value of the station MAC address in the station information field may be a transmitted BSSID in the second multiple BSSID set.

Optionally, when the specific element of the second AP is located in the per-STA profile field corresponding to the second AP in the multi-link element, the per-STA profile field further includes a multiple BSSID set information present field located in a station control field, and a value of the multiple BSSID set information present field indicates that a station information field includes the multiple BSSID set information present field.

Optionally, when the station information field includes a multiple BSSID set information field, a BSSID value of each AP in the multiple BSSID set is provided. The multiple BSSID set information field includes a max BSSID indicator field. The max BSSID indicator field has a same indication meaning as a max BSSID indicator field in the multiple BSSID element in FIG. 4, and indicates a maximum quantity 2^(n) of BSSIDs included in the multiple BSSID set, where n is a value indicated by the max BSSID indicator field.

Optionally, the multiple BSSID set information field includes a BSSID index field, and the BSSID index field is set to 0.

The following describes the implementation 2 by using an example with reference to the scenario shown in FIG. 13.

Specifically, in the implementation 2, in the management frame generated by the first AP in step S201, the specific element is not present in the multi-link element in a nontransmitted profile in the multiple BSSID element of the management frame (each nontransmitted BSSID corresponds to a nontransmitted profile), and is present in the per-STA profile field in the multi-link element of the management frame.

In FIG. 13, for example, the first AP (namely, the AP that generates the management frame) is the AP-2x. If the first AP belongs to the multiple BSSID set 2, the first AP is a transmitted BSSID in the multiple BSSID set 2.

Optionally, the first AP and the second AP may be located in a same AP MLD. In other words, the first AP needs to indicate, based on the management frame, the specific element (for example, the AP-1z) of the second AP that belongs to the same MLD as the first AP, and also needs to indicate, based on the management frame, the specific element of another AP (for example, the AP-1x and the AP-1y) that does not belong to the same MLD as the first AP.

In FIG. 13, for example, the first AP (namely, the AP that generates the management frame) is the AP-2x in the AP MLD 2 and the second AP is the AP-1z in the AP MLD 2. The first AP belongs to the multiple BSSID set 2, and the first AP is a transmitted BSSID in the multiple BSSID set 2. The second AP is an AP in the multiple BSSID set 1, and the second AP is an AP (for example, the AP-1z) in the AP MLD 2. In this case, the first AP indicates the specific element of the AP-1z in the AP MLD 2 based on the management frame, and also needs to indicate the specific element of the AP-1x in the AP MLD 1 and the specific element of the AP-1y in the AP MLD 3 based on the management frame. In this case, when the first AP generates the management frame in step S201, the multi-link element of the first AP needs to carry the specific element of the AP-1z of the first AP MLD, to indicate specific elements of a plurality of APs. There is no need to repeat a specific element of another AP in the multiple BSSID set 1 in which the second AP is located.

Optionally, the specific element of the second AP is carried in the per-STA profile field in the multi-link element corresponding to the MLD to which the first AP belongs, for example, carried in a STA profile field of the per-STA profile field in the multi-link element of the management frame.

Optionally, a link identifier in a STA control field in the per-STA profile field of the multi-link element is set to a link ID of the second AP that belongs to a same MLD as the first AP.

Optionally, a field (namely, the first field) is added to the management frame, for example, is referred to as a multi-link for multiple BSSID field, and is set to a first value (for example, 0, 1, or another value).

Optionally, the STA MAC address present field in the STA Info field may be set to the MAC address of the AP corresponding to the transmitted BSSID in the second multiple BSSID set, or may be directly set to the MAC address of the second AP that belongs to the same MLD as the first AP.

It may be learned from the foregoing descriptions that, in an implementation process of the implementation 2, when an AP (including the AP-1x, the AP-1z, and the AP-1y) on the link 1 in the scenario in FIG. 13 starts to perform (or performs after preset duration, or is performing) a related operation (for example, channel switch or channel quieting) of the specific element, for example, the second AP is the AP-1x. The frame format of the management frame shown in FIG. 12 may also be represented as an implementation example shown in FIG. 15*a* and FIG. 15*c*. In the implementation examples shown in FIG. 15*a* and FIG. 15*c*, an example in which an AP that generates (or sends) the management frame is the first AP, and an AP that performs a related operation (for example, channel switch or channel quieting) of the specific element is the second AP is used for description.

In an implementation example, FIG. 15*a* shows an implementation example of the management frame before the implementation 2 in the communication method shown in FIG. 14 is applied. The management frame includes a multiple BSSID element. The multiple BSSID element carries a plurality of specific elements. The plurality of specific elements are located in (a multi-link element of) a plurality of nontransmitted BSSID profiles corresponding to nontransmitted BSSIDs in the multiple BSSID set in which the first AP is located. The management frame further includes multi-link information. The multi-link information carries the specific element of the second AP in the MLD in which the first AP is located. The specific element of the second AP is located in the per-STA profile field corresponding to the second AP.

Figure 15C:
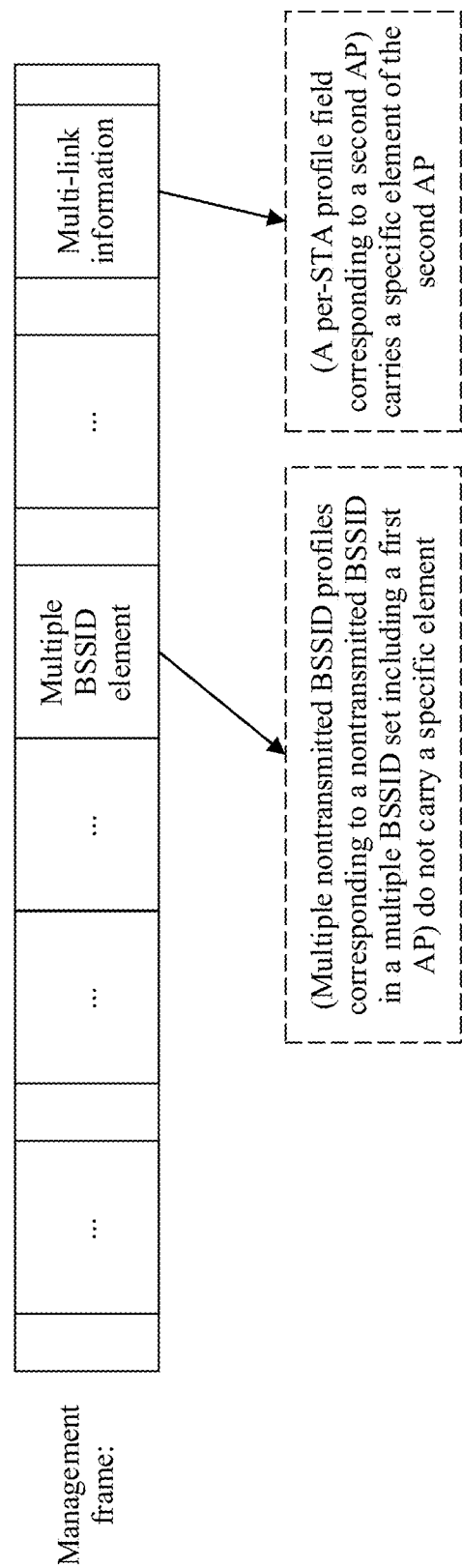
FIG. 15c is another schematic diagram of a frame format of a management frame according to this application.

In an implementation example, FIG. 15*c* shows an implementation example of the management frame after the implementation 2 in the communication method shown in FIG. 14 is applied. The management frame includes a multiple BSSID element. (A multi-link element of) (one or) a plurality of nontransmitted BSSID profiles corresponding to nontransmitted BSSIDs in the multiple BSSID set in which the first AP is located does not carry the specific element of the second AP. The management frame further includes multi-link information, the multi-link information carries the specific element of the second AP, and the specific element is located in the per-STA profile field corresponding to the second AP in the multi-link information.

In other words, when the AP-2x shown in FIG. 13 sends the management frame (as shown in FIG. 15*c*), the "multiple BSSID element" of the management frame needs to carry a related element of an AP (including the AP-2y and the AP-2z) corresponding to a nontransmitted BSSID. A related element of the AP-2y in the "multiple BSSID element" of the management frame does not need to carry a specific element in a same AP MLD (at least including the AP-1x) as the AP-2y, and a related element of the AP-2z in the "multiple BSSID element" of the management frame does not need to carry a specific element in a same AP MLD (at least including the AP-1y) as the AP-2z.

When the management frame sent by the AP-2x is implemented by using the frame format shown in FIG. 12, the "multi-link element" of the management frame needs to carry the specific element of the second AP in a per-STA profile field.

Optionally, the per-STA profile field is a per-STA profile field corresponding to the AP-1z.

Because specific elements of the AP-1x, the AP-1z, and the AP-1y are the same, a per-STA profile field in the "multi-link element" of the management frame carries the specific element of the second AP, and the "multiple BSSID element" of the management frame does not need to carry the specific element in the nontransmitted BSSID profile. In other words, the specific element of the second AP carried in the "multi-link element" of the management frame is reused to indicate specific elements of a plurality of APs (including the second AP and another AP (other than the second AP) in the second multiple BSSID set, or including the second AP and another AP (located in the second multiple BSSID set) in the second AP MLD). This reduces redundant data of the management frame, avoids unnecessary overheads, and improves communication efficiency.

In another implementation of step S201, in the management frame generated by the first AP in step S201, the specific element of the second AP is located in the multi-link element (Multi-Link Element, or referred to as a multi-link element) of the management frame. The second AP includes another AP other than the first AP in the first AP MLD or the second AP includes another AP in the second AP MLD other than the AP corresponding to the nontransmitted BSSID in the first multiple BSSID set, and the second AP MLD is an AP MLD in which the nontransmitted BSSID in the first multiple BSSID set is located. For ease of description below, this implementation is denoted as an implementation 3.

Specifically, in step S201, when the second AP starts to perform (or performs after preset duration, or is performing) a related operation (for example, channel switch or channel quieting) of the specific element, the specific element of the second AP needs to be carried in the management frame in step S201 to indicate specific elements of a plurality of APs.

In the implementation 3, the management frame generated by the first AP in step S201 further includes a multiple BSSID element corresponding to the first multiple BSSID set, and the multiple BSSID element corresponding to the first multiple BSSID set does not include a specific element of another AP other than the second AP in the second multiple BSSID set. Specifically, the value of the specific element of the second AP also indicates a value of the specific element of another AP other than the second AP in the second multiple BSSID set, so that the specific element of the second AP is reused to indicate specific elements of a plurality of APs (including the second AP and another AP other than the second AP in the second multiple BSSID set). This avoids redundant data carried in the management frame, reduces overheads, and improves communication efficiency.

Optionally, in the implementation 3, the specific element of the second AP may be located in another per-STA profile field that is in the multi-link element of the management frame (and that does not indicate the second AP). The first AP is a transmitted BSSID in the first multiple BSSID set, the second AP is a BSSID in the second multiple BSSID set, and the value of the specific element of the second AP is the same as the value of the specific element of the another AP other than the second AP in the second multiple BSSID set. For ease of description below, this implementation is denoted as an implementation 3.

Specifically, in the implementation 3, in step S201, when the second AP starts to perform (or performs after preset duration, or is performing) a related operation (for example, channel switch or channel quieting) of the specific element, the specific element of the second AP needs to be carried in the management frame in step S201 to indicate specific elements of a plurality of APs. The specific element of the second AP may be located in the another per-STA profile field in the multi-link element of the management frame.

Optionally, in the implementation 3, in the management frame generated by the first AP in step S201, the specific element is not present in the multi-link element in a nontransmitted profile in the multiple BSSID element of the management frame (each nontransmitted BSSID corresponds to a nontransmitted profile), and is present in the per-STA profile field in the multi-link element of the management frame.

Specifically, the specific element is located in the multi-link element of the management frame generated by the first AP in step S201. When the first AP is located in an AP MLD, when the first AP sends the management frame, the management frame may carry the multi-link element to indicate specific elements of a plurality of APs (including the second AP and another AP (other than the second AP) in the second multiple BSSID set, or including the second AP and another AP (located in the second multiple BSSID set) in the second AP MLD). The first AP may carry the specific element by using the multi-link element.

One per-STA profile field in the multi-link element includes a link identifier field, and a value of the link identifier field is a special value. In other words, when the specific element is located in the multi-link element of the management frame, a value of a link identifier field included in a per-STA profile field in the multi-link element is a special value, so that a conflict with a link identifier of an existing AP is avoided by using the special value.

Optionally, the special value is a reserved value of a value of a link identifier field specified in a current standard. For example, the special value is 15.

In addition, the per-STA profile field further includes a station media access control (MAC) address present field located in a station control field, and a value of the station MAC address present field indicates that a station information field includes a station MAC address. Specifically, when the specific element is located in the per-STA profile field in the multi-link element of the management frame, the per-STA profile field further includes the station MAC address present field located in the station control field, and the value of the station MAC address present field indicates that the station information field includes the station MAC address, so that the receiver of the management frame determines that the station information field includes the station MAC address, and receives the station MAC address in the station MAC address field.

Further, the per-STA profile field further includes the station information field, the station information field includes a station MAC address field, and a value of the station MAC address field is a transmitted BSSID in the second multiple BSSID set. When the specific element is located in the per-STA profile field in the multi-link element of the management frame, the per-STA profile field further includes the station MAC address field in the station information field, and the value of the station MAC address field is the transmitted BSSID in the second multiple BSSID set. Therefore, the value of the station MAC address field indicates that a value of the specific element is values of specific elements of all APs corresponding to transmitted BSSIDs in the second multiple BSSID set, or the value of the station MAC address field indicates that a value of the specific element is a value of a specific element of any AP corresponding to a transmitted BSSID in the second multiple BSSID set, or the value of the station MAC address field indicates that a value of the specific element is values of specific elements of all APs corresponding to transmitted BSSIDs in the second multiple BSSID set, or the value of the station MAC address field indicates that a value of the specific element is a value of a specific element of any AP corresponding to a transmitted BSSID in the second multiple BSSID set and values of specific elements of all APs corresponding to transmitted BSSIDs in the second multiple BSSID set are the same.

In another implementation, the per-STA profile field further includes a transmitted BSSID present field located in the station control field (a station medium access control (MAC) address present field not in a reuse ML element), and a value of the transmitted BSSID present field indicates that the station information field includes the transmitted BSSID field.

Specifically, when the specific element is located in the per-STA profile field in the multi-link element of the management frame, the per-STA profile field further includes the transmitted BSSID present field located in the station control field, and the value of the transmitted BSSID present field indicates that the station information field includes the transmitted BSSID field, so that the receiver of the management frame determines that the station information field includes the transmitted BSSID field. The BSSID field indicates a MAC address of an AP corresponding to a transmitted BSSID in a multiple BSSID set.

Further, the per-STA profile field further includes the station information field, the station information field includes the transmitted BSSID field (the station MAC address field not in the reuse ML element), and the value of the transmitted BSSID field is the transmitted BSSID in the second multiple BSSID set.

Optionally, when the specific element is located in the per-STA profile field in the multi-link element of the management frame, the per-STA profile field further includes the transmitted BSSID field in the station information field, and the value of the transmitted BSSID field is the transmitted BSSID in the second multiple BSSID set. Therefore, the value of the transmitted BSSID field indicates that a value of the specific element is values of specific elements of all APs corresponding to transmitted BSSIDs in the second multiple BSSID set, or the value of the transmitted BSSID field indicates that a value of the specific element is a value of a specific element of any AP corresponding to a transmitted BSSID in the second multiple BSSID set, or the value of the transmitted BSSID field indicates that a value of the specific element is values of specific elements of all APs corresponding to transmitted BSSIDs in the second multiple BSSID set, or the value of the transmitted BSSID field indicates that a value of the specific element is a value of a specific element of any AP corresponding to a transmitted BSSID in the second multiple BSSID set and values of specific elements of all APs corresponding to transmitted BSSIDs in the second multiple BSSID set are the same.

Optionally, the per-STA profile field further includes a multiple BSSID set information present field located in a station control field, and a value of the multiple BSSID set information present field indicates that a station information field includes the multiple BSSID set information present field.

Optionally, when the station information field includes a multiple BSSID set information field, a BSSID value of each AP in the multiple BSSID set is provided. The multiple BSSID set information field includes a max BSSID indicator field. The max BSSID indicator field has a same indication meaning as a max BSSID indicator field in the multiple BSSID element in FIG. 4, and indicates a maximum quantity $2^{\wedge}(n)$ of BSSIDs included in the multiple BSSID set, where n is a value indicated by the max BSSID indicator field.

Optionally, the multiple BSSID set information field includes a BSSID index field, and the BSSID index field is set to 0.

The following describes the implementation 3 by using an example with reference to the scenario shown in FIG. 13.

Specifically, in the implementation 3, in the management frame generated by the first AP in step S201, the specific element is not present in the multi-link element in a nontransmitted profile in the multiple BSSID element of the management frame (each nontransmitted BSSID corresponds to a nontransmitted profile), and is present in the multi-link element of the management frame.

In FIG. 13, for example, the first AP (namely, the AP that generates the management frame) is the AP-2x. If the first AP belongs to the multiple BSSID set 2, the first AP is a transmitted BSSID in the multiple BSSID set 2.

For example, it is assumed that the first AP is the AP-2x in FIG. 13, the second AP includes the AP-1y in FIG. 13, and the AP-1y is performing an implementation process related to a specific element. In this case, a transmitted BSSID (namely, the AP-1x) corresponding to the AP-1y needs to indicate specific elements of a plurality of APs by using the specific element of the second AP carried in the management frame. Specifically, the specific element of the second AP is carried in the per-STA profile field in the multi-link element corresponding to the MLD to which the first AP belongs, for example, carried in a STA profile field of the per-STA profile field in the multi-link element of the management frame. In addition, the second AP belongs to a multiple BSSID set different from the multiple BSSID set 2 (an example in which the second AP is located in the multiple BSSID set 1 in FIG. 13 is used for description herein). There are the following two cases:

Case 1: The first AP and the second AP may be located in different AP MLDs, and the second AP is another AP in the second AP MLD other than the nontransmitted BSSID in the first multiple BSSID set. In other words, the first AP does not need to indicate, based on the management frame, the specific element (for example, the AP-1z not present) of the second AP that belongs to the same MLD as the first AP but needs to indicate, based on the management frame, the specific element of another AP (for example, the AP-1x and the AP-1y) that does not belong to the same MLD as the first AP.

Case 2: The first AP and the second AP may be located in a same AP MLD, or may be located in different AP MLDs. The second AP includes another AP other than the first AP in the first AP MLD or the second AP includes another AP in the second AP MLD other than the AP corresponding to the nontransmitted BSSID in the first multiple BSSID set. In other words, the first AP needs to indicate, based on the management frame, the specific element (for example, the AP-1z) of the second AP that belongs to the same MLD as the first AP, and also needs to indicate, based on the management frame, the specific element of another AP (for example, the AP-1x and the AP-1y) that does not belong to the same MLD as the first AP.

In this case, in the management frame generated by the first AP in step S201, the specific element of the second AP in the management frame needs to indicate specific elements of a plurality of APs. Specifically, the specific element of the second AP does not need to be carried in the per-STA profile field in the multi-link element in the nontransmitted profile in the multiple BSSID element, but the specific element of the second AP is carried in the STA profile field of the per-STA profile field in the multi-link element of the management frame.

Optionally, the link identifier in the STA control field in the per-STA profile field of the multi-link element is set to a special link ID, for example, a value of 15.

Optionally, if the second AP located in the same MLD as the first AP is present, the link identifier may alternatively be set to a link identifier corresponding to the second AP located in the same MLD as the first AP.

Optionally, the STA MAC address field in the STA Info field in the per-STA profile field of the multi-link element is set to a transmitted BSSID (namely, a MAC address of the AP-1x) in the multiple BSSID set of the second AP.

Optionally, the STA MAC address present field in the STA control field in the per-STA profile field of the multi-link element is set to "present", for example, a value of 1.

Optionally, the STA MAC address field in the STA Info field in the per-STA profile field of the multi-link element is set to a transmitted BSSID in the multiple BSSID set in which the second AP is located.

Optionally, the specific element is carried in the per-STA profile field to indicate specific elements of a plurality of APs. In other words, the specific element carried in the per-STA profile field is useful for a non-AP MLD or a STA associated with an AP MLD in which an AP (namely, the first AP) sending the multi-link element is located, and also useful for a non-AP MLD or a station associated with an AP MLD (one or more second AP MLDs) in which an AP corresponding to the nontransmitted BSSID in the same multiple BSSID set as the AP sending the multi-link element is located.

Optionally, generally only the non-AP MLD (or the STA) associated with the AP MLD in which the AP sending the multi-link element is located parses information about the multi-link element, and a non-AP MLD associated with another AP MLD ignores the information. Therefore, in the implementation 3, it is proposed that a field (namely, the first field) is added to the management frame. For example, the first field is referred to as ML for multiple BSSID, and indicates that an AP MLD associated with the AP MLD in which the AP corresponding to the nontransmitted BSSID in the same multiple BSSID set as the AP sending the management frame is located also needs to receive the multi-link element. For an implementation process of the first field, refer to the foregoing implementation process. Details are not described herein again.

Therefore, because the AP-1y belongs to the multiple BSSID set, the specific elements of the AP-1x and the AP1z that belong to the multiple BSSID set also need to be carried in a beacon frame and a probe response frame that are sent by the same first AP (the AP-2x). However, in the implementation 3, the specific elements do not need to be carried repeatedly. Subsequently, STAs in non-AP MLDs of the AP MLD 1, the AP MLD 2, and the AP MLD 3 may directly read the MLD element corresponding to the AP MLD 2 in which the first AP is located to obtain the specific element.

It may be learned from the foregoing descriptions that, in an implementation process of the implementation 3, when an AP (including the AP-1x, the AP-1z, and the AP-1y) on the link 1 in the scenario in FIG. 13 starts to perform (or performs after preset duration, or is performing) a related operation (for example, channel switch or channel quieting) of the specific element, for example, the second AP is the AP-1x.

Figure 15D:
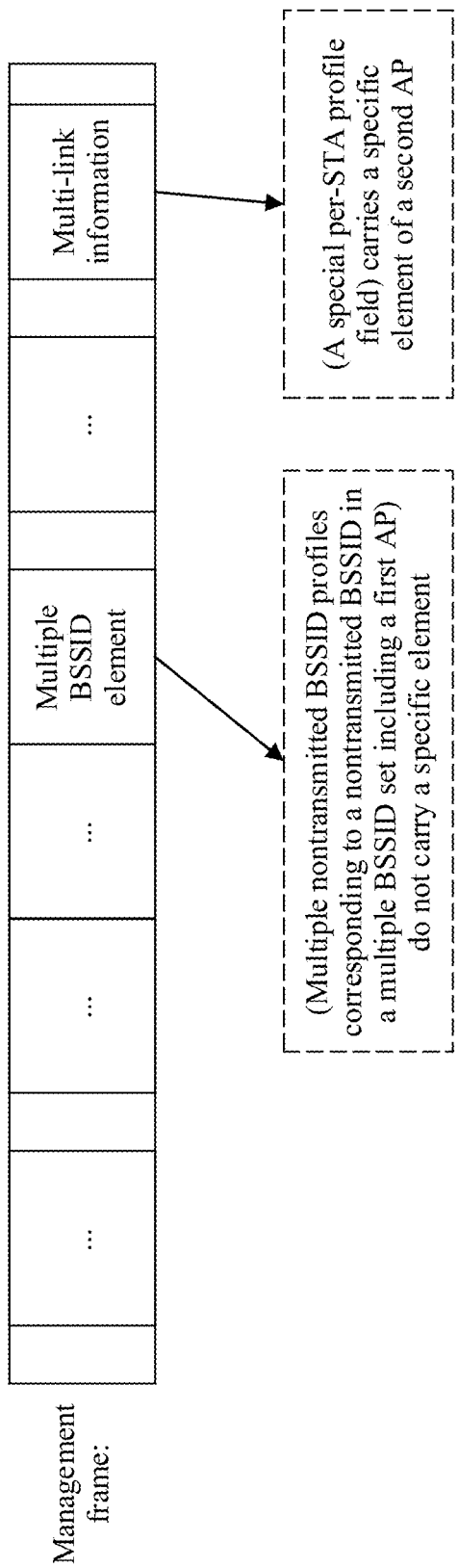
FIG. 15d is another schematic diagram of a frame format of a management frame according to this application.

The frame format of the management frame shown in FIG. 12 may also be represented as an implementation example shown in FIG. 15a and FIG. 15d. In the implementation examples shown in FIG. 15a and FIG. 15d, an example in which an AP that generates (or sends) the management frame is the first AP, and an AP that performs a related operation (for example, channel switch or channel quieting) of the specific element is the second AP is used for description.

In an implementation example, FIG. 15a shows an implementation example of the management frame before the implementation 3 in the communication method shown in FIG. 14 is applied. The management frame includes a multiple BSSID element. The multiple BSSID element carries a plurality of specific elements. The plurality of specific elements are located in (a multi-link element of) a plurality of nontransmitted BSSID profiles corresponding to nontransmitted BSSIDs in the multiple BSSID set in which the first AP is located. The management frame further includes multi-link information. The multi-link information carries the specific element of the second AP in the MLD in which the first AP is located. The specific element of the second AP is located in the per-STA profile field corresponding to the second AP.

In an implementation example, FIG. 15d shows an implementation example of the management frame after the implementation 3 in the communication method shown in FIG. 14 is applied. The management frame includes a multiple BSSID element. (A multi-link element of) (one or) a plurality of nontransmitted BSSID profiles corresponding to nontransmitted BSSIDs in the multiple BSSID set in which the first AP is located does not carry the specific element of the second AP. The management frame further includes multi-link information, the multi-link information carries the specific element of the second AP, and the specific element is located in a special per-STA profile field in the multi-link information.

In other words, when the AP-2x shown in FIG. 13 sends the management frame (as shown in FIG. 15d), the "multiple BSSID element" of the management frame needs to carry a related element of an AP (including the AP-2y and the AP-2z) corresponding to a nontransmitted BSSID. A related element of the AP-2y in the "multiple BSSID element" of the management frame does not need to carry a specific element in a same AP MLD (at least including the AP-1x) as the AP-2y, and a related element of the AP-2z in the "multiple BSSID element" of the management frame does not need to carry a specific element in a same AP MLD (at least including the AP-1y) as the AP-2z.

When the management frame sent by the AP-2x is implemented by using the frame format shown in FIG. 12, a special per-STA profile field in the "multi-link element" of the management frame needs to carry the specific element of the second AP and reuse the specific element of the second AP.

Because channel switch related elements and/or quiet channel related elements of the AP-1x, the AP-1z, and the AP-1y are the same, the special per-STA profile field in the "multi-link element" of the management frame carries the specific element of the second AP, and the "multiple BSSID element" of the management frame does not need to carry the specific element in the nontransmitted BSSID profile. In other words, the specific element of the second AP carried in the "multi-link element" of the management frame is reused to indicate specific elements of a plurality of APs (including the second AP and another AP (other than the second AP) in the second multiple BSSID set, or including the second AP and another AP (located in the second multiple BSSID set) in the second AP MLD). This reduces redundant data of the management frame, avoids unnecessary overheads, and improves communication efficiency.

Based on the foregoing technical solution, the management frame sent by the first AP in step S201 includes the specific element of the second AP, the first AP is the transmitted BSSID in the first multiple BSSID set, the second AP is a BSSID in the second multiple BSSID set, and the value of the specific element of the second AP is the same as the value of the specific element of the another AP other than the second AP in the second multiple BSSID set. In this way, when a receiver of the management frame is a STA associated with the second AP, a corresponding value may be determined by using the specific element of the second AP carried in the management frame, and when the receiver of the management frame is a STA associated with the another AP other than the second AP in the second multiple BSSID set, the corresponding value may also be determined by using the specific element of the first AP carried in the management frame. In other words, the value of the specific element of the second AP is reused in the management frame, to indicate specific elements of a plurality of APs (including the second AP and another AP (other than the second AP) in the second multiple BSSID set, or including the second AP and another AP (located in the second multiple BSSID set) in the second AP MLD) in the multiple BSSID set to which the second AP belongs. The management frame does not need to carry a plurality of same specific elements in the multiple BSSID set. This reduces redundant data of the management frame, avoids unnecessary overheads, and improves communication efficiency.

In the foregoing plurality of implementations (a plurality of embodiments, a plurality of implementations, or a plurality of implementation methods), a name of the mentioned field (or element) is merely one of the names, and the name of the field (or element) may alternatively be another name. This is not limited in this application.

In an implementation, when the first AP sends a management frame, for example, a beacon frame or a probe response frame, if the first AP belongs to a multiple BSSID set, the first AP needs to carry the multiple BSSID element in FIG. 4. On a station side, after receiving the multiple BSSID element, the station may learn that the multiple BSSID set includes a BSSID of each AP. After the station is associated with one AP in the multiple BSSID set, the station may determine, based on the previously learned BSSID of each AP in the BSSID set, whether a received PPDU is an inter-PPDU or an intra-PPDU, so that power saving, spatial reuse transmission, or the like are performed according to the 802.11ax-2021 protocol.

However, when the first AP sends the management frame, the management frame also needs to carry information about a third AP, and the third AP and the first AP are from a same AP MLD. The information about the third AP is carried in the per-STA profile field of the ML element sent by the first AP. When the third AP is located in a third multiple BSSID set, after learning that the management frame is received, a station affiliated with a non-AP MLD can learn of the information about the third AP but cannot learn of information about the third multiple BSSID set. Consequently, in the non-AP MLD, a station located on a same link as the third AP cannot determine, based on the BSSID of each AP in the third multiple BSSID set in which the third AP is located, whether the received PPDU is an inter-PPDU or an intra-PPDU. As a result, power saving, spatial reuse transmission, or the like cannot be performed according to the 802.11ax-2021 protocol.

Figure 15E:
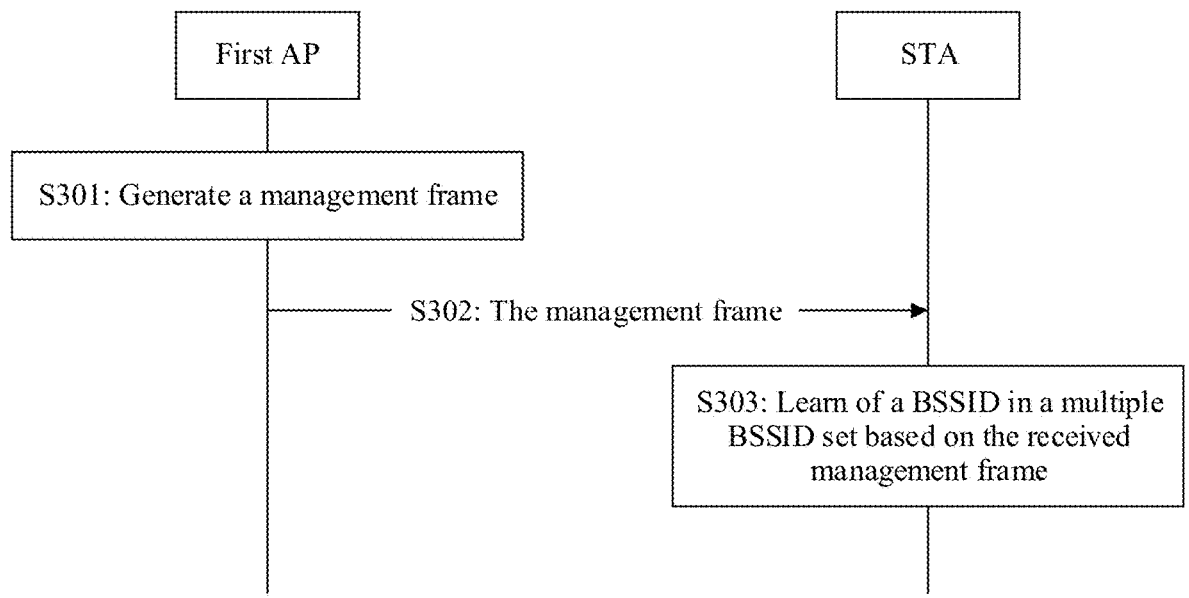
FIG. 15e is another schematic diagram of a communication method according to this application.

FIG. 15e is a schematic flowchart of a communication method according to an embodiment of this application. The method includes the following steps:

S301: A first AP generates a management frame.

In this embodiment, the management frame may be a beacon frame, a probe response frame, or an association response frame. The management frame includes a multi-link element.

Method 1: When a third AP and the first AP are affiliated with a same AP MLD (a first AP MLD), the third AP is located in a third multiple BSSID set.

The management frame includes the multi-link element, and the multi-link element is used to describe information about the first AP MLD and includes information about the third AP.

A per-STA profile field corresponding to the third AP includes a link identifier field, and the link identifier field is a link identifier of the third AP. The per-STA profile field corresponding to the third AP may further include the link identifier field, and the link identifier field is the link identifier of the third AP, and the link identifier indicates, to a receive end of the management frame, that the per-STA profile field is a link corresponding to the third AP.

In an implementation of the method 1:

Optionally, the per-STA profile field corresponding to the third AP further includes a station MAC address present field located in a station control field, and a value of the station MAC address present field indicates that a station information field includes a station MAC address. Optionally, when the station information field includes a station MAC address field, a value of the station MAC address in the station information field may be a MAC address of the third AP.

Optionally, the per-STA profile field further includes a multiple BSSID set information present field located in a station control field, and a value of the multiple BSSID set information present field indicates that a station information field includes the multiple BSSID set information present field.

Optionally, when the station information field includes a multiple BSSID set information field, a BSSID value of each AP in the multiple BSSID set is provided. The multiple BSSID set information field includes a BSSID index field corresponding to the third AP and a max BSSID indicator field. If the third AP is a nontransmitted BSSID, the BSSID index field has a same indication meaning as the BSSID index field in the multiple BSSID index element in the nontransmitted BSSID profile field in the optional subelement in the multiple BSSID element in FIG. 4, and indicates a sequence number of the nontransmitted BSSID. If the third AP is a transmitted BSSID, the BSSID index field is set to 0. The max BSSID indicator field has a same indication meaning as the max BSSID indicator field in the multiple BSSID element in FIG. 4, and indicates a maximum quantity $2^{(n)}$ of BSSIDs included in the multiple BSSID set, where n is a value indicated by the max BSSID indicator field.

In another implementation of the method 1:

Optionally, the per-STA profile field corresponding to the third AP further includes a transmitted BSSID present field located in a station control field, and a value of the transmitted BSSID present field indicates that a station information field includes a transmitted BSSID field.

Optionally, when the station information field includes the transmitted BSSID field, a value of the station MAC address in the station information field may be a transmitted BSSID in the third multiple BSSID set.

Optionally, the per-STA profile field further includes a multiple BSSID set information present field located in a station control field, and a value of the multiple BSSID set information present field indicates that a station information field includes the multiple BSSID set information present field.

Optionally, when the station information field includes a multiple BSSID set information field, a BSSID value of each AP in the multiple BSSID set is provided. The multiple BSSID set information field includes a max BSSID indicator field. The max BSSID indicator field has a same indication meaning as a max BSSID indicator field in the multiple BSSID element in FIG. 4, and indicates a maximum quantity 2^(n) of BSSIDs included in the multiple BSSID set, where n is a value indicated by the max BSSID indicator field.

Optionally, the multiple BSSID set information field includes a BSSID index field, and the BSSID index field is set to 0.

Method 2: When a third AP and the first AP are affiliated with a same AP MLD, the third AP is located in a third multiple BSSID set.

Alternatively, the third AP is located in a third AP MLD, the third AP is located in a third multiple BSSID set, the first AP is located in a first multiple BSSID set, and the third AP MLD is an AP MLD in which another AP in the first multiple BSSID set is located.

One per-STA profile field in the multi-link element includes a link identifier field, and a value of the link identifier field is a special value. In other words, a value of a link identifier field included in a per-STA profile field in the multi-link element is a special value, so that a conflict with a link identifier of an existing AP is avoided by using the special value.

Optionally, the special value is a reserved value of a value of a link identifier field specified in a current standard. For example, the special value is 15.

In addition, the per-STA profile field further includes a station media access control (MAC) address present field located in a station control field, and a value of the station MAC address present field indicates that a station information field includes a station MAC address. Specifically, the per-STA profile field further includes the station MAC address present field located in the station control field, and the value of the station MAC address present field indicates that the station information field includes the station MAC address, so that a receiver of the management frame determines that the station information field includes the station MAC address, and receives the station MAC address in the station MAC address field.

Further, the per-STA profile field further includes the station information field, the station information field includes a station MAC address field, and a value of the station MAC address field is a transmitted BSSID in the third multiple BSSID set. When the per-STA profile field further includes the station MAC address field in the station information field, and the value of the station MAC address field is the transmitted BSSID in the third multiple BSSID set.

In another manner, the per-STA profile field further includes a transmitted BSSID present field located in the station control field (a station medium access control (MAC) address present field not in a reuse ML element), and a value of the transmitted BSSID present field indicates that the station information field includes the transmitted BSSID field. Specifically, the per-STA profile field further includes a transmitted BSSID present field located in the station control field, and a value of the transmitted BSSID present field indicates that the station information field includes the transmitted BSSID field, so that the receiver of the management frame determines that the station information field includes the transmitted BSSID field. The BSSID field indicates a MAC address of an AP corresponding to a transmitted BSSID in a multiple BSSID set.

Further, the per-STA profile field further includes a station information field, where the station information field includes a transmitted BSSID field (a station MAC address field not in a reuse ML element), and a value of the transmitted BSSID field is a transmitted BSSID in the third multiple BSSID set. The per-STA profile field further includes a transmitted BSSID field in the station information field, and a value of the transmitted BSSID field is a transmitted BSSID in the third multiple BSSID set.

Optionally, the per-STA profile field further includes a multiple BSSID set information present field located in a station control field, and a value of the multiple BSSID set information present field indicates that a station information field includes the multiple BSSID set information present field.

Optionally, when the station information field includes a multiple BSSID set information field, a BSSID value of each AP in the multiple BSSID set is provided. The multiple BSSID set information field includes a max BSSID indicator field. The max BSSID indicator field has a same indication meaning as a max BSSID indicator field in the multiple BSSID element in FIG. 4, and indicates a maximum quantity 2^(n) of BSSIDs included in the multiple BSSID set, where n is a value indicated by the max BSSID indicator field.

Optionally, the multiple BSSID set information field includes a BSSID index field, and the BSSID index field is set to 0.

S302: The first AP sends the management frame.

In this embodiment, the first AP sends the management frame in step S102.

Correspondingly, a STA receives the management frame in step S102.

Optionally, the first AP may perform sending preprocessing on the management frame, and send, in step S102, a processing result obtained through the sending preprocessing. For example, the sending preprocessing may include encryption and scrambling.

Correspondingly, the STA may receive the processing result (obtained by performing the sending preprocessing on the management frame by the first AP), and perform receiving preprocessing on the processing result in step S102 to obtain the management frame. For example, the receiving preprocessing may include decryption and descrambling.

S303: Learn of a BSSID in a multiple BSSID set based on the received management frame.

In step S303, a station affiliated with a non-AP MLD learns of, based on the received management frame, information about a multiple BSSID set on another link, to learn of a BSSID value of each AP in the multiple BSSID set.

In this embodiment, in the non-AP MLD, the station located on the same link as the third AP determines, based on the BSSID of each AP in the third BSSID set in which the third AP is located, whether a received PPDU is an inter-PPDU or an intra-PPDU. Then, power saving, spatial reuse transmission, or the like may be performed according to the 802.11ax-2021 protocol or a new design protocol.

Optionally, the station affiliated with the non-AP MLD obtains, based on the received management frame, at least one of the following:

a MAC address of the third AP, a BSSID index field corresponding to the third AP, and a max BSSID indicator field in the third multiple BSSID set.

Optionally, the station affiliated with the non-AP MLD obtains, based on the received management frame, at least one of the following:

a transmitted BSSID in the third multiple BSSID set, a max BSSID indicator field in the third multiple BSSID set, and a BSSID index field corresponding to the transmitted BSSID in the third multiple BSSID set.

Based on the foregoing technical solution, the station affiliated with the non-AP MLD may learn of (or determine) all BSSIDs in the third multiple BSSID set based on the received management frame.

For a station, if the station receives a PPDU, whether the PPDU is an inter-PPDU or an intra-PPDU is determined based on all BSSIDs in the third multiple BSSID set.

Optionally, if the PPDU is an inter-PPDU, the station may initiate another transmission on a same channel based on the inter-PPDU. The another transmission is based on a spatial reuse method recorded in the 802.11ax-2021 protocol.

Optionally, if the PPDU is an inter-PPDU, the station may not further (receive or) parse the inter-PPDU, so that power saving is performed (according to the 802.11ax-2021 protocol).

The foregoing describes this application from the perspective of methods, and the following further describes this application from the perspective of apparatuses.

Figure 16:
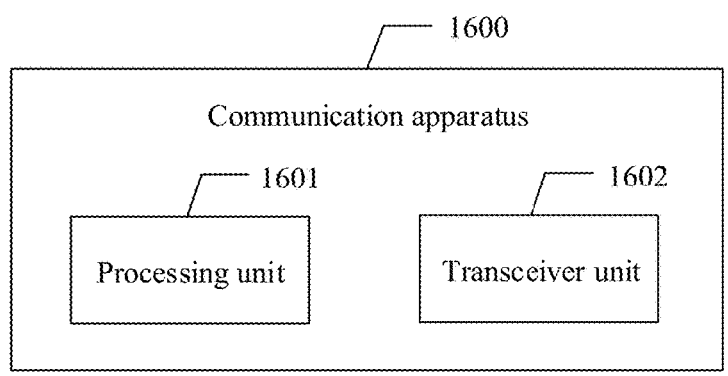
FIG. 16 is a schematic diagram of a communication apparatus according to this application.

FIG. 16 is a schematic diagram of a communication apparatus 1600 according to an embodiment of this application. The communication apparatus 1600 includes a processing unit 1601 and a transceiver unit 1602.

In an implementation, the communication apparatus 1600 may be specifically a first AP, and is configured to implement the communication method in the embodiment shown in FIG. 10. Correspondingly, the processing unit 1601 and the transceiver unit 1602 may be configured to perform the following process.

The processing unit 1601 is configured to generate a management frame, where the management frame includes a specific element of the first AP, the first AP is an AP corresponding to a transmitted BSSID in a multiple BSSID set, and a value of a specific element of an AP corresponding to a nontransmitted BSSID in the multiple BSSID set is the same as a value of the specific element of the first AP.

The transceiver unit 1602 is configured to send the management frame.

Based on the foregoing technical solution, the management frame sent by the transceiver unit 1602 includes the specific element of the first AP, the first AP is the AP corresponding to the transmitted BSSID in the multiple BSSID set, and the value of the specific element of the AP corresponding to the nontransmitted BSSID in the multiple BSSID set is the same as the value of the specific element of the first AP. In this way, when a receiver of the management frame is a STA associated with the first AP, a corresponding value may be determined by using the specific element of the first AP carried in the management frame, and when the receiver of the management frame is a STA associated with the nontransmitted BSSID in the multiple BSSID set, the corresponding value may also be determined by using the specific element of the first AP carried in the management frame. In other words, the value of the specific element of the first AP is reused in the management frame, to indicate the specific element of the AP corresponding to the nontransmitted BSSID in the multiple BSSID set to which the first AP belongs. The management frame does not need to carry a plurality of same specific elements in the multiple BSSID set. This reduces redundant data of the management frame, avoids unnecessary overheads, and improves communication efficiency.

In an implementation, the communication apparatus 1600 may be specifically a STA (namely, the receiver of the management frame sent by the first AP), and is configured to implement the communication method in the embodiment shown in FIG. 10. Correspondingly, the processing unit 1601 and the transceiver unit 1602 may be configured to perform the following process.

The transceiver unit 1602 is configured to receive the management frame, where the management frame includes a specific element of the first access point AP, the first AP is an AP corresponding to a transmitted BSSID in a multiple BSSID set, and a value of a specific element of an AP corresponding to a nontransmitted BSSID in the multiple BSSID set is the same as a value of the specific element of the first AP.

The processing unit 1601 is configured to determine, based on the management frame, the value of the specific element of the AP corresponding to the nontransmitted BSSID in the multiple BSSID set or the value of the specific element of the first AP.

Based on the foregoing technical solution, the management frame received by the transceiver unit 1602 includes the specific element of the first AP, the first AP is the AP corresponding to the transmitted BSSID in the multiple BSSID set, and the value of the specific element of the AP corresponding to the nontransmitted BSSID in the multiple BSSID set is the same as the value of the specific element of the first AP. In this way, when the receiver of the management frame is a STA associated with the first AP, a corresponding value may be determined by using the specific element of the first AP carried in the management frame, and when the receiver of the management frame is a STA associated with the nontransmitted BSSID in the multiple BSSID set, the corresponding value may also be determined by using the specific element of the first AP carried in the management frame. In other words, the value of the specific element of the first AP is reused in the management frame, to indicate the specific element of the AP corresponding to the nontransmitted BSSID in the multiple BSSID set to which the first AP belongs. The management frame does not need to carry a plurality of same specific elements in the multiple BSSID set. This reduces redundant data of the management frame, avoids unnecessary overheads, and improves communication efficiency.

In a possible implementation, the management frame further includes a multiple BSSID element, and the multiple BSSID element does not include the specific element of the AP corresponding to the nontransmitted BSSID.

In a possible implementation,
the management frame is a beacon frame or the management frame is a probe response frame.

In a possible implementation,
the specific element includes at least one of the following:
a channel switch announcement element, an extended channel switch announcement element, a quiet element, a quiet channel element, and a max channel switch time element.

In an implementation, the communication apparatus 1600 may be specifically a first AP in a first AP MLD, and is configured to implement the communication method in the embodiment shown in FIG. 14. Correspondingly, the processing unit 1601 and the transceiver unit 1602 may be configured to perform the following process.

The processing unit 1601 is configured to generate a management frame, where the management frame includes a specific element of a second AP, the first AP is an AP corresponding to a transmitted BSSID in a first multiple BSSID set, the second AP belongs to a second multiple BSSID set, and a value of the specific element of the second AP is the same as a value of a specific element of another AP other than the second AP in the second multiple BSSID set.

The transceiver unit 1602 is configured to send the management frame.

Based on the foregoing technical solution, the management frame sent by the transceiver unit 1602 includes the specific element of the second AP, the first AP is the transmitted BSSID in the first multiple BSSID set, the second AP is a BSSID in the second multiple BSSID set, and the value of the specific element of the second AP is the same as the value of the specific element of the another AP other than the second AP in the second multiple BSSID set. In this way, when the receiver of the management frame is a STA associated with the second AP, a corresponding value may be determined by using the specific element of the second AP carried in the management frame, and when the receiver of the management frame is a STA associated with the another AP other than the second AP in the second multiple BSSID set, the corresponding value may also be determined by using the specific element of the first AP carried in the management frame. In other words, the value of the specific element of the second AP is reused in the management frame, to indicate specific elements of a plurality of APs in the multiple BSSID set to which the second AP belongs. The management frame does not need to carry a plurality of same specific elements in the multiple BSSID set. This reduces redundant data of the management frame, avoids unnecessary overheads, and improves communication efficiency.

In an implementation, the communication apparatus 1600 may be specifically a STA (namely, the receiver of the management frame sent by the first AP in the first AP MLD), and is configured to implement the communication method in the embodiment shown in FIG. 14. Correspondingly, the processing unit 1601 and the transceiver unit 1602 may be configured to perform the following process.

The transceiver unit 1602 is configured to receive a management frame from a first access point AP, where the management frame includes a specific element of a second AP, the first AP is an AP corresponding to a transmitted BSSID in a first multiple BSSID set, the second AP belongs to a second multiple BSSID set, and a value of the specific element of the second AP is the same as a value of a specific element of another AP other than the second AP in the second multiple BSSID set.

The processing unit 1601 is configured to determine, based on the management frame, the value of the specific element of the second AP or the value of the specific element of the another AP other than the second AP in the second multiple BSSID set.

Based on the foregoing technical solution, the management frame sent by the transceiver unit 1602 includes the specific element of the second AP, the first AP is the transmitted BSSID in the first multiple BSSID set, the second AP is a BSSID in the second multiple BSSID set, and the value of the specific element of the second AP is the same as the value of the specific element of the another AP other than the second AP in the second multiple BSSID set. In this way, when the receiver of the management frame is a STA associated with the second AP, a corresponding value may be determined by using the specific element of the second AP carried in the management frame, and when the receiver of the management frame is a STA associated with the another AP other than the second AP in the second multiple BSSID set, the corresponding value may also be determined by using the specific element of the first AP carried in the management frame. In other words, the value of the specific element of the second AP is reused in the management frame, to indicate specific elements of a plurality of APs in the multiple BSSID set to which the second AP belongs. The management frame does not need to carry a plurality of same specific elements in the multiple BSSID set. This reduces redundant data of the management frame, avoids unnecessary overheads, and improves communication efficiency.

In a possible implementation, the first AP belongs to a first access point multi-link device AP MLD.

In a possible implementation, the second AP is another AP other than the first AP in the first AP MLD.

In a possible implementation,
the second AP is an AP in a second AP MLD, the second AP is not an AP corresponding to a nontransmitted BSSID in the first multiple BSSID set, and the second AP MLD is an AP MLD in which the nontransmitted BSSID in the first multiple BSSID set is located.

In a possible implementation,
the second AP includes another AP other than the first AP in the first AP MLD; or
the second AP includes an AP in a second AP MLD, the second AP is not an AP corresponding to a nontransmitted BSSID in the first multiple BSSID set, and the second AP MLD is an AP MLD in which the AP corresponding to the nontransmitted BSSID in the first multiple BSSID set is located.

In a possible implementation, the second AP is another AP in the second AP MLD other than the nontransmitted BSSID in the first multiple BSSID set, and the specific element is located in the multiple BSSID element of the management frame.

In a possible implementation, when the specific element is located in the multiple BSSID element of the management frame, the second AP is another AP in the second AP MLD other than the nontransmitted BSSID in the first multiple BSSID set.

In a possible implementation, when the specific element is located in the multiple BSSID element of the management frame, the multiple BSSID element includes at least one nontransmitted basic service set identifier profile (briefly referred to as a nontransmitted BSSID profile), and the specific element is located in a first nontransmitted BSSID profile in the at least one nontransmitted BSSID profile.

Optionally, the first nontransmitted BSSID profile is a first piece of nontransmitted BSSID profile in the at least one nontransmitted BSSID profile.

In a possible implementation, another nontransmitted BSSID profile other than the first nontransmitted BSSID profile in the at least one nontransmitted BSSID profile does not include the specific element.

In a possible implementation, the second AP is another AP other than the first AP in the first AP MLD, and the specific element is located in the multi-link element of the management frame.

In a possible implementation, when the specific element is located in the multi-link element of the management frame, the second AP is another AP other than the first AP in the first AP MLD.

In a possible implementation, when the specific element is located in the multi-link element of the management frame, the specific element is located in a per-STA profile field corresponding to the second AP in the multi-link element.

In a possible implementation, when the specific element is located in the multi-link element of the management frame, the per-STA profile field corresponding to the second AP includes a link identifier field, and the link identifier field is a link identifier of the second AP.

In a possible implementation, the second AP includes another AP other than the first AP in the first AP MLD or the second AP includes another AP in the second AP MLD other than the AP corresponding to the nontransmitted BSSID in the first multiple BSSID set. One per-STA profile field in the multi-link element includes a link identifier field, and a value of the link identifier field is a special value.

In a possible implementation, the management frame further includes a multiple BSSID element, and the multiple BSSID element does not include a specific element of another AP other than the second AP in the second multiple BSSID set.

In a possible implementation, when the specific element is located in the multi-link element of the management frame, the per-STA profile field further includes the station media access control (MAC) address present field located in the station control field, and the value of the station MAC address present field indicates that the station information field includes the station MAC address.

In a possible implementation, when the specific element is located in the multi-link element of the management frame, the per-STA profile field further includes the station information field, the station information field includes the station MAC address field, and the value of the station MAC address field is the transmitted BSSID in the second multiple BSSID set.

In a possible implementation, the management frame further includes a first field, and the first field satisfies at least one of the following:
the first field at least indicates that a STA in a non-AP MLD associated with the second AP MLD needs to receive (the specific element of the second AP in) the multi-link element of the first AP MLD;
the first field at least indicates that a STA in a non-AP MLD associated with the first AP MLD needs to receive (the specific element of the second AP in) the multi-link element of the first AP MLD;
the first field at least indicates that a STA associated with the first AP needs to receive (the specific element of the second AP in) the multi-link element of the first AP MLD;
the first field at least indicates that a STA in a non-AP MLD associated with the second AP MLD needs to receive (the specific element of the second AP in) a multiple BSSID element corresponding to the second multiple BSSID set; or
the first field at least indicates that a STA in a non-AP MLD associated with the second AP MLD needs to receive (the specific element of the second AP in) a first nontransmitted BSSID profile in a multiple BSSID element corresponding to the second multiple BSSID set.

Optionally, the STA mentioned above is a STA associated with an AP that operates on a same link as the first AP, or a STA associated with the first AP.

In a possible implementation,
the first field is located in a capabilities information field;
the first field is located in a nontransmitted profile field;
the first field is located in a nontransmitted BSSID capabilities element of a nontransmitted profile (nontransmitted profile) field;
the first field is located in a multi-link element (or referred to as an ML element) of a nontransmitted profile field;
the first field is located in a multi-link control field of a multi-link element of a nontransmitted profile field; or
the first field is located in a common information field of a multi-link element of a nontransmitted profile field.

In a possible implementation, the management frame is a beacon frame or the management frame is a probe response frame.

In a possible implementation, the specific element includes at least one of the following: a channel switch announcement element, an extended channel switch announcement element, a quiet element, a quiet channel element (Quiet Channel element), and a max channel switch time element.

It should be noted that the communication apparatus 1600 may be further configured to perform the implementation process corresponding to any foregoing method embodiment and achieve corresponding beneficial effects. For details, refer to the descriptions in the foregoing embodiments. Details are not described herein again.

The foregoing describes the AP (namely, the first AP or the first AP in the first AP MLD) and the STA in embodiments of this application. The following describes possible product forms of the AP and the STA. It should be understood that the following description is merely an example, and product forms of the AP and the STA in embodiments of this application are not limited thereto.

In a possible product form, the AP and the STA in embodiments of this application may be implemented by using general bus architectures.

Figure 17:
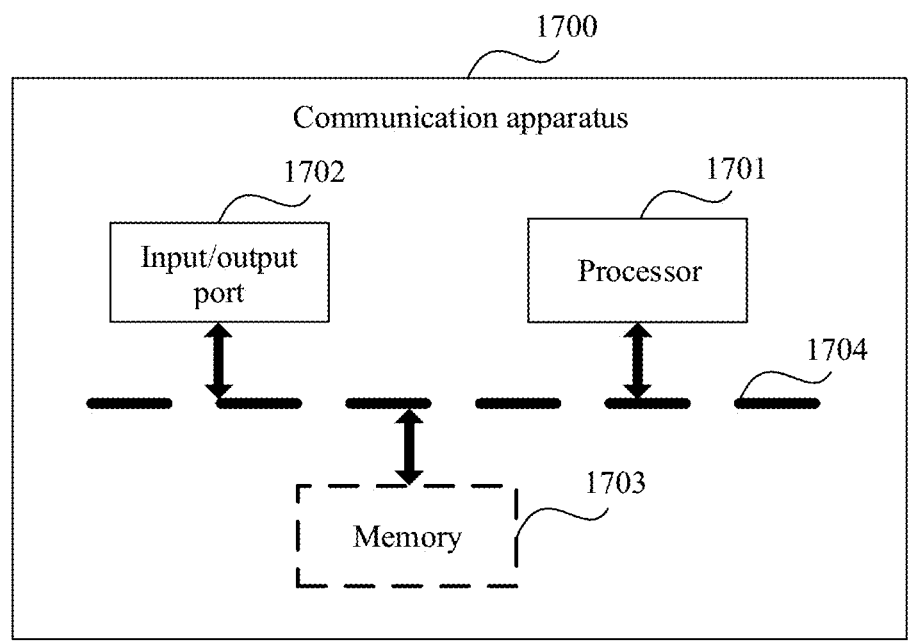
FIG. 17 is another schematic diagram of a communication apparatus according to this application.

For ease of description, FIG. 17 is a schematic diagram of a structure of a communication apparatus 1700 according to an embodiment of this application. The communication apparatus 1700 may be an AP or a STA, or a chip in the AP or the STA. FIG. 17 shows only main components of the communication apparatus 1700. The communication apparatus 1700 includes at least an input/output port 1702 and a processor 1701.

Optionally, the input/output port 1702 may alternatively be referred to as a communication port, a communication interface, or the like.

Optionally, the communication apparatus 1700 may further include a memory 1703.

Optionally, a bus 1704 may be further added to the apparatus 1700, and the bus 1704 is configured to establish a connection between the input/output port 1702 and/or the memory 1703 and the processor 1701.

The processor 1701 is mainly configured to process a communication protocol and communication data, control the communication apparatus, execute a software program, and process data of the software program. The memory 1703 is mainly configured to store the software program and the data. The input/output port 1702 may include a control circuit and an antenna. The control circuit is mainly configured to perform conversion between a baseband signal and a radio frequency signal and process the radio frequency signal. The antenna is mainly configured to receive and send a radio frequency signal in a form of electromagnetic wave. For example, the input/output apparatus 1702 may be a touchscreen, a display, or a keyboard, and is mainly configured to receive data input by a user and output data to the user.

After the communication apparatus 1700 is powered on, the processor 1701 may read the software program in the memory 1703, interpret and execute instructions of the software program, and process the data of the software program. When data needs to be sent wirelessly, the processor 1701 performs baseband processing on the to-be-sent data, and then outputs a baseband signal to a radio frequency circuit. The radio frequency circuit performs radio frequency processing on the baseband signal, and then sends a radio frequency signal in a form of electromagnetic wave through the antenna. When data is sent to the communication apparatus, the radio frequency circuit receives a radio frequency signal through the antenna, converts the radio frequency signal into a baseband signal, and outputs the baseband signal to the processor 1701. The processor 1701 converts the baseband signal into data, and processes the data.

Optionally, the memory 1703 may be located in the processor 1701.

In any one of the foregoing designs, the processor 1701 may include a communication interface for implementing receiving and sending functions. For example, the communication interface may be a transceiver circuit, an interface, or an interface circuit. The transceiver circuit, the interface, or the interface circuit configured to implement the receiving and sending functions may be separated, or may be integrated. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1701 may store instructions. The instructions may be a computer program. The computer program is run on the processor 1701, so that the communication apparatus 1700 can perform the method described in the foregoing method embodiments. The computer program may be fixed in the processor 1701. In this case, the processor 1701 may be implemented by hardware.

In an implementation, the communication apparatus 1700 may include a circuit, and the circuit may implement a sending, receiving, or communication function in any one of the foregoing embodiments. The processor and the communication interface described in this application may be implemented on an integrated circuit, an analog IC, a radio frequency integrated circuit (RFIC), a mixed signal IC, an application-specific integrated circuit (ASIC), a printed circuit board (PCB), an electronic device, or the like. The processor and the communication interface may be manufactured using various IC technologies, for example, a complementary metal oxide semiconductor (CMOS), an N-type metal oxide semiconductor (NMOS), a P-channel metal oxide semiconductor (PMOS), a bipolar junction transistor (BJT), a bipolar CMOS (BiCMOS), silicon germanium (SiGe), and gallium arsenide (GaAs).

A scope of the communication apparatus described in this application is not limited thereto, and a structure of the communication apparatus may not be limited by FIG. 17. The communication apparatus may be an independent device or may be a part of a large device. For example, the communication apparatus may be:

(1) an independent integrated circuit IC, a chip, or a chip system or subsystem;
(2) a set including one or more ICs, where optionally, the set of ICs may further include a storage component configured to store data and a computer program;
(3) an ASIC such as a modem;
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) others.

In a possible product form, the AP and STA in embodiments of this application may be implemented by general-purpose processors.

It should be understood that the communication apparatuses in the foregoing various product forms have any function of the AP or STA in any one of the foregoing embodiments. Details are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus.

The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

An embodiment of this application further provides a wireless communication system including an AP and a STA. The AP and the STA may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

The invention claimed is:

1. A communication method, comprising:
    generating, by a first access point (AP), a management frame, wherein the management frame comprises a specific element of the first AP and a multiple basic service set identifier (BSSID) element, the specific element is a channel switch related element or a quiet channel related element, and the first AP is an AP corresponding to a transmitted BSSID in a first multiple BSSID set, and the multiple BSSID element does not comprise a specific element of an AP corresponding to a nontransmitted BSSID; and
    sending, by the first AP, the management frame.

2. The method according to claim 1, wherein a value of the specific element of the AP corresponding to the nontransmitted BSSID in the multiple BSSID set is the same as a value of the specific element of the first AP.

3. The method according to claim 1, wherein the management frame is a beacon frame or a probe response frame.

4. The method according to claim 1, wherein the specific element comprises at least one of:
    a quiet element, a quiet channel element, or a max channel switch time element.

5. The method according to claim 1, wherein the management frame further comprises a specific element of a second AP, wherein:
    the first AP and the second AP are affiliated with a same AP multi-link device (MLD), or
    the second AP and a third AP are affiliated with a same AP MLD, and the third AP is an AP corresponding to a nontransmitted BSSID in a first multiple BSSID set to which the first AP belongs.

6. The method according to claim 5, wherein the second AP is an AP in a second multiple BSSID set, and a value of the specific element of the second AP is the same as a value of a specific element of another AP in the second multiple BSSID set other than the second AP.

7. The method according to claim 5, wherein the second AP and the third AP are affiliated with a same AP MLD, the third AP is an AP corresponding to a nontransmitted BSSID in the first multiple BSSID set to which the first AP belongs, and the specific element of the second AP is located in the multiple BSSID element of the management frame.

8. The method according to claim 7, wherein:
    the multiple BSSID element comprises at least one nontransmitted BSSID profile, and the specific element of the second AP is located in a per-station (per-STA) profile field of a multi-link element in a nontransmitted BSSID profile corresponding to the third AP.

9. The method according to claim 5, wherein:
    the first AP and the second AP are affiliated with a same AP MLD, and the specific element of the second AP is located in a per-STA profile field corresponding to the second AP in a multi-link element.

10. The method according to claim 9, wherein the per-STA profile field corresponding to the second AP comprises a link identifier field, and the link identifier field is a link identifier of the second AP.

11. An apparatus, applied to a first access point, AP, comprising at least one processor coupled to at least one memory, wherein the at least one memory is configured to store a program or instructions for execution by the at least one processor to cause the apparatus to performs operations comprising:
    generating a management frame, wherein the management frame comprises a specific element of the first AP and a multiple basic service set identifier (BSSID) element, the specific element is a channel switch related element or a quiet channel related element, and the first AP is an AP corresponding to a transmitted BSSID in a first multiple BSSID set, and the multiple BSSID element does not comprise a specific element of an AP corresponding to a nontransmitted BSSID; and
    sending the management frame.

12. The apparatus according to claim 11, wherein a value of the specific element of the AP corresponding to the nontransmitted BSSID in the multiple BSSID set is the same as a value of the specific element of the first AP.

13. The apparatus according to claim 11, wherein the specific element comprises at least one of:
    a quiet element, a quiet channel element, or a max channel switch time element.

14. The apparatus according to claim 11, wherein the management frame further comprises a specific element of a second AP, wherein:
    the first AP and the second AP are affiliated with a same AP multi-link device (MLD), or
    the second AP and a third AP are affiliated with a same AP MLD, and the third AP is an AP corresponding to a nontransmitted BSSID in the first multiple BSSID set to which the first AP belongs.

15. The apparatus according to claim 14, wherein the second AP and the third AP are affiliated with a same AP MLD, the third AP is an AP corresponding to a nontransmitted BSSID in the first multiple BSSID set to which the first AP belongs, and the specific element of the second AP is located in the multiple BSSID element of the management frame.

16. The apparatus according to claim 15, wherein:
    the multiple BSSID element comprises at least one nontransmitted BSSID profile, and the specific element of the second AP is located in a per-STA profile field of a multi-link element in a nontransmitted BSSID profile corresponding to the third AP.

17. The apparatus according to claim 14, wherein:
    the first AP and the second AP are affiliated with a same AP MLD, and the specific element of the second AP is located in a per-STA profile field corresponding to the second AP in a multi-link element.

18. A non-transitory computer-readable storage medium, wherein the non-transitory computer-readable storage medium stores program instructions, and when the program instructions are run, making a first access point to perform operations comprising:
    generating a management frame, wherein the management frame comprises a specific element of the first AP and a multiple basic service set identifier (BSSID) element, the specific element is a channel switch related element or a quiet channel related element, and the first AP is an AP corresponding to a transmitted BSSID in a first multiple BSSID set, and the multiple BSSID element does not comprise a specific element of an AP corresponding to a nontransmitted BSSID; and
sending the management frame.

19. The non-transitory computer-readable storage medium according to claim 18, wherein a value of the specific element of the AP corresponding to the nontransmitted BSSID in the multiple BSSID set is the same as a value of the specific element of the first AP.

20. The non-transitory computer-readable storage medium according to claim 18, wherein the specific element comprises at least one of:
a quiet element, a quiet channel element, or a max channel switch time element.

* * * * *